US011849217B2

(12) United States Patent
Imaizumi et al.

(10) Patent No.: US 11,849,217 B2
(45) Date of Patent: Dec. 19, 2023

(54) IMAGE PICKUP APPARATUS USED AS ACTION CAMERA, CALIBRATION SYSTEM, CONTROL METHOD FOR IMAGE PICKUP APPARATUS, AND STORAGE MEDIUM STORING CONTROL PROGRAM FOR IMAGE PICKUP APPARATUS

(71) Applicant: CANON KABUSHIKI KAISHA, Tokyo (JP)

(72) Inventors: Takuya Imaizumi, Kanagawa (JP); Takashi Kawakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/815,726

(22) Filed: Jul. 28, 2022

(65) Prior Publication Data

US 2023/0031298 A1 Feb. 2, 2023

(30) Foreign Application Priority Data

Jul. 30, 2021 (JP) .................................. 2021-125341
Mar. 11, 2022 (JP) .................................. 2022-038688

(51) Int. Cl.
*H04N 23/667* (2023.01)
*H04N 23/63* (2023.01)

(52) U.S. Cl.
CPC ......... *H04N 23/667* (2023.01); *H04N 23/633* (2023.01)

(58) Field of Classification Search
None
See application file for complete search history.

(56) References Cited

U.S. PATENT DOCUMENTS

2009/0046815 A1 2/2009 Oh et al.
2014/0355767 A1 12/2014 Virette et al.
(Continued)

FOREIGN PATENT DOCUMENTS

EP 2984541 A1 2/2016
EP 3163422 A1 5/2017
(Continued)

OTHER PUBLICATIONS

Hirotake Yamazoe, et al., "A body-mounted camera system for head-pose estimation and user-view image synthesis", Image and Vision Computing, vol. 25, Issue 12, p. 1848-1855, Dec. 3, 2007.

*Primary Examiner* — Cynthia Segura
(74) *Attorney, Agent, or Firm* — Canon U.S.A., Inc. IP Division

(57) ABSTRACT

An image pickup apparatus that is capable of eliminating change of an image pickup direction by a user during an image pickup operation and of easily obtaining an image that records experience while focusing attention on the experience. An observation direction detection unit is worn on a body part other than a head of a user and detects an observation direction of the user. An image pickup unit is worn on a body and picks up an image. A recording direction determination unit determines a recording direction using a detection result of the observation direction detection unit. A deviation detection unit detects a deviation of the image pickup apparatus with respect to the body. An image recording unit records a part of the image picked up by the image pickup unit in a recording area that is determined in accordance with the recording direction and the deviation.

32 Claims, 73 Drawing Sheets

(56) References Cited

U.S. PATENT DOCUMENTS

| | | | |
|---|---|---|---|
| 2015/0310263 A1 | 10/2015 | Zhang et al. | |
| 2015/0316981 A1 | 11/2015 | Sellen et al. | |
| 2017/0085841 A1* | 3/2017 | Hagiwara | G02C 11/10 |
| 2017/0199579 A1 | 7/2017 | Chen | |
| 2020/0304718 A1 | 9/2020 | Toriumi et al. | |
| 2021/0034904 A1 | 2/2021 | Lee et al. | |
| 2022/0294937 A1* | 9/2022 | Furukawa | H04N 17/002 |
| 2023/0034538 A1* | 2/2023 | Ishibashi | H04N 23/698 |
| 2023/0035277 A1* | 2/2023 | Imaizumi | H04N 23/683 |

FOREIGN PATENT DOCUMENTS

| | | |
|---|---|---|
| GB | 2607151 A | 11/2022 |
| GB | 2611154 A | 3/2023 |
| JP | 2005322077 A | 11/2005 |
| JP | 2007074033 A | 3/2007 |
| JP | 2012039359 A | 2/2012 |
| JP | 2017060078 A | 3/2017 |
| WO | 2013065868 A1 | 5/2013 |

\* cited by examiner

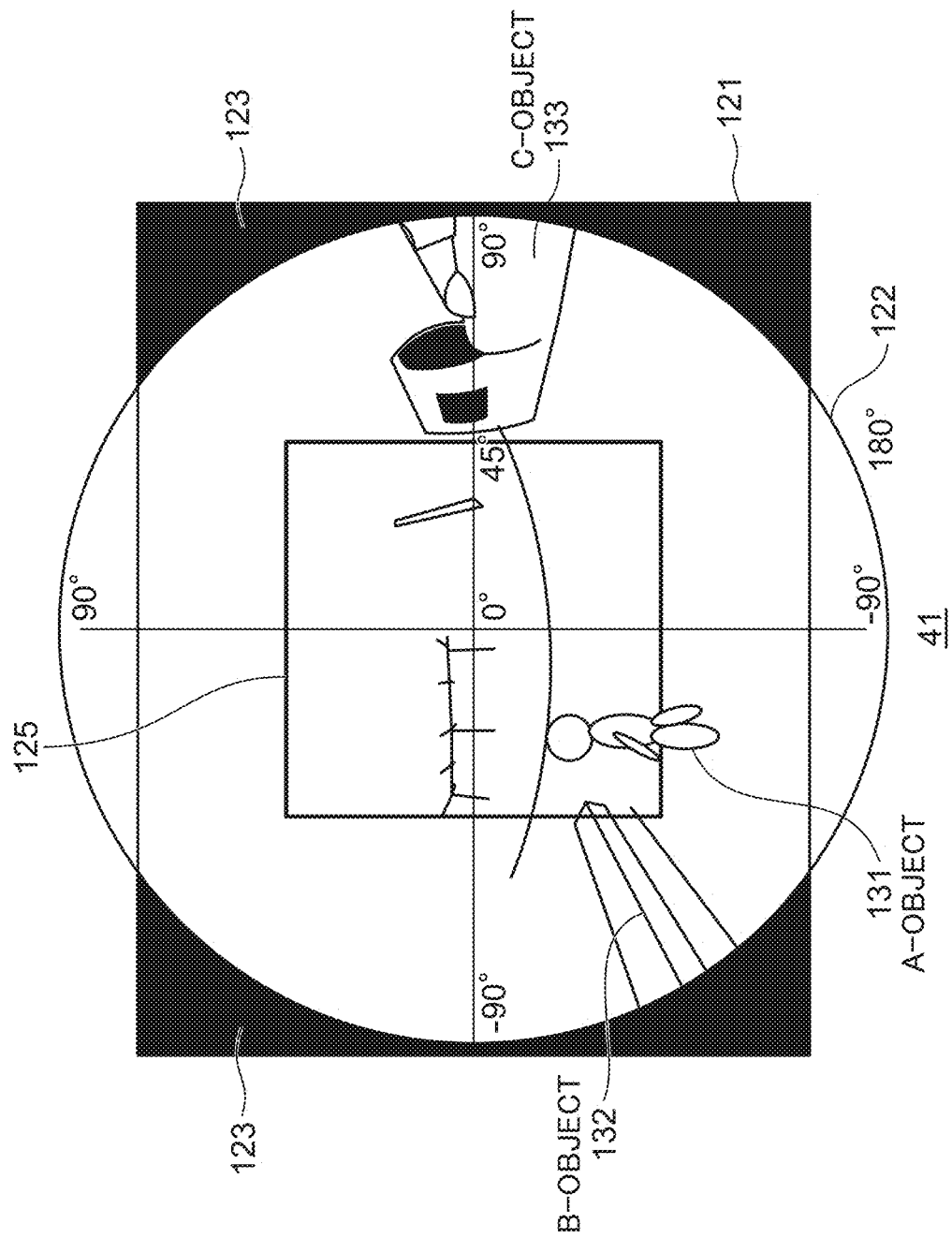

OBJECT

IMAGE ON
IMAGE SENSOR

DEVELOPMENT
AREA

EXTRACTION AND
DEVELOPMENT

AFTER DISTORTION
CORRECTION PROCESS

AFTER IMAGE
STABILIZATION

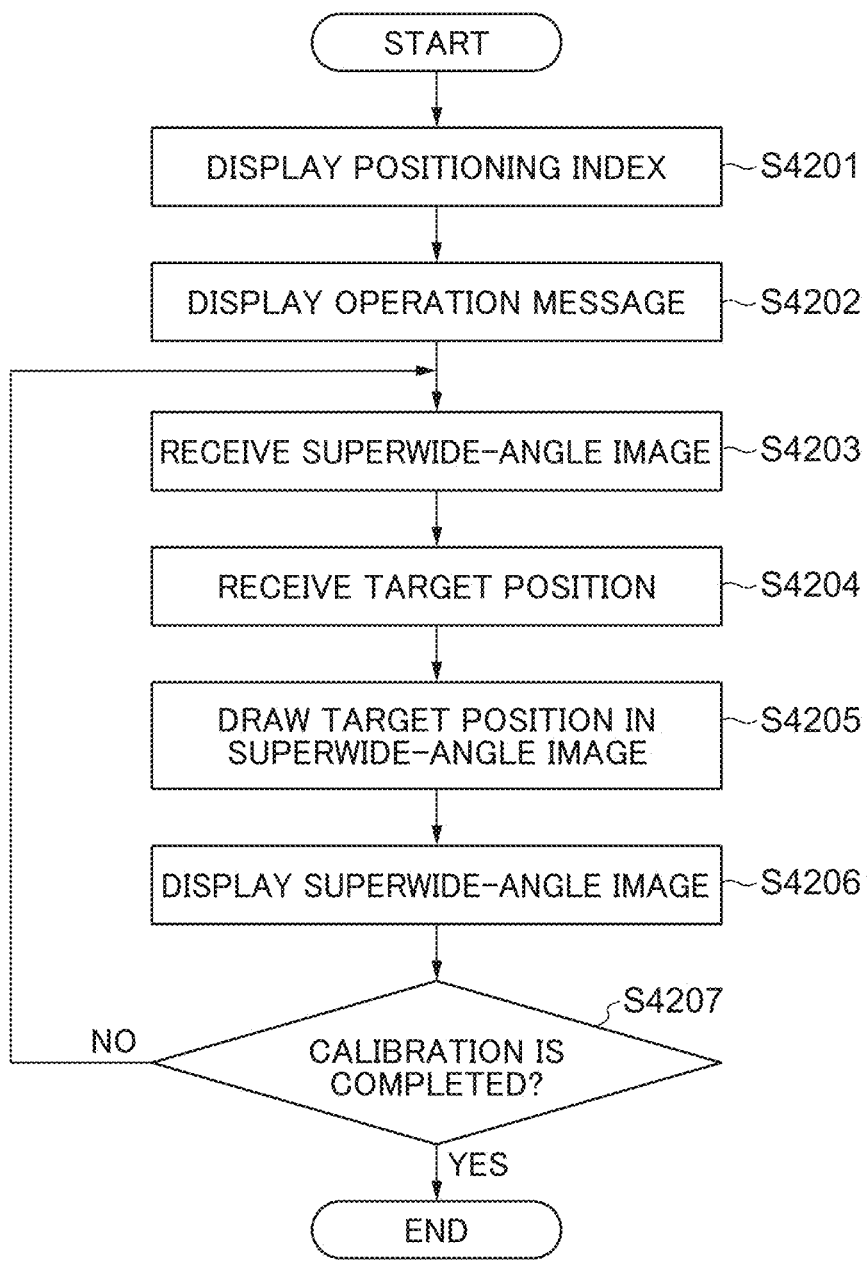

IMAGE PICKUP APPARATUS USED AS ACTION CAMERA, CALIBRATION SYSTEM, CONTROL METHOD FOR IMAGE PICKUP APPARATUS, AND STORAGE MEDIUM STORING CONTROL PROGRAM FOR IMAGE PICKUP APPARATUS

BACKGROUND

Field of the Disclosure

The present disclosure relates to an image pickup apparatus used as an action camera, a calibration system, a control method for the image pickup apparatus, and a storage medium storing a control program for the image pickup apparatus.

Description of the Related Art

When a user picks up an image of an object with a camera, the user needs to continuously direct the camera toward the object. Accordingly, the user may find it difficult to manage actions other than an image pickup action. Further, the user may find it difficult to focus their attention on their immediate surroundings.

As a method for solving these matters, methods have been contemplated wherein a camera is fixed to the head of a user using a fixing-to-head accessory to pick up an image in an observing direction. This enables the user to perform an image pickup operation without being occupied with the image pickup operation. Further, there is also contemplated a method that picks up an image in a wide area with an entire-celestial-sphere camera during experience. This enables a user to focus attention on their experience during an image pickup operation. After the experience, the user may extract a desired image part from the picked-up entire-celestial-sphere image and edit it to obtain an image of the experience.

However, since the former method needs a troublesome action that equips the head with the action camera, the user may find it difficult to focus their attention on the experience. Moreover, the latter method puts heavy burden on the user because the user needs to extract a necessary part from the entire celestial sphere image and to edit it.

Japanese Laid-Open Patent Publication (Kokai) No. 2007-74033 (JP 2007-74033A) discloses a technique that uses a second camera that picks up a user in addition to a first camera that picks up an object. This technique calculates a moving direction and visual-line direction of a user from an image picked up by the second camera, determines an image pickup direction of the first camera, and picks up an image of an object estimated on the basis of user's viewpoint and state.

Japanese Laid-Open Patent Publication (Kokai) No. 2017-60078 (JP 2017-60078A) (Counterpart of US Patent Application 20170085841) discloses an image recording system including a sensor device that is attached to a user's head and an image pickup apparatus that is separately attached to a user's body or a bag. The sensor device consists of a gyro sensor or an acceleration sensor and detects a user's observation direction. The image pickup apparatus picks up an image in the observation direction detected by the sensor device.

However, since the second camera of JP 2007-74033A picks up an image of the user from a position distant from the user, the second camera needs high optical performance in order to calculate the moving direction and visual-line direction of the user from the image picked up by the second camera. Moreover, since high arithmetic processing capability is needed for processing the image picked up by the second camera, a scale of an apparatus becomes large.

Moreover, since the sensor device of JP 2017-60078A directly detects a user's observation direction, the user needs to equip the head with the sensor device, which cannot solve troublesomeness in attaching any device to the head. Moreover, when the sensor device consists of a gyro sensor or an acceleration sensor, certain accuracy can be obtained in detection of a relative observation direction. However, since accuracy of detection of an absolute observation direction, especially in the horizontal rotation direction, cannot be obtained, there is an issue in a practical application.

SUMMARY

Embodiments of the present disclosure provide a technique that is capable of eliminating change of an image pickup direction by a user during an image pickup operation and of easily obtaining an image that records experience while focusing attention on the experience.

Accordingly, embodiments of the present disclosure provide an image pickup apparatus including an observation direction detection unit that is adapted to be worn on a body part other than a head of a user and that is configured to detect an observation direction of the user, at least one image pickup unit that is adapted to be worn on a body of the user and that is configured to pick up an image, a recording direction determination unit configured to determine a recording direction using a detection result of the observation direction, a deviation detection unit configured to detect a deviation of the image pickup apparatus with respect to the body of the user, and an image recording unit configured to record a part of the image picked up by the image pickup unit in a recording area that is determined in accordance with the recording direction determined by the recording direction determination unit and the deviation detected by the deviation detection unit.

According to embodiments of the present disclosure, change of an image pickup direction by a user during an image pickup operation becomes unnecessary, and an image that records experience can be easily obtained while focusing attention on the experience.

Further features of the present disclosure will become apparent from the following description of exemplary embodiments with reference to the attached drawings.

BRIEF DESCRIPTION OF THE DRAWINGS

FIG. 11A is a view showing a target visual field set in a superwide-angle image picked up by an image pickup unit of the camera body in a case where the user faces the front.

FIG. 39 is a flowchart showing a process of the calibrator in the calibration process according to one or more aspects of the present disclosure.

DESCRIPTION OF THE EMBODIMENTS

Figure 1A:
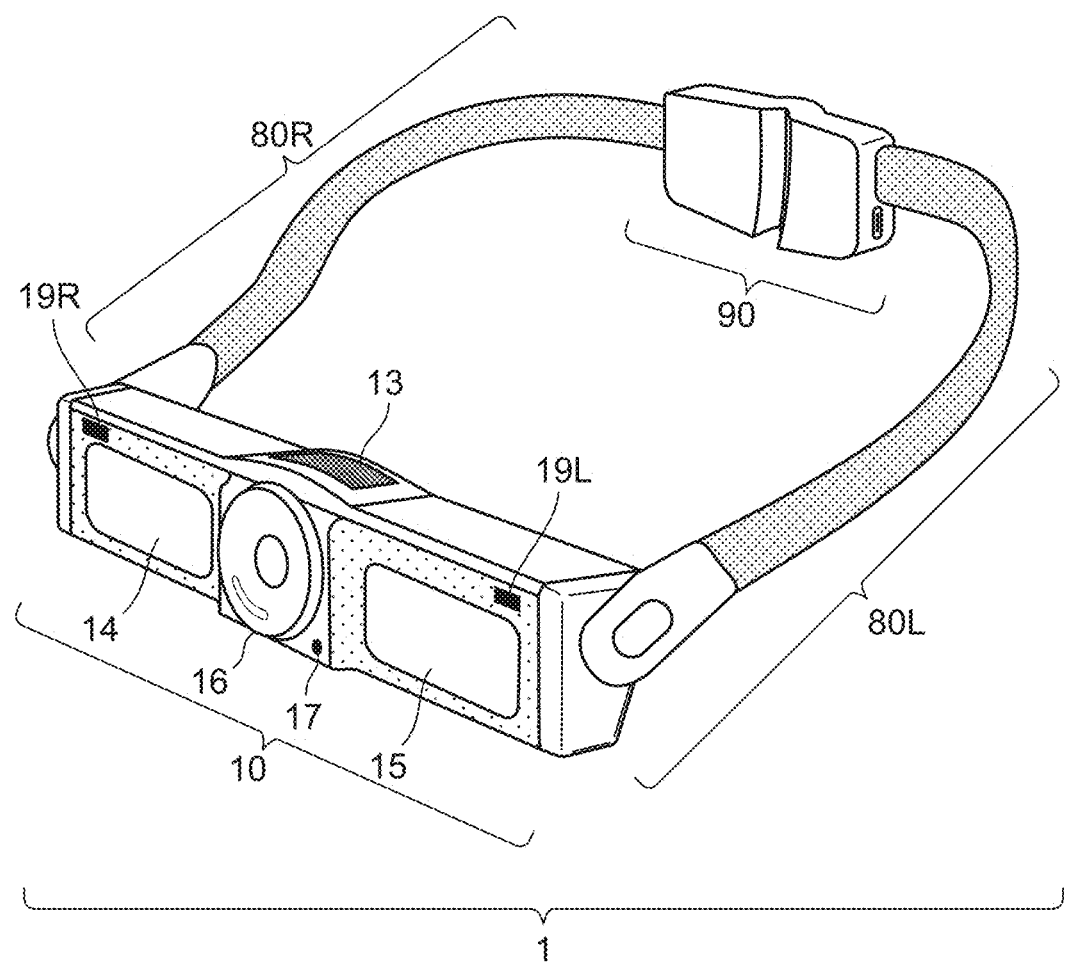
FIG. 1A is an external view showing a camera body including an image-pickup/detection unit as an image pickup apparatus according to one or aspects of the present disclosure.

Hereafter, embodiments according to the present disclosure will be described in detail by referring to the drawings.

First, a first embodiment will be described. FIG. 1A through FIG. 1D are views for describing a camera system consisting of a camera body 1 and a display apparatus 800 that is separated from the camera body 1. The camera body 1 includes an image-pickup/detection unit 10 as a wearable image pickup apparatus according to a first embodiment. Although the camera body 1 and the display apparatus 800 are separated devices in this embodiment, they may be integrated.

FIG. 1A is an external view showing the camera body 1. The camera body 1 is provided with the image-pickup/detection unit 10, a battery unit (power source unit) 90, a right connection member 80R, and a left connection member 80L as shown in FIG. 1A. The right connection member 80R connects the image-pickup/detection unit 10 and the battery unit 90 on the right side of a user's body (left side in FIG. 1A). The left connection member 80L connects the image-pickup/detection unit 10 and the battery unit 90 on the left side of the user's body (right side in FIG. 1A).

The image-pickup/detection unit 10 is provided with a face direction detection window 13, a start switch 14, a stop switch 15, an image pickup lens 16, an LED 17, and microphones 19L and 19R.

The face direction detection window 13 permits transmission of infrared light projected from infrared LEDs 22 (FIG. 5, an infrared radiation unit) built in the image-pickup/detection unit 10 to detect positions of face parts of the user. The face direction detection window 13 also permits transmission of reflected infrared light from the face.

The start switch 14 is used to start an image pickup operation. The stop switch 15 is used to stop the image pickup operation. The image pickup lens 16 guides light from an object to be picked up to a solid state image sensor 42 (FIG. 5) inside the image-pickup/detection unit 10. The LED 17 indicates a state that the image pickup operation is on-going. Additionally or alternatively, the LED 17 can function as a warning light.

The microphones 19R and 19L take in peripheral sound. The microphone 19L takes in sound of the left side of user's periphery (right side in FIG. 1A). The microphone 19R takes in sound of the right side of the user's periphery (left side in FIG. 1A).

Figure 1B:
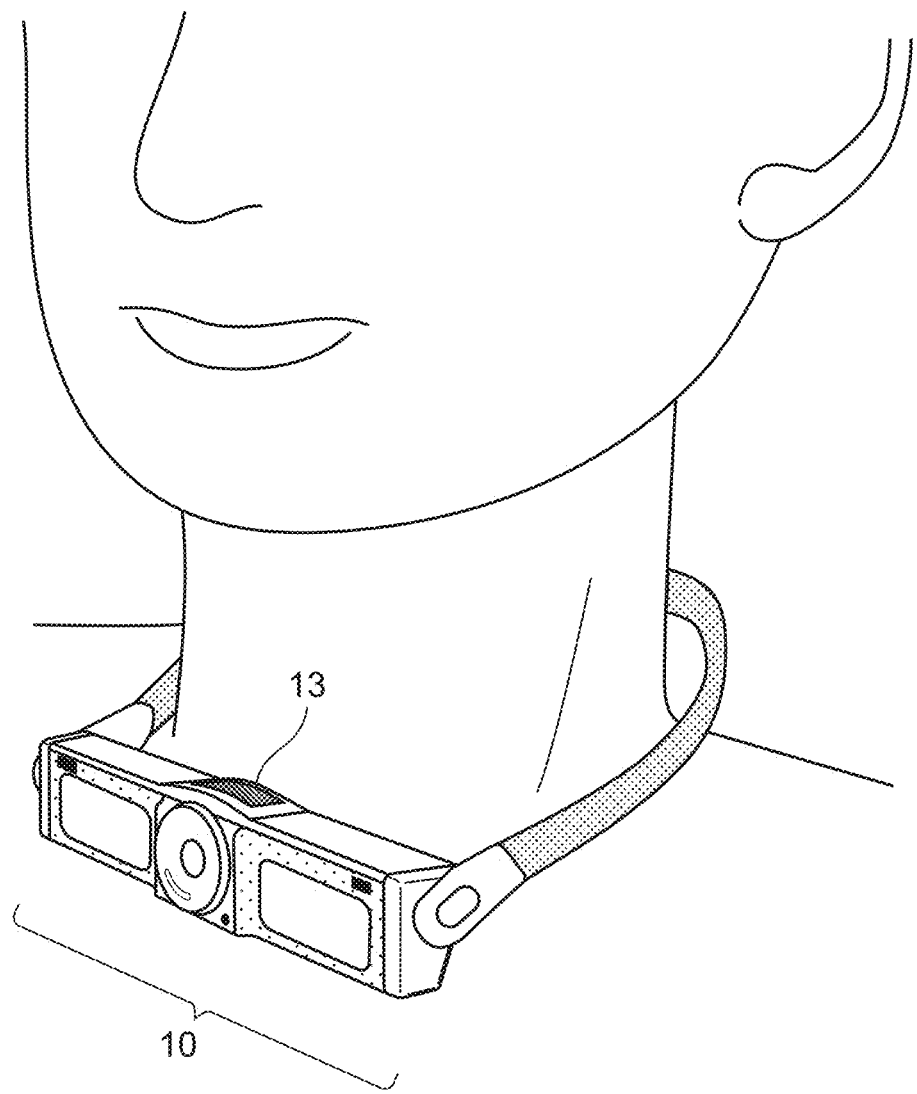
FIG. 1B is a view showing a state where a user wears the camera body.

FIG. 1B is a view showing a state where the user wears the camera body 1. The user wears the camera body 1 so that the battery unit 90 is located proximate to a user's back side and the image-pickup/detection unit 10 is located proximate to the front side of the user's body. Thereby, the image-pickup/detection unit 10 is positioned in front of clavicles of the user. At this time, the face direction detection window 13 is located under a jaw of the user. An infrared condenser lens 26 shown in FIG. 2E mentioned later is arranged inside the face direction detection window 13. An optical axis (detection optical axis) of the infrared condenser lens 26 is directed to the user's face and is directed to a different direction from an optical axis (image pickup optical axis) of the image pickup lens 16. A face direction detection unit 20 including the infrared condenser lens 26 detects a user's observation direction on the basis of the positions of face parts. This enables an image pickup unit 40 mentioned later to pick up an image of an object in the observation direction. Adjustment of the setting position due to individual difference of a body shape and difference in clothes will be mentioned later.

Moreover, since the image-pickup/detection unit 10 is arranged in the front side of the body and the battery unit 90 is arranged in the back face in this way, weight of the camera body 1 is distributed, which reduces user's fatigue and reduces displacement of the camera body 1 due to forces on the camera body 1 caused by movement of the user.

Although the example in which the user wears the camera body 1 so that the image-pickup/detection unit 10 will be located in front of the clavicles of the user is described, the embodiment is not limited to this example. That is, the user may wear the camera body 1 in any position of the user's body part other than the head as long as the camera body 1 can detect the user's observation direction and the image pickup unit 40 can pick up an image of an object in the observation direction.

Figure 1C:
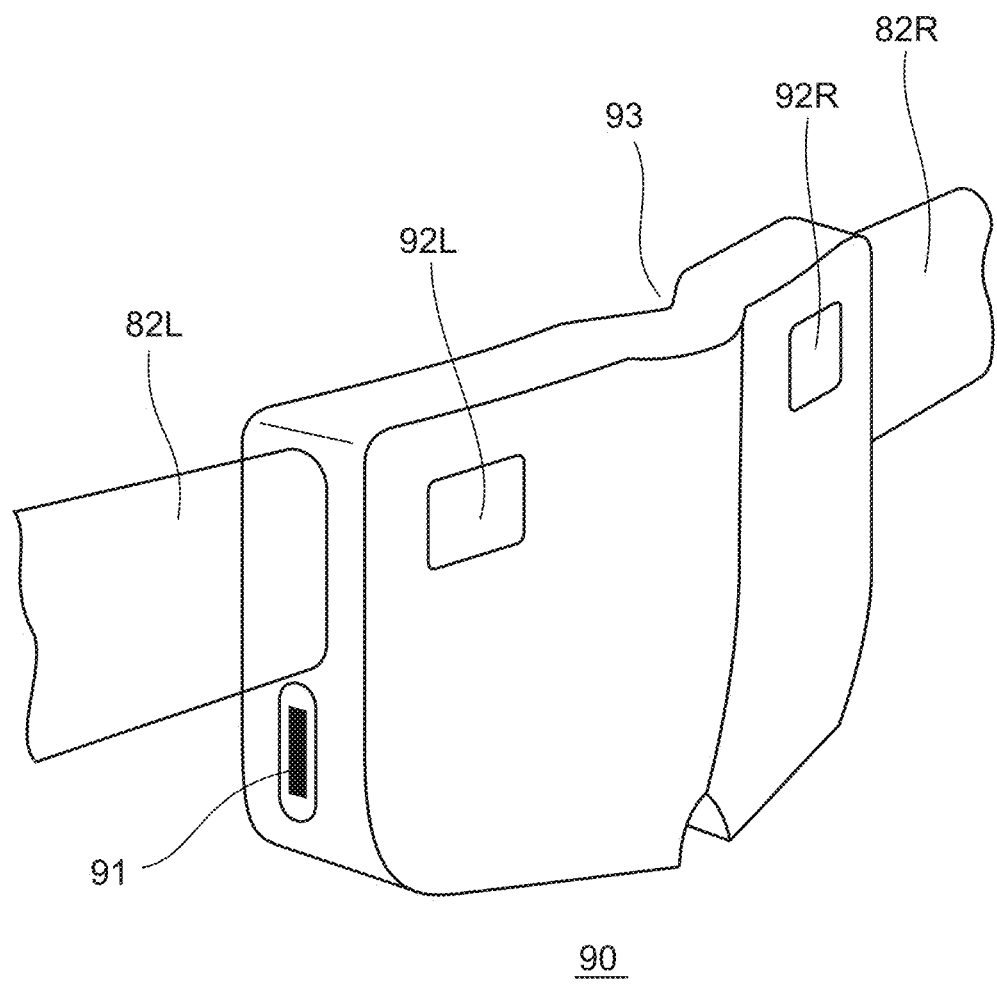
FIG. 1C is a view showing a battery unit in the camera body viewed from a rear side in FIG. 1A.

FIG. 1C is a view showing the battery unit 90 viewed from a rear side in FIG. 1A. The battery unit 90 is provided with a charge cable inserting slot 91, adjustment buttons 92L and 92R, and a backbone escape cutout 93 as shown in FIG. 1C.

A charge cable (not shown) can be connected to the charge cable inserting slot 91. An external power source charges internal batteries 94L and 94R (see FIG. 3A) and supplies electric power to the image-pickup/detection unit 10 through the charge cable.

Adjustment buttons 92L and 92R are used to adjust the respective lengths of the band parts 82L and 82R of the left and right connection members 80L and 80R. The adjustment button 92L is used to adjust the left band part 82L, and the adjustment button 92R is used to adjust the right band part 82R. Although the lengths of the band parts 82L and 82R are independently adjusted with the adjustment buttons 92L and 92R in the embodiment, the lengths of the band parts 82L and 82R may be simultaneously adjusted with one button.

The backbone escape cutout 93 is formed by shaping the battery unit 90 so that the battery unit 90 will not touch the backbone. Since the backbone escape cutout 93 avoids a convex part of the backbone of the body, displeasure of wearing is reduced and lateral displacement of the battery unit 90 is prevented.

Figure 1D:
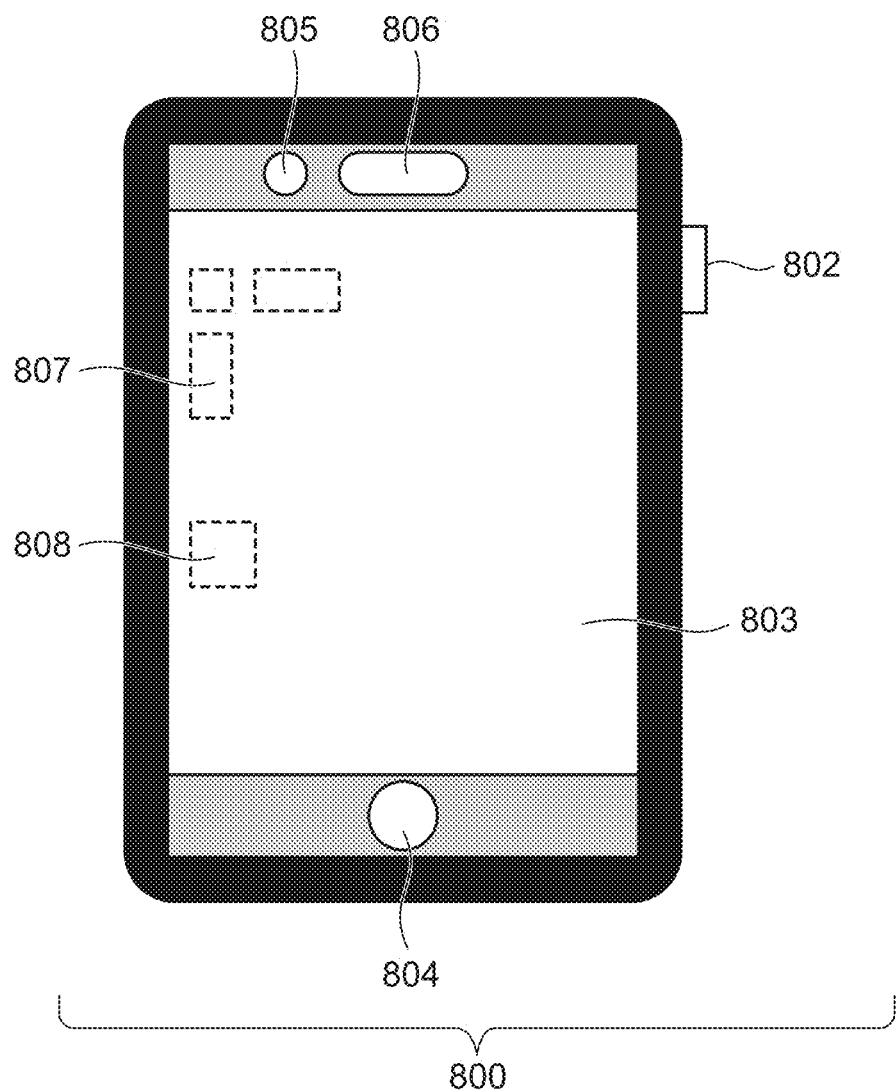
FIG. 1D is an external view showing a display apparatus as a portable device according to one or more aspects of the present disclosure t that is separated from the camera body.

FIG. 1D is an external view showing the display apparatus 800 as a portable device according to the first embodiment that is separated from the camera body 1. As shown in FIG. 1D, the display apparatus 800 is provided with an A-button 802, a display unit 803, a B-button 804, an in-camera 805, a face sensor 806, an angular speed sensor 807, and an acceleration sensor 808. Moreover, the display apparatus 800 is provided with a wireless LAN unit (not shown in FIG. 1D) that enables high-speed connection with the camera body 1.

The A-button 802 has a function of a power button of the display apparatus 800. The display apparatus 800 receives an ON/OFF operation by a long press of the A-button 802 and receives a designation of another process timing by a short press of the A-button 802.

The display unit 803 is used to check an image picked up by the camera body 1 and can display a menu screen required for setting. In this embodiment, a transparent touch sensor that is provided on the surface of the display unit 803 receives a touch operation to a screen (for example, a menu screen) that is displaying.

The B-button 804 functions as a calibration button 854 used for a calibration process mentioned later. The in-camera 805 can pick up an image of a person who is observing the display apparatus 800.

The face sensor 806 detects a face shape and an observation direction of the person who is observing the display apparatus 800. A concrete configuration of the face sensor 806 is not limited. For example, a structural optical sensor, a ToF (Time of Flight) sensor, and a millimetre wave radar may be employed.

Since the angular speed sensor 807 is built in the display apparatus 800, it is shown by a dotted line as a meaning of a perspective view. Since the display apparatus 800 of this embodiment is also provided with a function of the calibrator mentioned later, a triaxial gyro sensor that enables detection in X, Y, and Z directions is mounted to detect movement of the display apparatus 800 as gyro data. The acceleration sensor 808 detects a posture of the display apparatus 800.

It should be noted that a general smart phone is employed as the display apparatus 800 according to this embodiment. The camera system of the embodiment is achieved by matching firmware in the smart phone to firmware of the camera body 1. In the meantime, the camera system of the embodiment can be achieved by matching the firmware of the camera body 1 to an application and OS of the smart phone as the display apparatus 800.

FIG. 2A through FIG. 2F are views describing the image-pickup/detection unit 10 in detail. In views from FIG. 2A, a component that has the same function of a part that has been already described is indicated by the same reference numeral and its description in this specification is omitted.

Figure 2A:
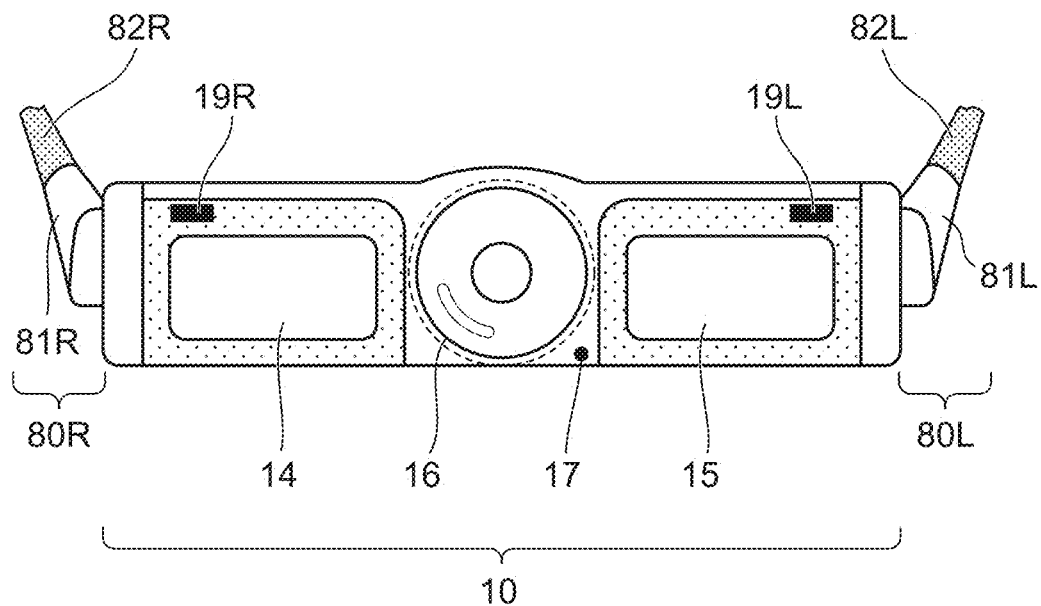
FIG. 2A is a front view showing the image-pickup/detection unit in the camera body.

FIG. 2A is a front view showing the image-pickup/detection unit 10. The right connection member 80R has the band part 82R and an angle-holding member 81R of hard material that holds an angle with respect to the image-pickup/detection unit 10. The left connection member 80L has the band part 82L and an angle-holding member 81L similarly.

Figure 2B:
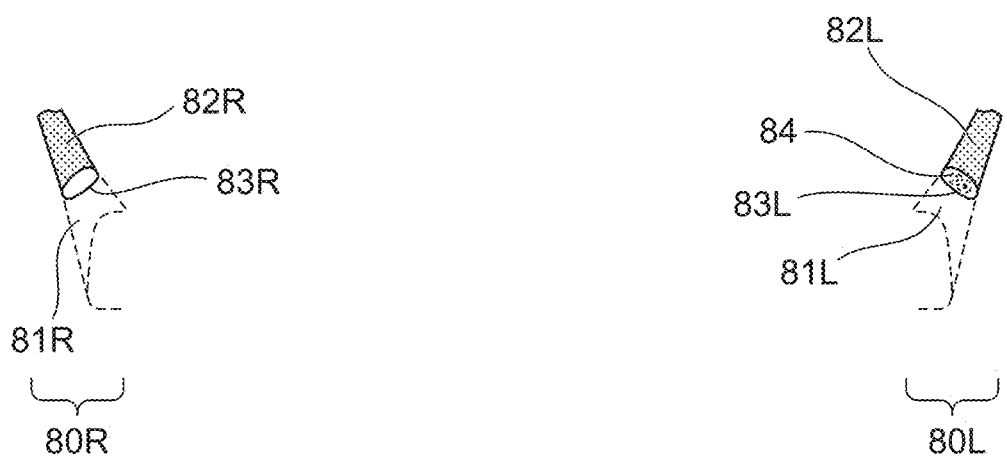
FIG. 2B is a view showing a shape of a band part of a connection member in the camera body.

FIG. 2B is a view showing the shapes of the band parts 82L and 82R of the left and right connection members 80L and 80R. In FIG. 2B, the angle holding members 81L and 81R are shown as transparent members in order to show the shapes of the band parts 82L and 82R.

The band part 82L is provided with a left connecting surface 83L and an electric cable 84 that are arranged at the left side of the user's body (right side in FIG. 2B) when the user wears the camera body 1. The band part 82R is provided with a right connecting surface 83R arranged at the right side of the user's body (left side in FIG. 2B) when the user wears the camera body 1.

The left connecting surface 83L is connected with the angle holding member 81L, and its sectional shape is an ellipse but is not a perfect circle. The right connecting surface 83R also has a similar elliptical shape. The right connecting surface 83R and left connecting surface 83L are arranged bisymmetrically in a reverse V-shape. That is, the distance between the right connecting surface 83R and the left connecting surface 83L becomes shorter toward the upper side from the lower side in FIG. 2B. Thereby, since the long axis directions of the left and right connecting surfaces 83L and 83R match the user's body when the user hangs the camera body 1, the band parts 82L and 82R touch the user's body comfortably and movement of the image-pickup/detection unit 10 in the left-and-right direction and front-and-back direction can be prevented.

The electric cable (a power supply member) 84 is wired inside the band part 82L and electrically connects the battery unit 90 and the image-pickup/detection unit 10. The electric cable 84 connects the power source of the battery unit 90 to the image-pickup/detection unit 10 or transfers an electrical signal with an external apparatus.

Figure 2C:
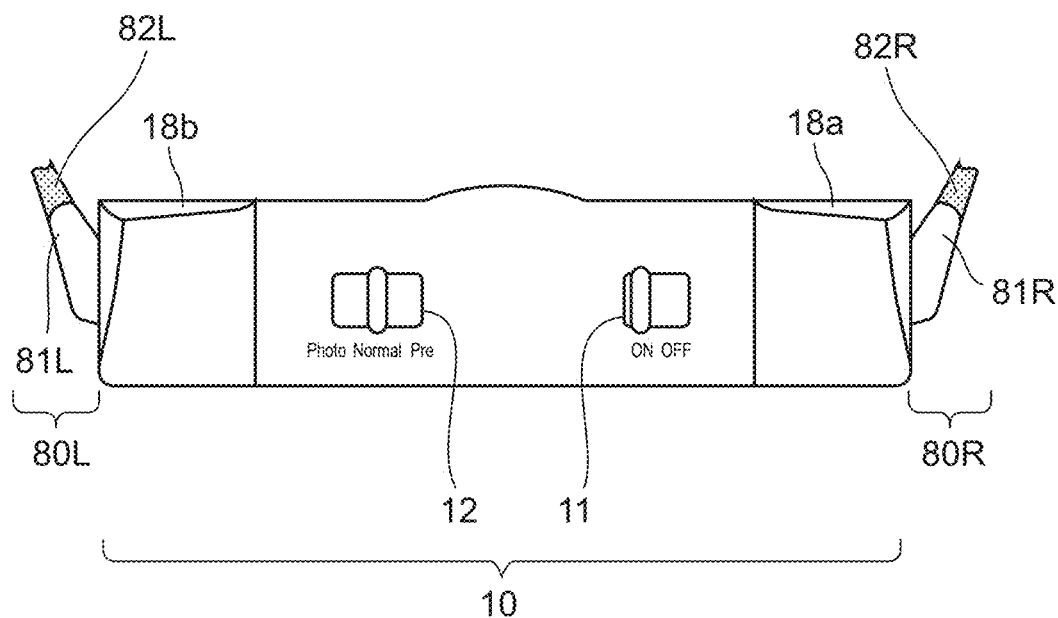
FIG. 2C is a rear view showing the image-pickup/detection unit.

FIG. 2C is a rear view showing the image-pickup/detection unit 10. FIG. 2C shows the side that contacts to the user's body. That is, FIG. 2C is a view viewed from the opposite side of FIG. 2A. Accordingly, the positional relationship between the right connection member 80R and the left connection member 80L is reverse to FIG. 2A.

The image-pickup/detection unit 10 is provided with a power switch 11, an image pickup mode switch 12, and chest contact pads 18a and 18b at the back side. The power switch 11 is used to switch ON/OFF of the power of the camera body 1. Although the power switch 11 of this embodiment is a slide lever type, it is not limited to this. For example, the power switch 11 may be a push type switch or may be a switch that is integrally constituted with a slide cover (not shown) of the image pickup lens 16.

The image pickup mode switch (a change member) 12 is used to change an image pickup mode, i.e., is used to change a mode in connection with an image pickup operation. In this embodiment, the image pickup mode switch 12 can select the image pickup mode from among a still image mode, a video image mode, and a below-mentioned preset mode that is set using the display apparatus 800.

The chest contact pads (fixing members) 18a and 18b touch the user's body when the image-pickup/detection unit 10 is attached to the user's body. As shown in FIG. 2A, the image-pickup/detection unit 10 is formed so that a lateral (left-and-right) overall length will become longer than a vertical (up-and-down) overall length in wearing the camera body 1. The chest contact pads 18a and 18b are respectively arranged in vicinities of right and left ends of the image-pickup/detection unit 10. This arrangement reduces rotational blur in the left-and-right direction during the image pickup operation of the camera body 1. Moreover, the chest contact pads 18a and 18b prevent the power switch 11 and the image pickup mode switch 12 from touching the user's body. Furthermore, the chest contact pads 18a and 18b prevent heat transmission to the user's body even if the image-pickup/detection unit 10 heats up due to a long-time image pickup operation and are used for the adjustment of the angle of the image-pickup/detection unit 10.

Figure 2D:
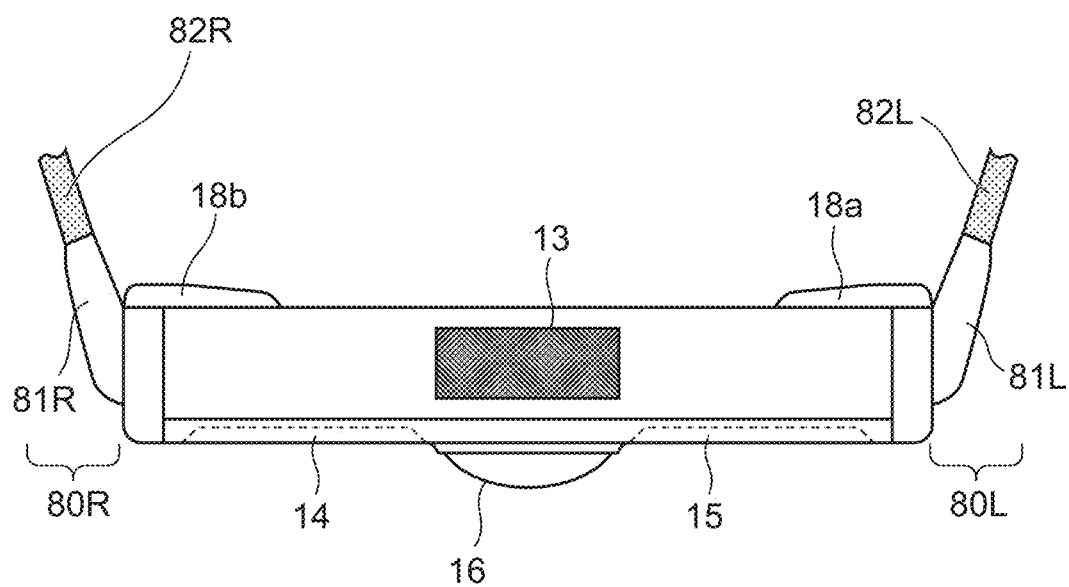
FIG. 2D is a top view showing the image-pickup/detection unit.

FIG. 2D is a top view showing the image-pickup/detection unit 10. As shown in FIG. 2D, the face direction detection window 13 is provided in the central part of the top surface of the image-pickup/detection unit 10, and the chest contact pads 18a and 18b are projected from the image-pickup/detection unit 10.

Figure 2E:
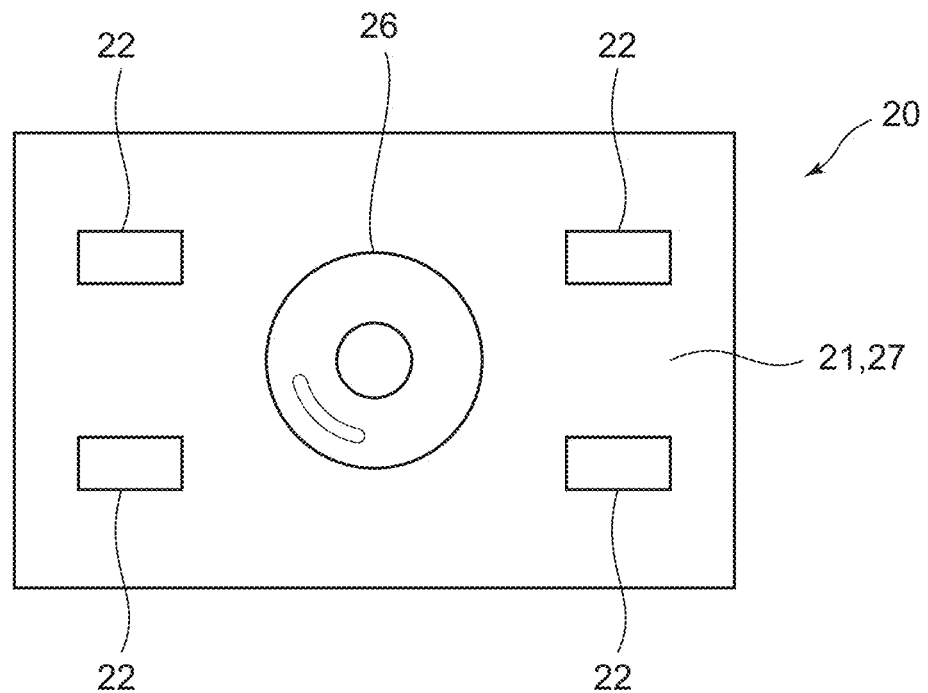
FIG. 2E is a view showing a configuration of a face direction detection unit arranged inside the image-pickup/detection unit and under a face direction detection window in the camera body.

FIG. 2E is a view showing a configuration of the face direction detection unit 20 arranged inside the image-pickup/detection unit 10 and under the face direction detection window 13. The face direction detection unit 20 is provided with the infrared LEDs 22 and the infrared condenser lens 26. The face direction detection unit 20 is also provided with an infrared LED lighting circuit 21 and an infrared detection device 27 shown in FIG. 5 mentioned later.

The infrared LEDs 22 project infrared light 23 (FIG. 5) toward the user. The infrared condenser lens 26 images reflected light 25 (FIG. 5) from the user in projecting the infrared light 23 from the infrared LEDs 22 onto a sensor (not shown) of the infrared detection device 27.

Figure 2F:
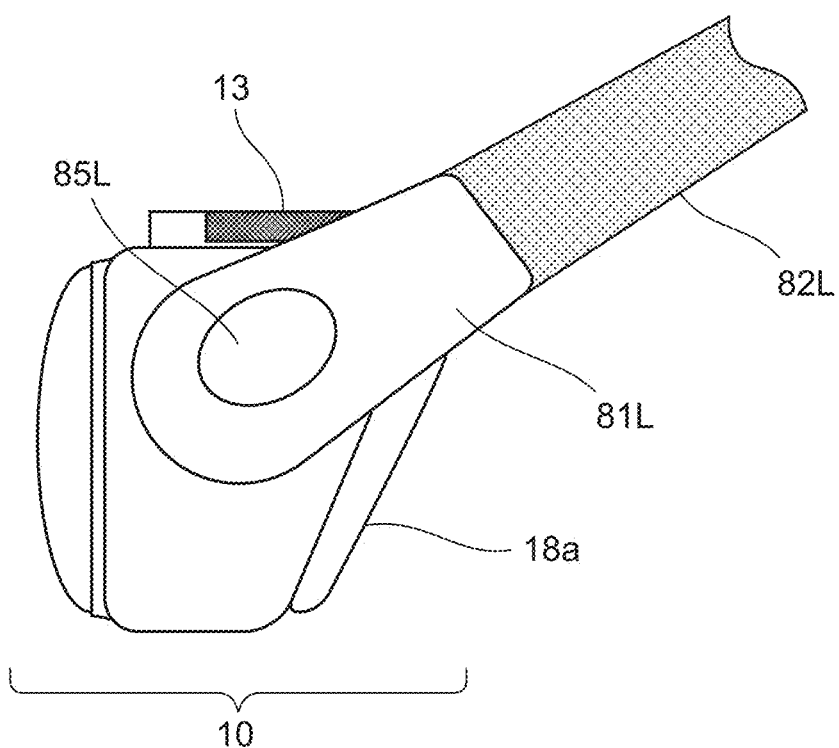
FIG. 2F is a view showing a state where a user wears the camera body viewed from a left side of the user.

FIG. 2F is a view showing a state where a user wears the camera body 1 viewed from the left side of the user. An angle adjustment button 85L is provided in the angle holding member 81L and is used in adjusting the angle of the image-pickup/detection unit 10. An angle adjustment button (not shown in FIG. 2F) is provided in the opposite angle holding member 81R in the symmetrical position of the angle adjustment button 85L. Although the angle adjustment buttons are actually visible in FIG. 2A, FIG. 2C, and FIG. 2D, they are omitted to simplify the description.

When moving the angle holding member 81L upwardly or downwardly in FIG. 2F while pressing the angle adjustment button 85L, the user can change the angle between the image-pickup/detection unit 10 and the angle holding member 81L. The right side is the same as the left side. Moreover, projection angles of the chest contact pads 18a and 18b can be changed. The functions of these two kinds of angle change members (the angle adjustment buttons and chest contact pads) can adjust the image-pickup/detection unit 10 so as to keep the optical axis of the image pickup lens 16 horizontally irrespective of individual difference of a chest position shape.

Figure 3A:
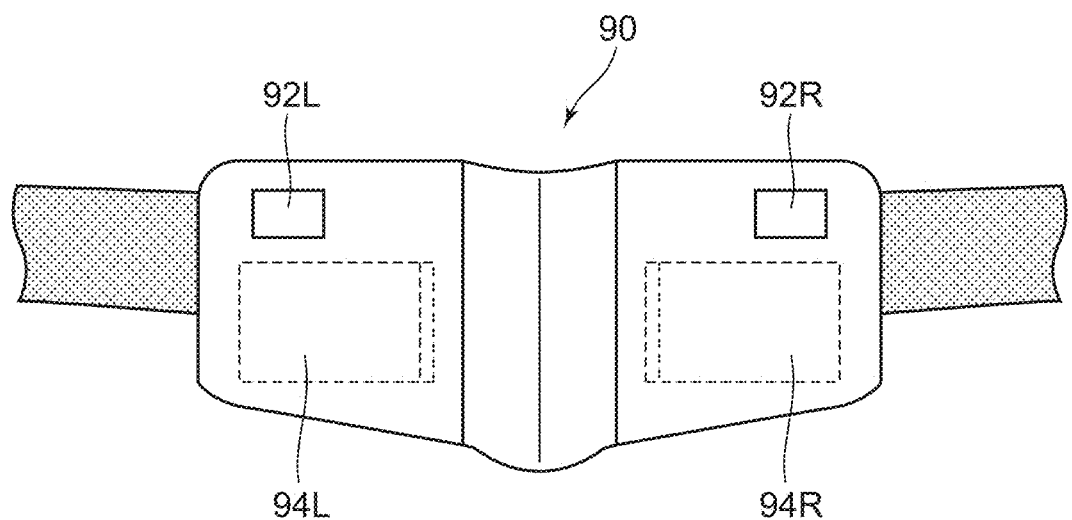
FIG. 3A, FIG. 3B, and FIG. 3C are views showing details of the battery unit.
Figure 3B:
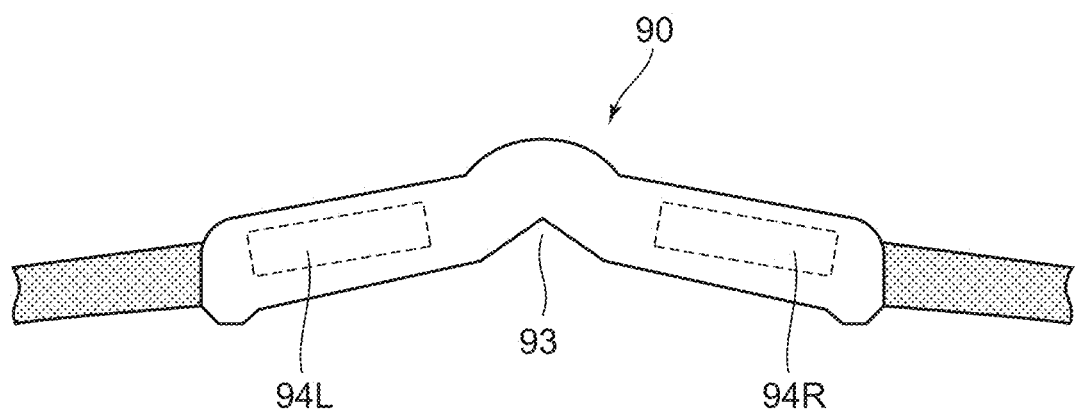
Figure 3C:
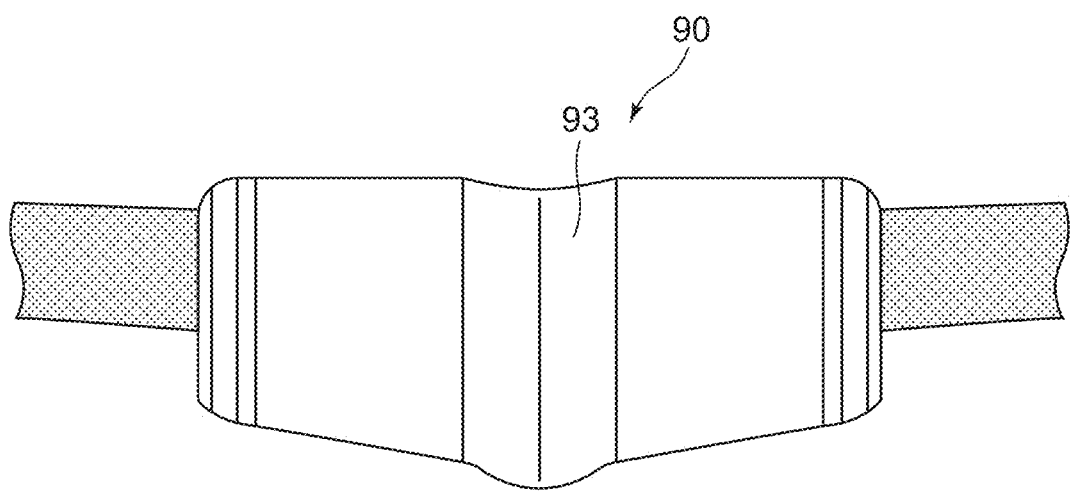

FIG. 3A, FIG. 3B, and FIG. 3C are views showing details of the battery unit 90. FIG. 3A is a partially transparent back view showing the battery unit 90.

As shown in FIG. 3A, the left battery 94L and right battery 94R are symmetrically mounted inside the battery unit 90 in order to keep weight balance. In this way, since the left and right batteries 94L and 94R are arranged symmetrically with the central part of the battery unit 90, the weight balance in the left-and-right direction is achieved and the position displacement of the camera body 1 is prevented. It should be noted that the battery unit 90 may mount a single battery.

FIG. 3B is a top view showing the battery unit 90. The batteries 94L and 94R are shown as the transparent members also in FIG. 3B. As in FIG. 3B, since the batteries 94L and 94R are symmetrically arranged at both the sides of the backbone escape cutout 93, the burden of weight of the battery unit 90 on the user can be reduced.

FIG. 3C is a rear view showing the battery unit 90. FIG. 3C is the view viewed from the side touched to the user's body, i.e., is the view viewed from the opposite side of FIG. 3A. As shown in FIG. 3C, the backbone escape cutout 93 is provided in the center along the backbone of the user.

Figure 4:
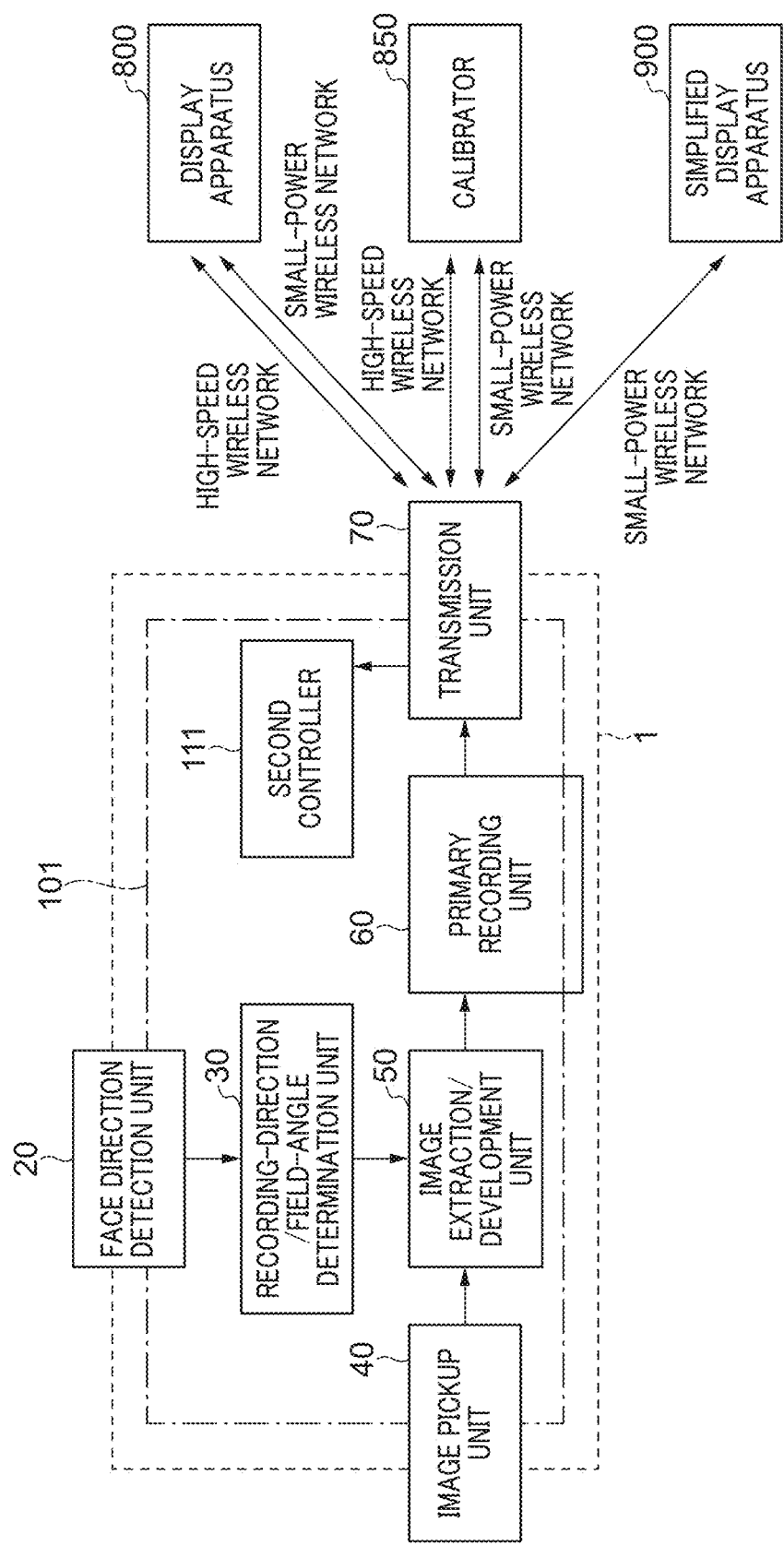
FIG. 4 is a functional block diagram showing the camera body according to one or more aspects of the present disclosure.

FIG. 4 is a functional block diagram showing the camera body 1. Hereinafter, the process executed by the camera body 1 will be described roughly using FIG. 4. Details will be mentioned later.

As shown in FIG. 4, the camera body 1 is provided with the face direction detection unit 20, a recording-direction/field-angle determination unit 30, the image pickup unit 40, an image extraction/development unit 50, a primary recording unit 60, a transmission unit 70, and a second controller 111. These functional blocks are achieved by control of an overall control CPU 101 (FIG. 5) that controls the entire camera body 1.

The face direction detection unit 20 (an observation direction detection unit) is a functional block executed by the above-mentioned infrared LEDs 22, the infrared detection device 27, etc. The face direction detection unit 20 estimates an observation direction by detecting the face direction and passes the observation direction to the recording-direction/field-angle determination unit 30.

The recording-direction/field-angle determination unit (a recording direction determination unit) 30 determines information about a position and an area of an image that will be extracted from image pickup data output from the image pickup unit 40 by performing various calculations on the basis of the observation direction estimated by the face direction detection unit 20. And then, the information is passed to the image extraction/development unit 50.

The image pickup unit 40 is constituted by an image pickup driver 41, a solid state image sensor 42, an image signal processing circuit 43 (FIG. 5), etc. which are mentioned later. In the image pickup unit 40, a light beam from an object is imaged on the solid state image sensor 42, and a signal obtained by photoelectric conversion is output to the image signal processing circuit 43. Then, the image signal processing circuit 43 generates picked-up image data on the basis of the signal from the solid state image sensor 42, and passes the picked-up image data to the image extraction/development unit 50.

The image extraction/development unit (a development unit) 50 extracts image data that the user looks at from the picked-up image data passed from the image pickup unit 40 by using the information passed from the recording-direction/field-angle determination unit 30. Then, the image extraction/development unit 50 develops the extracted image and passes the developed image to the primary recording unit 60.

The primary recording unit 60 is a functional block constituted by a primary memory 103 (FIG. 5) etc., records the image data, and passes it to the transmission unit 70 at a required timing.

The transmission unit 70 is wirelessly connected with predetermined communication parties, such as the display apparatus 800 (FIG. 1D), a calibrator 850, and a simplified display apparatus 900, and communicates with these parties.

The display apparatus 800 is connectable to the transmission unit 70 through a high-speed wireless LAN (hereinafter referred to as a "high-speed wireless network"). In this embodiment, the high-speed wireless network employs wireless communication corresponding to the IEEE802.11ax (WiFi 6) standard. In the meantime, wireless communication corresponding to other standards, such as the WiFi 4 standard and the WiFi 5 standard, may be employed. Moreover, the display apparatus 800 may be a dedicated apparatus developed for the camera body 1 or may be a general smart phone, a tablet terminal, etc.

In addition, the display apparatus 800 may be connected to the transmission unit 70 through a small-power wireless network, may be connected through both the high-speed wireless network and small-power wireless network, or may be connected while switching the networks. In this embodiment, large amount data is transmitted through the high-speed wireless network, and small amount data and data that does not need quick transmission are transmitted through the small-power wireless network. Although the Bluetooth (registered trademark) is used for the small-power wireless network in this embodiment, other short-distance wireless communications, such as the NFC (Near Field Communication), may be employed.

The calibrator 850 performs initial setting and individual setting of the camera body 1, and is connectable to the transmission unit 70 through the high-speed wireless network in the same manner as the display apparatus 800. Details of the calibrator 850 are mentioned later. Moreover, the display apparatus 800 may have the function of the calibrator 850.

The simplified display apparatus 900 is connectable to the transmission unit 70 only through the small-power wireless network, for example. Although the simplified display apparatus 900 cannot communicate large amount data with the transmission unit 70 due to time restriction, it can transmit an image pickup start/stop timing and can be used for an image check of a composition check level. Moreover, the simplified display apparatus 900 may be a dedicated apparatus developed for the camera body 1 as well as the display apparatus 800 or may be a smart watch etc.

Figure 5:
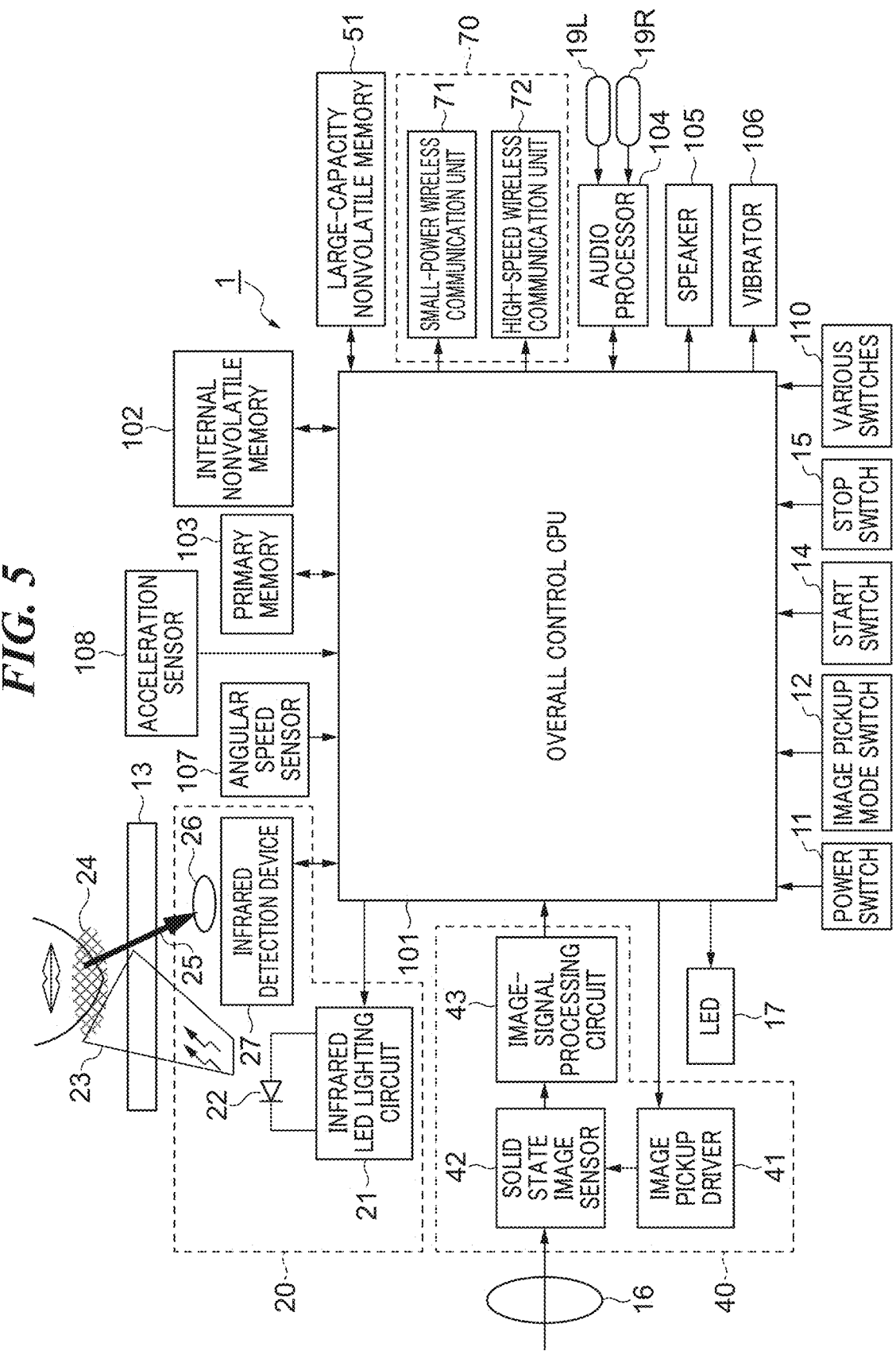
FIG. 5 is a block diagram showing a hardware configuration of the camera body according to one or more aspects of the present disclosure.

FIG. 5 is a block diagram showing a hardware configuration of the camera body 1. Moreover, the configurations and functions described using FIG. 1A through FIG. 1C are indicated by the same reference numerals and their detailed descriptions will be omitted.

As shown in FIG. 5, the camera body 1 is provided with the overall control CPU 101, power switch 11, image pickup mode switch 12, face direction detection window 13, start switch 14, stop switch 15, image pickup lens 16, and LED 17.

The camera body 1 is further provided with the infrared LED lighting circuit 21, infrared LEDs 22, infrared condenser lens 26, and infrared detection device 27 that constitute the face direction detection unit 20 (FIG. 4).

Moreover, the camera body 1 is provided with the image pickup unit 40 (FIG. 5) and the transmission unit 70 (FIG. 5) that consists of a small-power wireless communication unit 71 and high-speed wireless communication unit 72.

The image pickup unit 40 is provided with an image pickup driver 41, a solid state image sensor 42, an image signal processing circuit 43, etc. The image pickup driver 41 includes a timing generator etc., generates various timing signals, outputs the timing signals to sections related to the image pickup operation, and drives the solid state image sensor 42. The solid state image sensor 42 outputs the signal obtained by photoelectric conversion of the object image formed through the image pickup lens 16 described using FIG. 1A to the image signal processing circuit 43. The image signal processing circuit 43 outputs picked-up image data, which is generated by applying a clamp process and an A/D conversion process, etc. to the signal from the solid state image sensor 42, to the overall control CPU 101.

Although the camera body 1 has the single image pickup unit 40 in this embodiment, it may have two or more image pickup units in order to pick up a 3D image, to pick up an image of which a field angle is wider than an image obtained by a single image pickup unit, or to pick up images in different directions.

The camera body 1 is provided with various memories, such as a large-capacity nonvolatile memory 51, an internal nonvolatile memory 102, the primary memory 103, etc.

Furthermore, the camera body 1 is provided with an audio processor 104, a speaker 105, a vibrator 106, an angular speed sensor 107, an acceleration sensor 108, and various switches 110.

The switches like the power switch 11, which are described above using FIG. 2C, are connected to the overall control CPU 101. The overall control CPU 101 controls the entire camera body 1. The recording-direction/field-angle determination unit 30, image extraction/development unit 50, and second controller 111 in FIG. 4 are achieved by the overall control CPU 101.

The infrared LED lighting circuit 21 controls lighting of the infrared LEDs 22 described above using FIG. 2E to control projection of the infrared light 23 directed to the user from the infrared LEDs 22.

The face direction detection window 13 is constituted by a visible light cut filter that hardly permits transmission of visible light and sufficiently permits transmission of the infrared light 23 and its reflected light 25 that belong to infrared region.

The infrared condenser lens 26 condenses the reflected light 25.

The infrared detection device (an infrared detection unit) 27 has a sensor that detects the reflected light 25 condensed by the infrared condenser lens 26. The sensor converts an image formed by the condensed reflected light 25 into sensor data and passes the sensor data to the overall control CPU 101.

As shown in FIG. 1B, when the user wears the camera body 1, the face direction detection window 13 is located under a user's jaw. Accordingly, as shown in FIG. 5, the infrared light 23 projected from the infrared LEDs 22 transmits the face direction detection window 13 and irradiates an infrared irradiation surface 24 near the user's jaw. Moreover, the reflected light 25 reflected from the infrared irradiation surface 24 transmits the face direction detection window 13 and is condensed by the infrared condenser lens 26 onto the sensor in the infrared detection device 27.

The various switches 110 are not shown in FIG. 1A through FIG. 1C. Although omitted for details, the various switches 110 are used to execute functions that are unrelated to this embodiment.

The internal nonvolatile memory 102 is constituted by a flash memory etc. and stores a boot program of the overall control CPU 101 and set values of various program modes. In this embodiment, a set value of an observation visual field (field angle) and a set value of an effect level of an image stabilization process are recorded.

The primary memory 103 is constituted by a RAM etc. and temporarily stores processing image data and a calculation result of the overall control CPU 101.

The large-capacity nonvolatile memory 51 stores image data. In this embodiment, the large-capacity nonvolatile memory 51 is a semiconductor memory that is not detachable. However, the large-capacity nonvolatile memory 51 may be constituted by a detachable storage medium like an SD card, and may be used together with the internal nonvolatile memory 102.

The small-power wireless communication unit 71 exchanges data with the display apparatus 800, the calibrator 850, and the simplified display apparatus 900 through the small-power wireless network. The high-speed wireless communication unit 72 exchanges data with the display apparatus 800 and the calibrator 850 through the high-speed wireless network.

The audio processor 104 processes outside sound (analog signals) collected by the left microphone 19L and right microphone 19R and generates an audio signal.

The LED 17, speaker 105, and vibrator 106 are warning members that warn the user by emitting light, uttering sound, and vibrating. Using these warning members, the user is notified of the state of the camera body 1 or receives warning.

The angular speed sensor 107 uses a gyro etc. and detects movement of the camera body 1 itself as gyro data. The acceleration sensor 108 detects the posture of the image-pickup/detection unit 10.

Figure 6:
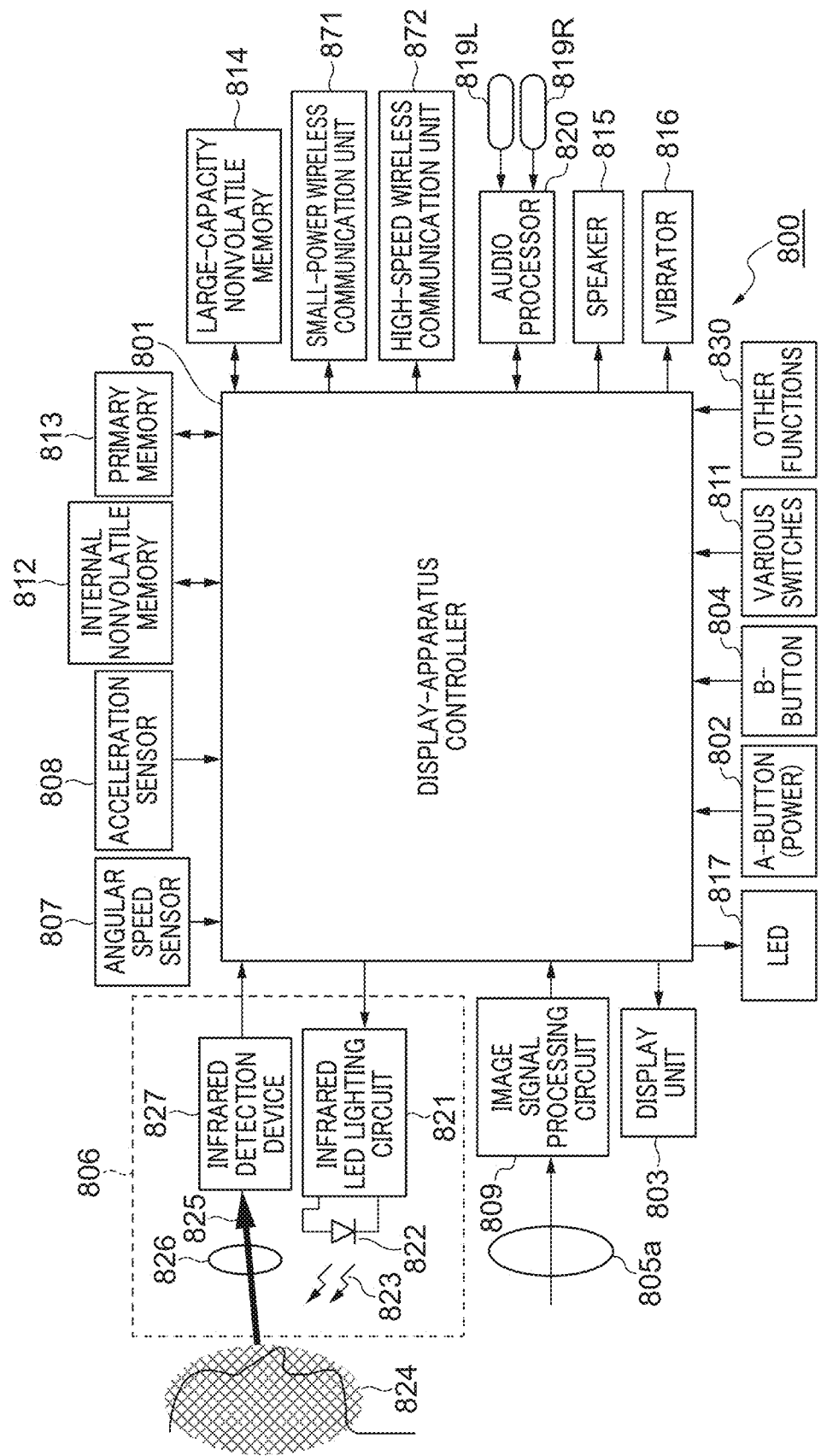
FIG. 6 is a block diagram showing a hardware configuration of the display apparatus.

FIG. 6 is a block diagram showing a hardware configuration of the display apparatus 800. The components that have been described using FIG. 1D are indicated by the same reference numerals and their descriptions will be omitted to simplify the description.

As shown in FIG. 6, the display apparatus 800 is provided with a display-apparatus controller 801, the A-button 802, the display unit 803, the B-button 804, the in-camera 805, the face sensor 806, the angular speed sensor 807, the acceleration sensor 808, an image signal processing circuit 809, and various switches 811.

Moreover, the display apparatus 800 is provided with an internal nonvolatile memory 812, a primary memory 813, a large-capacity nonvolatile memory 814, a speaker 815, a vibrator 816, an LED 817, an audio processor 820, a small-power wireless communication unit 871, and a high-speed wireless communication unit 872. The above-mentioned components are connected to the display-apparatus controller 801. The display-apparatus controller 801 is constituted by a CPU and controls the display apparatus 800.

The image signal processing circuit 809 bears equivalent functions with the image pickup driver 41, solid state image sensor 42, and image signal processing circuit 43 inside the camera body 1. The image signal processing circuit 809 constitutes the in-camera 805 in FIG. 1D together with an in-camera lens 805a. The display-apparatus controller 801 processes the data output from the image signal processing circuit 809. The contents of the process of the data will be mentioned later.

The various switches 811 are used to execute functions that are unrelated to this embodiment. The angular speed sensor 807 uses a gyro etc. and detects movement of the display apparatus 800.

The acceleration sensor 808 detects a posture of the display apparatus 800 itself. The angular speed sensor 807 and the acceleration sensor 808 are built in the display apparatus 800, and respectively have the functions equivalent to that of the above-mentioned angular speed sensor 107 and acceleration sensor 108 of the camera body 1.

The internal nonvolatile memory 812 is constituted by a flash memory etc. and stores a boot program of the display-apparatus controller 801 and set values of various program modes.

The primary memory 813 is constituted by a RAM etc. and temporarily stores processing image data and a calculation result of the image signal processing circuit 809.

The large-capacity nonvolatile memory 814 stores image data of the display apparatus 800. In this embodiment, the large-capacity nonvolatile memory 814 is constituted by a detachable memory like an SD card. It should be noted that the large-capacity nonvolatile memory 814 may be constituted by a fixed memory as with the large-capacity nonvolatile memory 51 in the camera body 1.

In order to notify the user of a state of the display apparatus 800 and to warn the user, the speaker 815 outputs sound, the vibrator 816 vibrates, and the LED 817 emits light.

The audio processor 820 processes outside sound (analog signals) collected by the left microphone 819L and right microphone 819R and generates an audio signal.

The small-power wireless communication unit 871 exchanges data with the camera body 1 through the small-power wireless network. The high-speed wireless communication unit 872 exchanges data with the camera body 1 through the high-speed wireless network.

The face sensor (a face detection unit) 806 is provided with an infrared LED lighting circuit 821 and infrared LEDs 822, an infrared condenser lens 826, and an infrared detection device 827.

The infrared LED lighting circuit 821 has the function equivalent to that of the infrared LED lighting circuit 21 in FIG. 5 and controls lighting of the infrared LEDs 822 to control projection of the infrared light 823 directed to the user from the infrared LEDs 822. The infrared condenser lens 826 condenses the reflected light 825 of the infrared light 823.

The infrared detection device 827 has a sensor that detects the reflected light 825 condensed by the infrared condenser lens 826. The sensor converts the condensed reflected light 825 into sensor data and passes the sensor data to the display-apparatus controller 801.

When the face sensor 806 shown in FIG. 1D is directed to the user, an infrared irradiation surface 824 that is the entire face of the user is irradiated with the infrared light 823 projected from the infrared LEDs 822 as shown in FIG. 6. Moreover, the reflected light 825 reflected from the infrared irradiation surface 824 is condensed by the infrared condenser lens 826 onto the sensor in the detection device 827.

Other functions 830 are functions of a smart phone, such as a telephone function, that are not related to the embodiment.

Figure 7A:
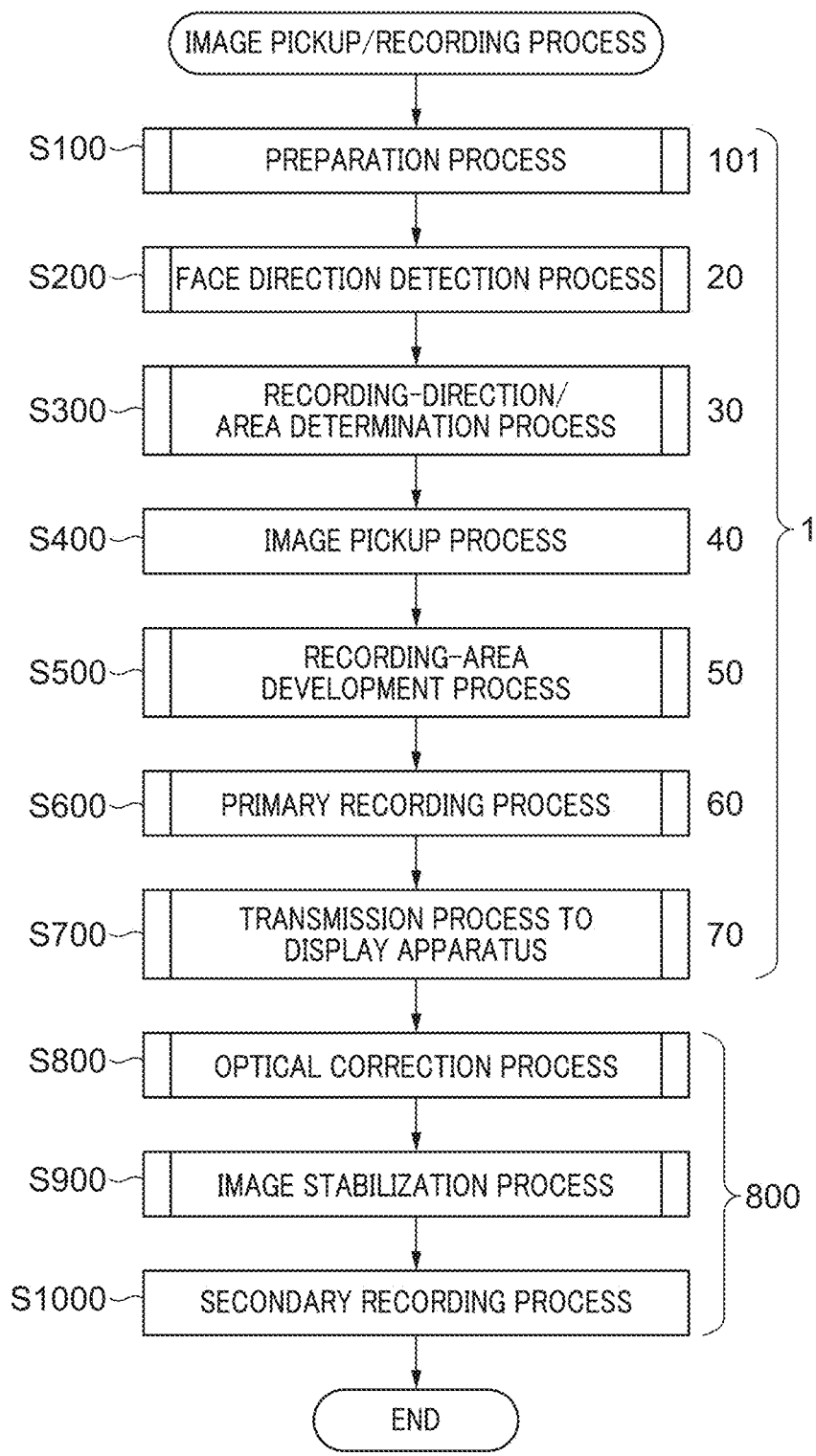
FIG. 7A is a flowchart schematically showing an image pickup/recording process according to one or more aspects of the present disclosure executed by the camera body and display apparatus.

Hereinafter, how to use the camera body 1 and display apparatus 800 will be described. FIG. 7A is a flowchart schematically showing an image pickup/recording process according to the first embodiment executed by the camera body 1 and display apparatus 800.

In order to assist the description, a reference numeral shown in FIG. 4 and FIG. 5 of a unit that executes a process in each step is shown on a right side of each step in FIG. 7A. That is, steps S100 through S700 in FIG. 7A are executed by the camera body 1, and steps S800 through S1000 in FIG. 7A are executed by the display apparatus 800.

When the power switch 11 is set to ON and power of the camera body 1 turns ON, the overall control CPU 101 is activated and reads the boot program from the internal nonvolatile memory 102. After that, in the step S100, the overall control CPU 101 executes a preparation process that performs setting of the camera body 1 before an image pickup operation. Details of the preparation process will be mentioned later using FIG. 7B.

In a step S200, the face direction detection process that estimates an observation direction based on a face direction detected by the face direction detection unit 20 is executed. Details of the face direction detection process will be mentioned later using FIG. 7C. This process is executed at a predetermined frame rate.

In a step S300, the recording-direction/field-angle determination unit 30 executes a recording-direction/area determination process. Details of the recording-direction/area determination process will be mentioned later using FIG. 7D.

In a step S400, the image pickup unit 40 picks up an image and generates pickup image data.

In the step S500, the image extraction/development unit 50 extracts an image from the pickup image data generated in the step S400 according to the recording-direction/field-angle information determined in the step S300 and performs a recording area development process that develops the extracted area. Details of the development process will be mentioned later using FIG. 7E.

In a step S600, the primary recording unit (an image recording unit) 60 executes a primary recording process that stores the data developed in the step S500 into the primary memory 103 as image data. Details of the primary recording process will be mentioned later using FIG. 14.

In the step S700, the transmission unit 70 executes a transmission process to the display apparatus 800 that wirelessly transmits the image data primarily recorded in the step S600 to the display apparatus 800 at a designated timing. Details of the transmission process to the display apparatus 800 will be mentioned later using FIG. 16.

The steps from the step S800 are executed by the display apparatus 800. In the step S800, the display-apparatus controller 801 executes an optical correction process that corrects optical aberration of the image transferred from the camera body 1 in the step S700. Details of the optical correction process will be mentioned later using FIG. 17.

In a step S900, the display-apparatus controller 801 applies the image stabilization process to the image of which the optical aberration has been corrected in the step S800. Details of the image stabilization process will be mentioned later using FIG. 19. It should be noted that the order of the step S800 and the step S900 may be inverted. That is, the image stabilization process may be executed in advance and the optical correction process may be executed after that.

In a step S1000, the display-apparatus controller (video recording unit) 801 executes a secondary recording process that records the image to which the optical correction process in the step S800 and the image stabilization process in the step S900 have been applied into the large-capacity nonvolatile memory 814. And then, the display-apparatus controller 801 finishes this process.

Figure 7B:
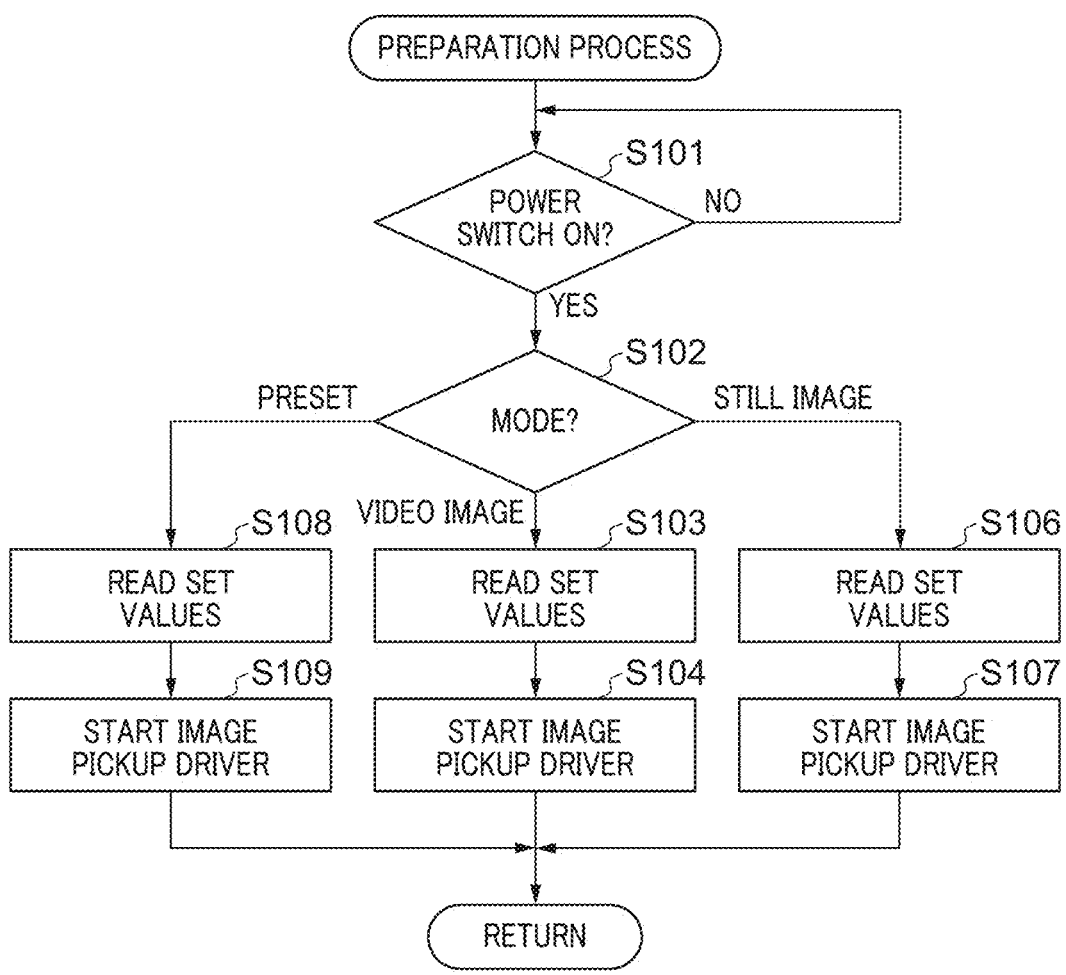
FIG. 7B is a flowchart showing a subroutine of a preparation process in a step S100 in FIG. 7A according to one or more aspects of the present disclosure.

Next, the subroutines in the respective steps in FIG. 7A will be described in detail using FIG. 7B through FIG. 7F and other drawings in the order of the processes. FIG. 7B is a flowchart showing the subroutine of the preparation process in the step S100 in FIG. 7A. Hereinafter, this process is described using the components shown in FIG. 2A through FIG. 2F and FIG. 5.

It is determined whether the power switch 11 is ON in a step S101. The process waits when the power is OFF. When the power becomes ON, the process proceeds to a step S102.

In the step S102, the mode selected by the image pickup mode switch 12 is determined. As a result of the determination, when the mode selected by the image pickup mode switch 12 is the video image mode, the process proceeds to a step S103.

In the step S103, various set values of the video image mode are read from the internal nonvolatile memory 102 and are stored into the primary memory 103. Then, the process proceeds to a step S104. The various set values of the video image mode include a field-angle set value $V_{ang}$ and an image stabilization level. The field-angle set value $V_{ang}$ is preset to 90° in this embodiment. The image stabilization level is selected from among "Strong", "Middle", and "OFF". In the step S104, an operation of the image pickup driver 41 for the video image mode is started. And then, the process exits from this subroutine.

As a result of the determination in the step S102, when the mode selected by the image pickup mode switch 12 is the still image mode, the process proceeds to a step S106. In the step S106, various set values of the still image mode are read from the internal nonvolatile memory 102 and are stored into the primary memory 103. Then, the process proceeds to a step S107. The various set values of the still image mode include the field-angle set value $V_{ang}$ and the image stabilization level. The field-angle set value $V_{ang}$ is preset to 45° in this embodiment. The image stabilization level is selected from among "Strong", "Middle", and "OFF". In the step S107, an operation of the image pickup driver 41 for the still image mode is started. And then, the process exits from this subroutine.

As the result of the determination in the step S102, when the mode selected by the image pickup mode switch 12 is the preset mode, the process proceeds to a step S108. The preset mode is third mode in addition to the video image mode and still image mode. In the preset mode, the image pickup mode of the camera body 1 can be set by an external device like the display apparatus 800. The preset mode is a mode for a custom image pickup operation.

The contents of the preset mode may include the image stabilization level, which is selected from among "Strong", "Middle", and "OFF", and a set value of voice recognition that is not described in this embodiment in addition to the field angle.

In the step S108, various set values of the preset mode are read from the internal nonvolatile memory 102 and are stored into the primary memory 103. Then, the process proceeds to a step S109. The various set values of the preset mode include the field-angle set value $V_{ang}$ and the image stabilization level that is selected from among "Strong", "Middle", and "OFF".

In the step S109, an operation of the image pickup driver 41 for the preset mode is started. And then, the process exits from this subroutine.

Figure 13:
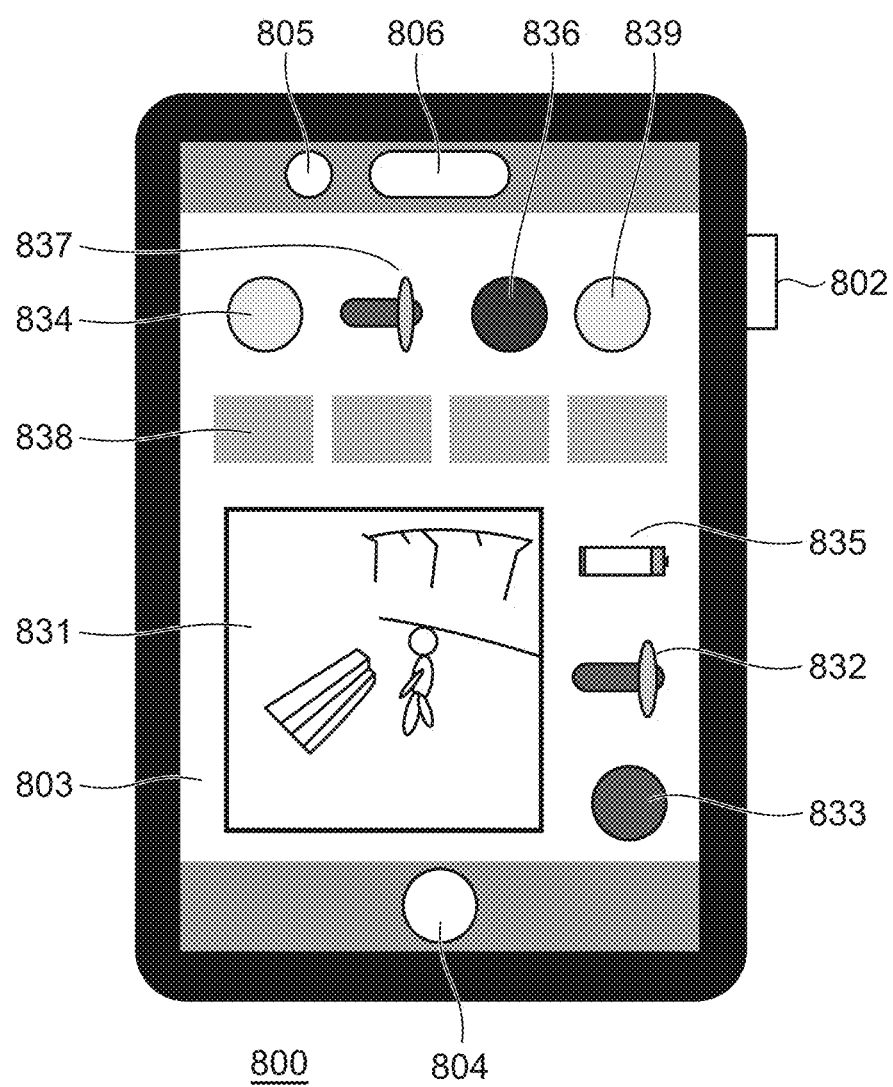
FIG. 13 is a view showing a menu screen for setting various set values of the video image mode that is displayed on a display unit of the display apparatus before an image pickup operation of the camera body.

Hereinafter, the various set values of the video image mode read in the step S103 will be described using FIG. 13. FIG. 13 is a view showing a menu screen for setting the various set values of the video image mode that is displayed on the display unit 803 of the display apparatus 800 before an image pickup operation of the camera body 1. The components that have been described using FIG. 1D are indicated by the same reference numerals and their descriptions will be omitted. The display unit 803 has a touch panel function and will be described under the presumption that it functions by touch operations, such as a swipe operation.

As shown in FIG. 13, the menu screen includes a preview screen 831, a zoom lever 832, a recording start/stop button 833, a switch 834, a battery level indicator 835, a button 836, a lever 837, and an icon display area 838. The user can check the image picked up by the camera body 1, a zoom amount, and a field angle on the preview screen 831.

The user can change a zoom setting by shifting the zoom lever 832 rightward or leftward. This embodiment describes a case where the field-angle set value $V_{ang}$ can be selected from among 45°, 90°, 110°, and 130°. In the meantime, the field-angle set value $V_{ang}$ may be set to a value other than the four values by operating the zoom lever 832.

The recording start/stop button 833 is a toggle switch that has both of the functions of the start switch 14 and the stop switch 15. The switch 834 is used to switch "OFF" and "ON" of the image stabilization process. The battery level indicator 835 displays battery level of the camera body 1. The button 836 is used to change a mode.

The lever 837 is used to set the image stabilization level. Although the image stabilization level can be set to "Strong" or "Middle" in this embodiment, another image stabilization level, for example "Weak", may be set. Moreover, the image stabilization level may be set steplessly. A plurality of thumbnail icons for preview are displayed in the icon display area 838.

Figure 7C:
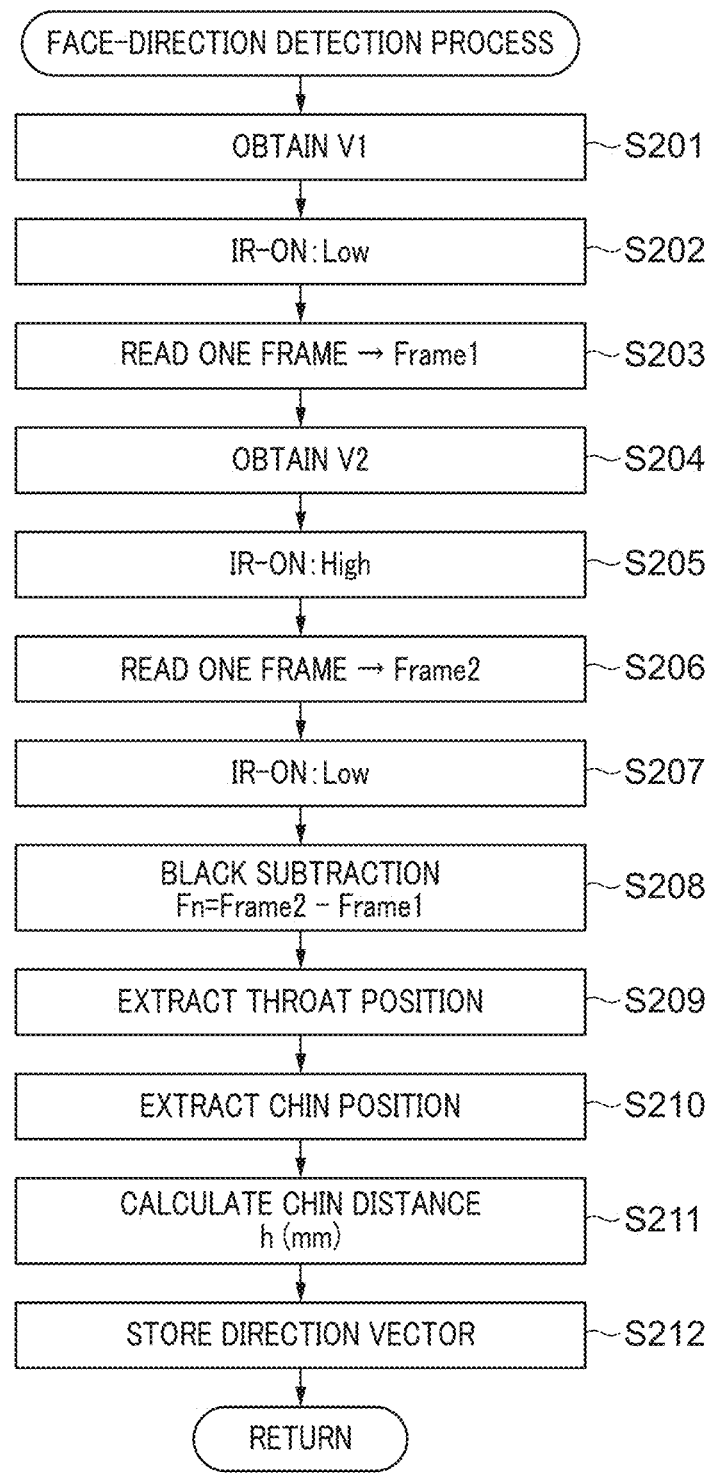
FIG. 7C is a flowchart showing a subroutine of a face direction detection process in a step S200 in FIG. 7A according to one or more aspects of the present disclosure.

FIG. 7C is a flowchart showing a subroutine of the face direction detection process in the step S200 in FIG. 7A. Before describing the details of this process, a face direction detection method using infrared light will be described using FIG. 8A through FIG. 8K.

Figure 8A:
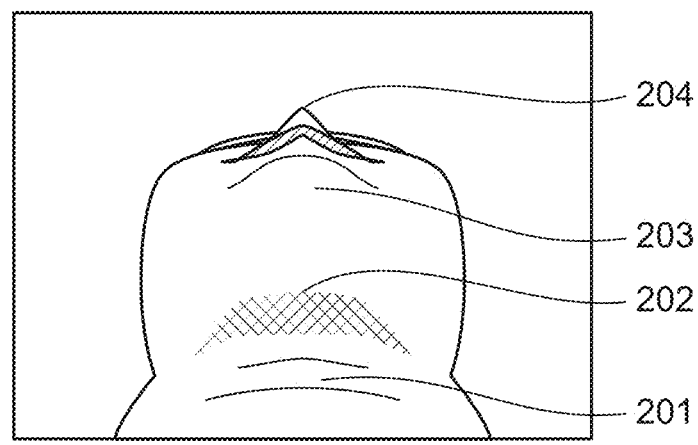
FIG. 8A is a view showing an image of a user viewed from the face direction detection window.

FIG. 8A is a view showing a visible light image of a user's face looked at from the position of the face direction detection window 13. The image in FIG. 8A is identical to an image picked up by a visible-light image sensor on the assumption that the face direction detection window 13 permits transmission of visible light and that the visible-light image sensor is mounted as a sensor of the infrared detection device 27.

Figure 8B:
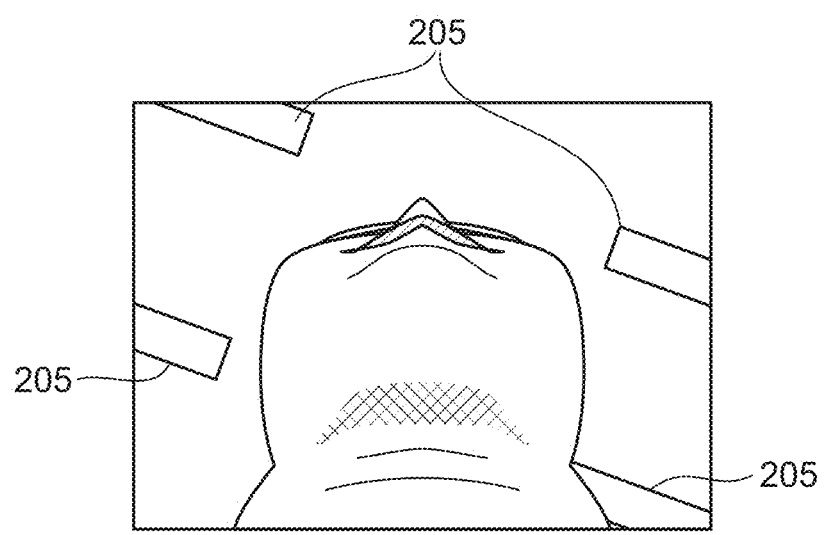
FIG. 8B is a view showing a case where fluorescent lamps in a room appear as background in the image of the user viewed from the face direction detection window.

The image in FIG. 8A includes a neck front part 201 above clavicles of the user, a root 202 of a jaw, a chin 203, and a face 204 including a nose. FIG. 8B is a view showing a case where fluorescent lamps 205 in a room appear as background in the visible-light image of the user shown in FIG. 8A.

The fluorescent lamps 205 around the user appear in the visible-light image in FIG. 8B. In this way, since various backgrounds appear in a user's image according to a use condition, it becomes difficult that the face direction detection unit 20 or the overall control CPU 101 cuts out a face image from a visible-light image. In the meantime, although there is a technique that cuts such an image by using an AI etc., the technique is not suitable for the camera body 1 as a portable device because the overall control CPU 101 is required to have high performance.

Accordingly, the camera body 1 of the first embodiment detects a user's face using an infrared image. Since the face direction detection window 13 is constituted by a visible light cut filter, visible light is not transmitted mostly. Accordingly, an image obtained by the infrared detection device 27 is different from the images in FIG. 8A and FIG. 8B.

Figure 8C:
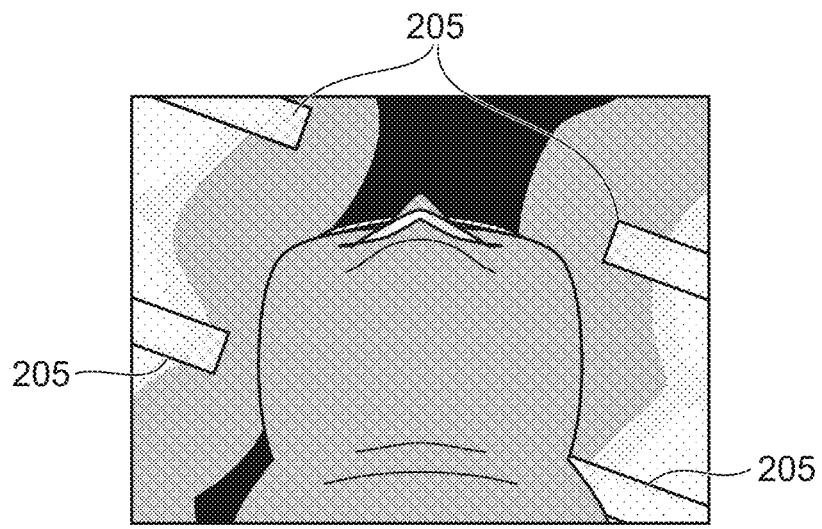
FIG. 8C is a view showing an image obtained by imaging the user and fluorescent lamps as background shown in FIG. 8B onto a sensor of the infrared detection device through the face direction detection window in a state where infrared LEDs of the infrared detection device are not lightened.

FIG. 8C is a view showing an infrared image obtained by imaging the user and the fluorescent lamps as the background shown in FIG. 8B onto the sensor of the infrared detection device 27 through the face direction detection window 13 in a state where the infrared LEDs 22 are not lightened.

In the infrared image in FIG. 8C, the user's neck and jaw are dark. In the meantime, since the fluorescent lamps 205 emit an infrared component in addition to the visible light, they are slightly bright.

Figure 8D:
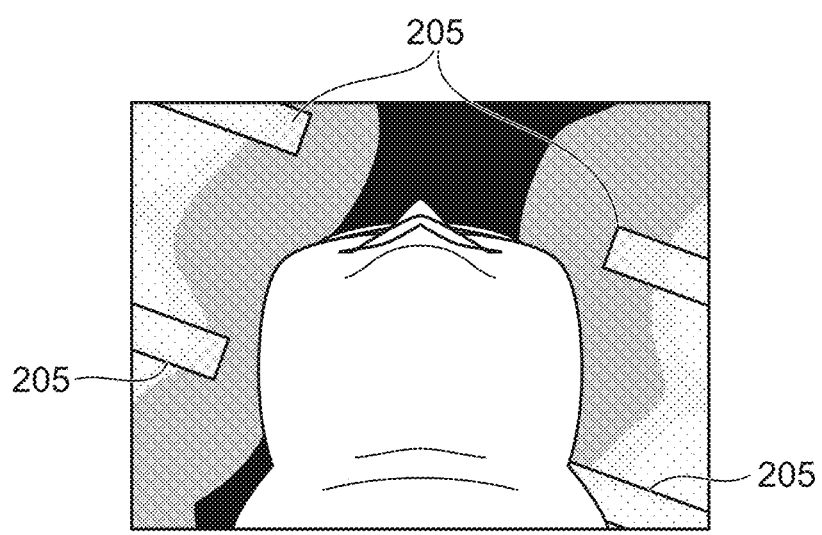
FIG. 8D is a view showing an image obtained by imaging the user and fluorescent lamps as background shown in FIG. 8B onto the sensor of the infrared detection device through the face direction detection window in a state where the infrared LEDs are lightened.

FIG. 8D is a view showing an image obtained by imaging the user and the fluorescent lamps as the background shown in FIG. 8B onto the sensor of the infrared detection device 27 through the face direction detection window 13 in a state where the infrared LEDs 22 are lightened.

In the image in FIG. 8D, the user's neck and jaw are bright because the infrared light is reflected. In the meantime, the brightness around the fluorescent lamps 205 has not changed as compared with FIG. 8C.

Figure 8E:
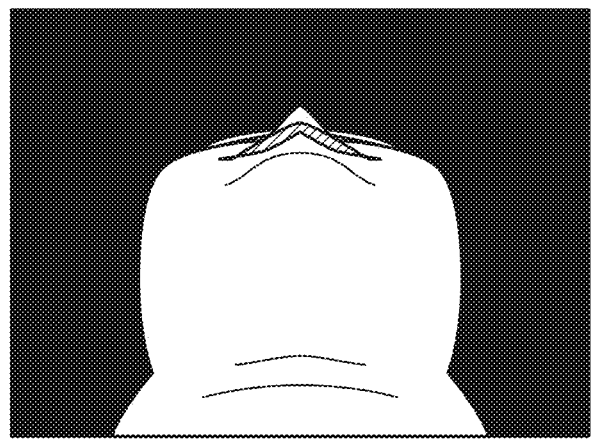
FIG. 8E is a view showing a difference image that is calculated by subtracting the image in FIG. 8C from the image in FIG. 8D.

FIG. 8E is a view showing a difference image that is calculated by subtracting the image in FIG. 8C from the image in FIG. 8D. The user's face emerges.

In this way, the overall control CPU (an image obtainment unit) 101 obtains the difference image (hereinafter referred to as a face image) by calculating the difference between the image formed on the sensor of the infrared detection device 27 in the state where the infrared LEDs 22 are lightened and the image formed on the sensor in the state where the infrared LEDs 22 are not lightened.

The face direction detection unit 20 of this embodiment employs a method that obtains a face image by extracting infrared reflection intensity as a two-dimensional image by the infrared detection device 27. The sensor of the infrared detection device 27 employs a configuration similar to a general image sensor and obtains a face image frame-by-frame. A vertical synchronization signal (hereinafter referred to as a V-signal) that obtains frame synchronization is generated by the infrared detection device 27 and is output to the overall control CPU 101.

Figure 9:
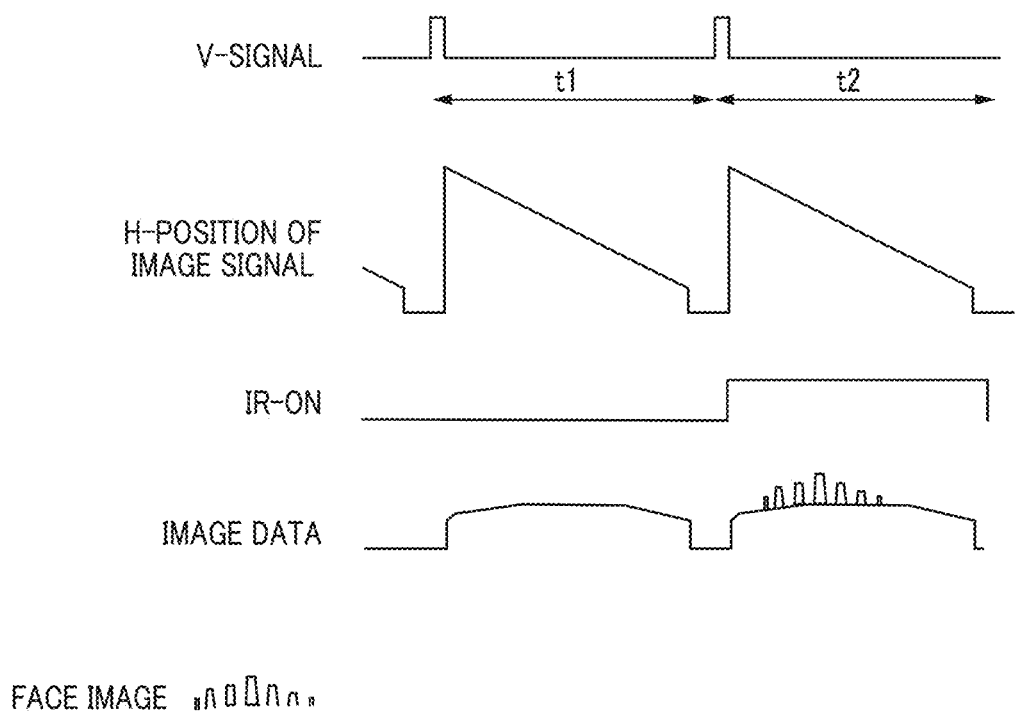
FIG. 9 is a timing chart showing a lighting timing of the infrared LEDs and related signals.

FIG. 9 is a timing chart showing timings of lighting and extinction of the infrared LEDs 22 and related signals.

A V-signal output from the infrared detection device 27, an H-position of the image signal output from the sensor of the infrared detection device 27, an IR-ON signal output to the infrared LED lighting circuit 21 from the overall control CPU 101, and pickup image data output to the overall control CPU 101 from the sensor of the infrared detection device 27 are shown in FIG. 9 in the order from the top. The horizontal time axes of these four signals are identical. When the V-signal becomes High, timings of the frame synchronization and timings of lighting and extinction of the infrared LEDs 22 are obtained.

FIG. 9 shows a first face image obtainment period t1 and a second face image obtainment period t2.

The infrared detection device 27 controls the operation of the sensor so that the H-position of the image signal will synchronize with the V-signal as shown in FIG. 9. Since the sensor of the infrared detection device 27 employs the configuration similar to a general image sensor as mentioned above and its operation is well-known, a detailed description of the control method is omitted.

The overall control CPU 101 controls switching of the IR-ON signal between High and Low in synchronization with the V-signal. Specifically, the overall control CPU 101 outputs the IR-ON signal of Low to the infrared LED lighting circuit 21 during the period t1 and outputs the IR-ON signal of High to the infrared LED lighting circuit 21 during the second period t2.

The infrared LED lighting circuit 21 lightens the infrared LEDs 22 to project the infrared light 23 to the user during the High period of the IR-ON signal. In the meantime, the infrared LED lighting circuit 21 extinguishes the infrared LEDs 22 during the Low period of the IR-ON signal.

A vertical axis of the pickup image data indicates a signal intensity that is a light receiving amount of the reflected light 25. Since the infrared LEDs 22 are extinguished during the first period t1, no reflected light comes from the user's face and pickup image data as shown in FIG. 8C is obtained. In the meantime, since the infrared LEDs 22 are lightened during the second period t2, the reflected light 25 comes from the user's face and pickup image data as shown in FIG. 8D is obtained. Accordingly, the signal intensity in the period t2 increases from the signal intensity in the period t1 by the reflected light 25 from the user's face.

A face image indicated in the bottom in FIG. 9 is obtained by subtracting the image data picked up during the first period t1 from the image data picked up during the second period t2. As a result of the subtraction, face image data as shown in FIG. 8E in which only the component of the reflected light 25 from the user's face is extracted is obtained.

FIG. 7C shows the face direction detection process in the step S200 that includes the operations described using FIG. 8C through FIG. 8E and FIG. 9.

In a step S201, a timing V1 at which the first period t1 starts is obtained when the V-signal output from the infrared detection device 27 becomes High. When the timing V1 is obtained, the process proceeds to a step S202.

In a step S202, the IR-ON signal is set to Low and is output to the infrared LED lighting circuit 21. Thereby, the infrared LEDs 22 are extinguished.

In a step S203, one frame of pickup image data output from the infrared detection device 27 during the first period t1 is read. The image data is temporarily stored into the primary memory 103 as Frame1.

In a step S204, a timing V2 at which the second period t2 starts is obtained when the V-signal output from the infrared detection device 27 becomes High. When the timing V2 is obtained, the process proceeds to a step S205.

In the step S205, the IR-ON signal is set to High and is output to the infrared LED lighting circuit 21. Thereby, the infrared LEDs 22 are lightened.

In a step S206, one frame of pickup image data output from the infrared detection device 27 during the second period t2 is read. The image data is temporarily stored into the primary memory 103 as Frame2.

In a step S207, the IR-ON signal is set to Low and is output to the infrared LED lighting circuit 21. Thereby, the infrared LEDs 22 are extinguished.

In a step S208, Frame1 and Frame2 are read from the primary memory 103, and light intensity Fn of the reflected light 25 from the user corresponding to the face image shown in FIG. 9 is calculated by subtracting Frame1 from Frame2. This process is generally called black subtraction.

In a step S209, a throat position (a neck rotation center) is extracted from the light intensity Fn. First, the overall control CPU (a division unit) 101 divides the face image into a plurality of distance areas that will be described using FIG. 8F on the basis of the light intensity Fn.

Figure 8F:
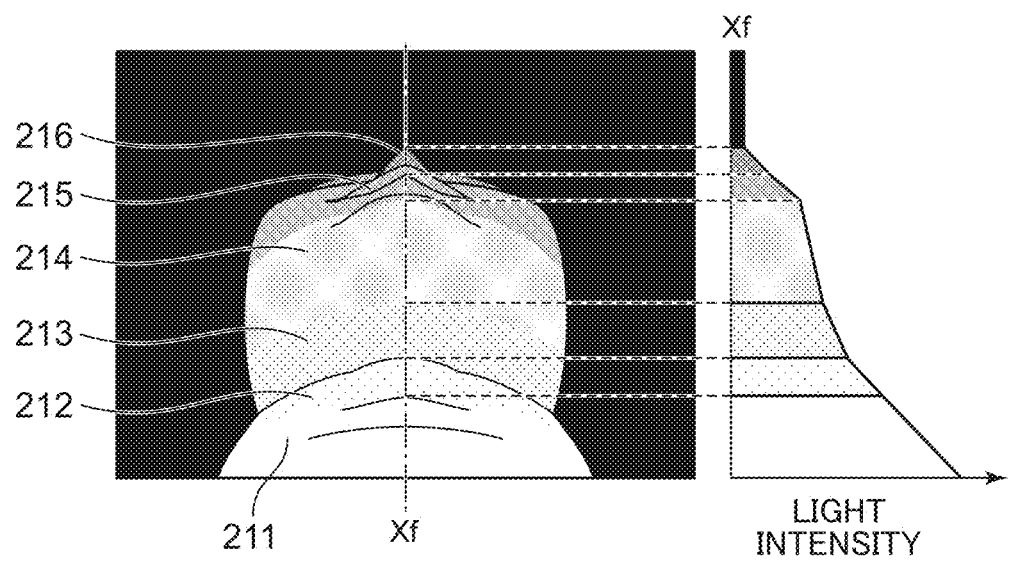
FIG. 8F is a view showing a result obtained by adjusting shades of the difference image in FIG. 8E so as to fit with a scale of light intensities of reflected components of infrared light projected to a face and neck of the user.

FIG. 8F is a view showing a result obtained by adjusting shades of the difference image shown in FIG. 8E so as to fit with a scale of light intensity of the reflected light 25 of the infrared light 23 projected to the face and neck of the user. FIG. 8F shows light intensity distribution about sections of the face and neck of the user.

The face image on the left side in FIG. 8F shows the light intensity distribution of the reflected light 25 in the face image shown in FIG. 8E by gray steps applied to the respective divided areas. An Xf axis is oriented in a direction from the central part of the user's neck toward the chin.

In a graph on the right side in FIG. 8F, a horizontal axis shows the light intensity on the Xf axis of the face image and a vertical axis shows the Xf axis. The light intensity shown by the horizontal axis increases as going rightward.

The face image in FIG. 8F is divided into six areas (distance areas) 211 through 216 according to the light intensity. The area 211 is an area where the light intensity is the strongest and is shown by white among the gray steps. The area 212 is an area where the light intensity falls slightly than the area 211 and is shown by quite bright gray among the gray steps. The area 213 is an area where the light intensity falls still more than the area 212 and is shown by bright gray among the gray steps. The area 214 is an area where the light intensity falls still more than the area 213 and is shown by middle gray among the gray steps. The area 215 is an area where the light intensity falls still more than the area 214 and is shown by slightly dark gray among the gray steps. The area 216 is an area where the light intensity is the weakest and is shown by the darkest gray among the gray steps. The area above the area 216 is shown by black showing no light intensity.

The light intensity will be described in detail using FIG. 10A through FIG. 10D. FIG. 10A through FIG. 10D are views describing movement of the user's face in the vertical direction and show states observed from the left side of the user.

Figure 10A:
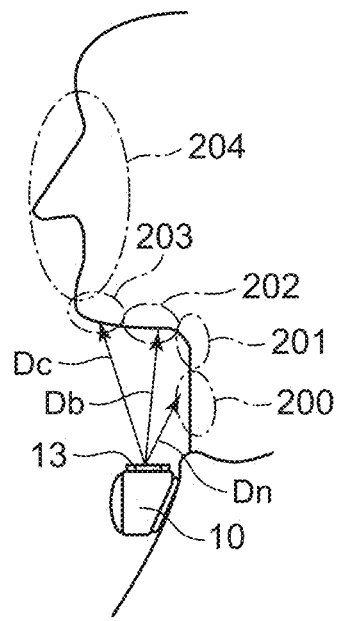
FIG. 10A through FIG. 10D are views describing movements of the user's face in a vertical direction.

FIG. 10A is a view showing a state where the user faces the front. There is the image-pickup/detection unit 10 in front of the clavicles of the user. Moreover, the infrared light 23 of the infrared LEDs 22 irradiates the lower part of the user's head from the face direction detection window 13 mounted in the upper portion of the image-pickup/detection unit 10. A distance Dn from the face direction detection window 13 to the throat 200 above the clavicles of the user, a distance Db from the face direction detection window 13 to the root 202 of the jaw, and a distance Dc from the face direction detection window 13 to the chin 203 satisfy a relation of Dn<Db<Dc. Since light intensity is in inverse proportion to the square of distance, the light intensity in the image formed by the reflected light 25 from the infrared irradiation surface 24 on the sensor becomes gradually weaker in the order of the throat 200, the root 202 of the jaw, and the chin 203. Moreover, since the distance from the face direction detection window 13 to the face 204 including the nose is still longer than the distance Dc, the light intensity in the image corresponding to the face 204 becomes still weaker. That is, in the case as shown in FIG. 10A, the image having the light intensity distribution shown in FIG. 8F is obtained.

It should be noted that the configuration of the face direction detection unit 20 is not limited to the configuration shown in this embodiment as long as the face direction of the user can be detected. For example, an infrared pattern may be projected from the infrared LEDs (an infrared pattern radiation unit) 22, and the sensor (an infrared pattern detection unit) of the infrared detection device 27 may detect the infrared pattern reflected from an irradiation target. Moreover, the sensor of the infrared detection device 27 may be a sensor (an infrared phase comparison unit) that compares the phase of the infrared light 23 and the phase of the reflected light 25. For example, a ToF (Time of Flight) sensor may be employed.

Figure 8G:
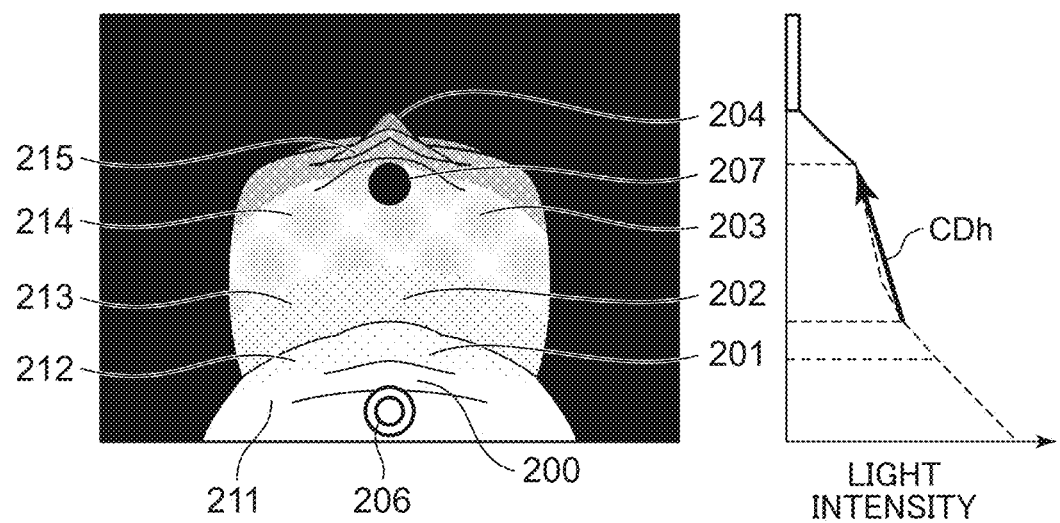
FIG. 8G is a view obtained by superimposing reference numerals denoting parts of a user's body, a double circle showing a throat position, and a black circle showing a chin position on FIG. 8F.

Next, the extraction of the throat position in the step S209 in FIG. 7C will be described using FIG. 8G. A left image in FIG. 8G is obtained by superimposing the reference numerals denoting the parts of the user's body shown in FIG. 10A, a double circle showing the throat position, and a black circle showing the chin position on FIG. 8F.

The white area 211 corresponds to the throat 200 (FIG. 10A), the quite bright gray area 212 corresponds to the neck front part 201 (FIG. 10A), and the bright gray area 213 corresponds to the root 202 of the jaw (FIG. 10A). Moreover, the middle gray area 214 corresponds to the chin 203 (FIG. 10A), and the slightly dark gray area 215 corresponds to a lip located in the lower part of the face 204 (FIG. 10A) and a face lower part around the lip. Furthermore, the darkest gray area 216 corresponds to the nose located in the center of the face 204 (FIG. 10A) and a face upper part around the nose.

Since the difference between the distances Db and Dc is relatively small as compared with the differences between the other distances from the face direction detection window 13 to other parts of the user as shown in FIG. 10A, the difference between the reflected light intensities in the bright gray area 213 and the middle gray area 214 is also small.

In the meantime, since the distance Dn is the shortest distance among the distances from the face direction detection window 13 to the parts of the user as shown in FIG. 10A, the reflection light intensity in the white area 211 corresponding to the throat 200 becomes the strongest.

Accordingly, the overall control CPU (a setting unit) 101 determines that the area 211 corresponds to the throat 200 and its periphery, and then, sets the position 206 (indicated by the double circle in FIG. 8G), which is located at the center in the lateral direction and is the nearest to the image-pickup/detection unit 10, as the position of the head rotation center (hereinafter referred to as a throat position 206). The processes up to the moment are the contents performed in the step S209 in FIG. 7C.

Next, the extraction of the chin position in the step S210 in FIG. 7C will be described using FIG. 8G. In the image in FIG. 8G, the middle gray area 214 that is brighter than the area 215 corresponding to the face lower part including the lip of the face 204 includes the chin. A graph on the right side in FIG. 8G shows that the light intensity falls sharply in the area 215 adjacent to the area 214 because the change rate of the distance from the face direction detection window 13 becomes large.

The overall control CPU 101 determines that the brighter area 214 adjacent to the area 215 in which the light intensity falls sharply is a chin area. Furthermore, the overall control CPU 101 calculates (extracts) the position (indicated by the black circle shown in FIG. 8G), which is located at the center in the lateral direction in the area 214 and is the farthest from the throat position 206, as a chin position 207.

Figure 8H:
FIG. 8H is a view showing a difference image calculated by the similar method as FIG. 8E in directing the user's face to the right.
Figure 8I:
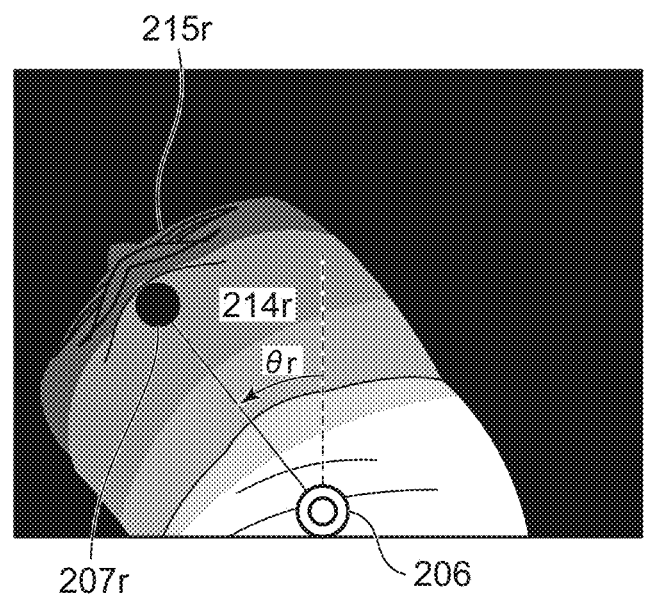
FIG. 8I is a view showing a result obtained by adjusting shades of the difference image in FIG. 8H so as to fit with a scale of light intensities of reflected components of infrared light projected to a face and neck of the user and by superimposing the double circle showing the throat position and the black circle showing the chin position.

For example, FIG. 8H and FIG. 8I show changes in directing the face to the right. FIG. 8H is a view showing a difference image calculated by the similar method as FIG. 8E in directing the user's face to the right. FIG. 8I is a view showing a result obtained by adjusting shades of the difference image in FIG. 8H so as to fit with a scale of light intensities of reflected components of the infrared light projected to the face and neck of the user and by superimposing the double circle showing the throat position 206 as the position of the neck rotation center and the black circle showing a chin position 207r.

Since the user's face is directed to the right, the area 214 moves to an area 214r shown in FIG. 8I that is located in the left side when it is looked up from the image-pickup/detection unit 10. The area 215 corresponding to the face lower part including the lip in the face 204 also moves to an area 215r that is located in the left side when it is looked up from the image-pickup/detection unit 10.

Accordingly, the overall control CPU 101 determines that the brighter area 214r adjacent to the area 215r in which the light intensity falls sharply is the area of the chin 203 (a chin area). Furthermore, the overall control CPU 101 calculates (extracts) the position (indicated by the black circle shown in FIG. 8I), which is located at the center in the lateral direction in the area 214r and is the farthest from the throat position 206, as the chin position 207r.

After that, the overall control CPU 101 finds a moving angle θr that shows the rotational movement to the right from the chin position 207 in the image in FIG. 8G to the chin position 207r in FIG. 8I around the throat position 206. As shown in FIG. 8I, the moving angle θr is an angle of movement of the user's face in the lateral direction.

According to the above-mentioned method, the angle of face (hereinafter, referred to as a face angle) of the user in the lateral direction is calculated in the step S210 from the chin position detected by the infrared detection device 27 of the face direction detection unit (a three-dimensional detection sensor) 20.

Figure 10B:
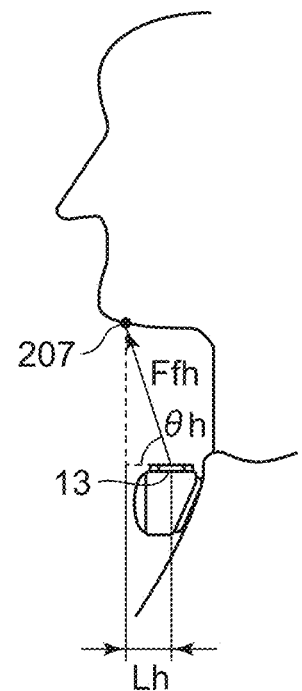
Figure 10C:
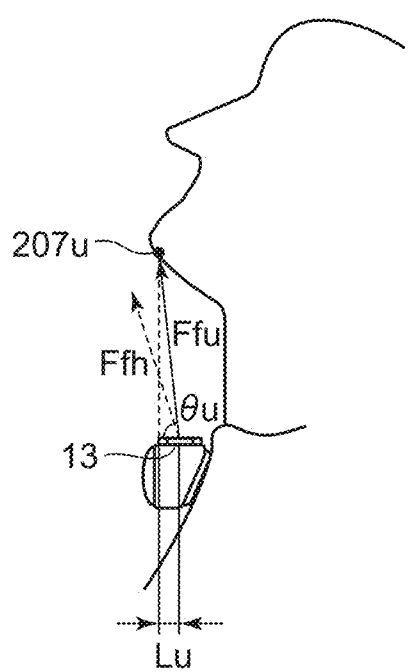

Next, detection of the face directed upward will be described. FIG. 10B is a view showing a state where the user directs the face horizontally. FIG. 10C is a view showing a state where the user directs the face upward by 33° from the horizontal direction.

The distance from the face direction detection window 13 to the chin position 207 is Ffh in FIG. 10B, and the distance from the face direction detection window 13 to a chin position 207u is Ffu in FIG. 10C. Since the chin position 207u moves upwardly together with the face when the user directs the face upward, the distance Ffu becomes longer than the distance Ffh as shown in FIG. 10C.

Figure 8J:
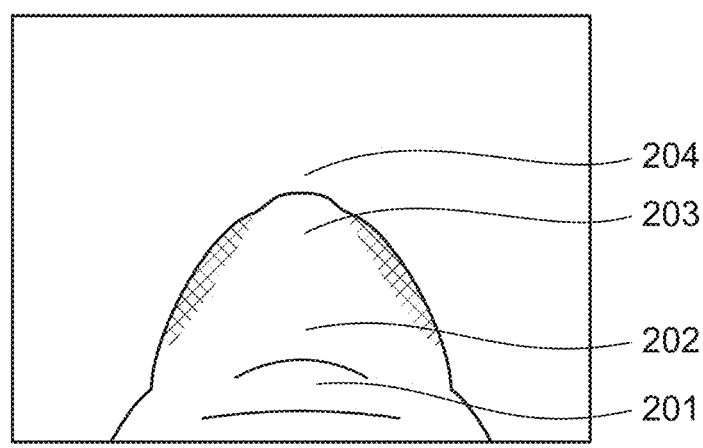
FIG. 8J is a view showing an image of the user who directs the face upward by 33° viewed from the face direction detection window.
Figure 8K:
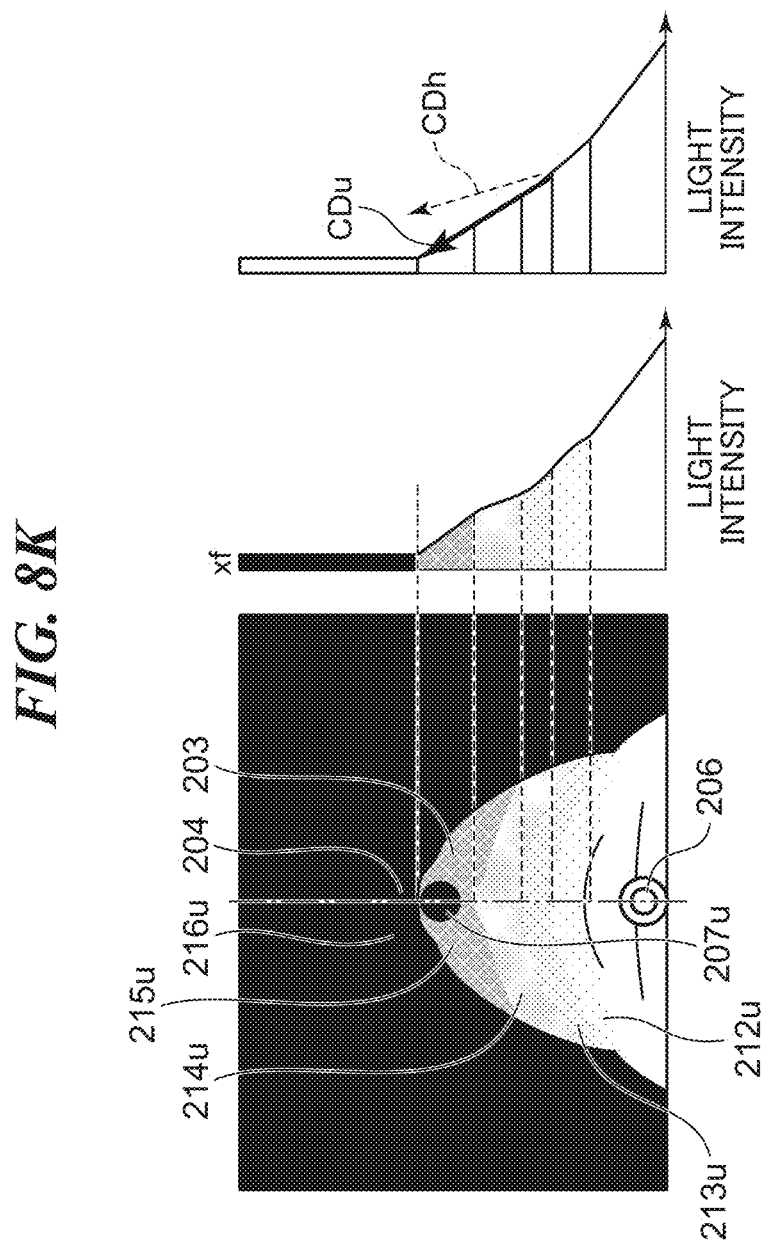
FIG. 8K is a view showing a result obtained by adjusting shades of a difference image, which is calculated by the similar method as FIG. 8E in a case that the user directs the face upward by 33°, so as to fit with a scale of light intensities of reflected components of infrared light projected to a face and neck of the user and by superimposing the double circle showing the throat position and the black circle showing the chin position.

FIG. 8J is a view showing an image of the user who directs the face upward by 33° from the horizontal direction viewed from the face direction detection window 13. Since the user directs the face upward as shown in FIG. 10C, the face 204 including the lip and nose cannot be seen from the face direction detection window 13 located under the user's jaw. The chin 203 and its neck side are seen. FIG. 8K shows distribution of the light intensity of the reflected light 25 in irradiating the user in the state shown in FIG. 10C with the infrared light 23. An image on the left side in FIG. 8K is a view showing a result obtained by adjusting shades of the difference image calculated by the same method as FIG. 8E so as to fit with a scale of light intensities of reflected components of the infrared light projected to the face and neck of the user and by superimposing the double circle showing the throat position 206 and the black circle showing a chin position 207u. Two graphs in FIG. 8K show density changes of the left image. The left graph is equivalent to the graph in FIG. 8F and the right graph is equivalent to the graph in FIG. 8G.

Six areas 211u, 212u, 213u, 214u, 215u, and 216u corresponding to the light intensities in FIG. 8K are indicated by adding "u" to the reference numerals of the same light intensity areas shown in FIG. 8F. Although the light intensity of the user's chin 203 is included in the middle gray area 214 in FIG. 8F, it shifts to the black side and is included in the slightly dark gray area 215u in FIG. 8K. In this way, since the distance Ffu is longer than the distance Ffh as shown in FIG. 10C, the infrared detection device 27 can detect that the light intensity of the reflected light 25 from the chin 203 is weakened in inverse proportion to the square of distance.

Next, detection of the face directed downward will be described.

Figure 10D:
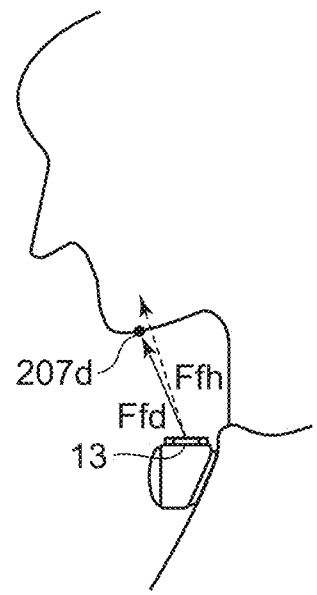

FIG. 10D is a view showing an example of a state that the user directs the face downward by 22° from the horizontal direction. In FIG. 10D, a distance from the face direction detection window 13 to a chin position 207d is Ffd.

Since the chin position 207d moves downwardly together with the face when the user directs the face downward, the distance Ffd becomes shorter than the distance Ffh as shown in FIG. 10D and the light intensity of the reflected light 25 from the chin 203 becomes stronger.

Returning back to FIG. 7C, in a step S211, the overall control CPU (a distance calculation unit) 101 calculates the distance from the chin position to the face direction detection window 13 on the basis of the light intensity of the chin position detected by the infrared detection device 27 of the face direction detection unit (a three-dimensional detection sensor) 20. At this time, the face angle in the vertical direction is also calculated.

For example, when the user faces the front as shown in FIG. 10B, a relation between a vertical angle θh of the straight line connecting the chin position 207 and the face direction detection window 13 with respect to the horizontal direction and a horizontal component Lh of the distance Ffh to the chin position 207 from the face direction detection window 13 is represented by Lh=Ffh*cos θh.

Moreover, when the user directs the face upward by 33° as shown in FIG. 10C, a relation between a vertical angle θh of the straight line connecting the chin position 207u and the face direction detection window 13 and a horizontal component Lu of the distance Ffu to the chin position 207u from the face direction detection window 13 is represented by Lu=Ffu*cos θu.

Accordingly, the overall control CPU 101 calculates the difference of θh and θu as the face angle in the vertical direction. It should be noted that the distances Ffh and Ffu are respectively calculated from the light intensity of the chin position 207 in FIG. 8G and the light intensity of the chin position 207u in FIG. 8K.

Moreover, the horizontal components Lh and Lu are respectively calculated by converting the distance Ffh to the chin position 207 in the face image in FIG. 8G and the distance Ffu to the chin position 207u in the face image in FIG. 8K into the actual size of the object.

It should be noted that the above-mentioned angle calculations presuppose that the distance from the throat position 206, which is the rotation center of the head, to the chin position 207 is almost equal to the distance from the face direction detection window 13 to the chin position 207. A calculation method in a case where the image-pickup/detection unit 10 is installed in a separate position becomes more complicated.

In a step S212, the overall control CPU 101 stores the face angle in the lateral direction (a first detection direction) obtained in the step S210 and the face angle in the vertical direction (a second detection direction) obtained in the step S211 into the primary memory 103 as a three-dimensional observation direction vi ("i" is arbitrary reference numeral) of the user.

Although the face angle in the vertical direction is calculated by detecting the distance from the face direction detection window 13 in the step S211, the face angle may be calculated by another method. For example, change of the face angle may be calculated by comparing change levels of the light intensity of the chin 203. That is, the change of the face angle may be calculated by comparing a gradient CDh of the reflected light intensity from the root 202 of the jaw to the chin 203 in the graph in FIG. 8G with a gradient CDu of the reflected light intensity from the root 202 of the jaw to the chin 203 in the graph in FIG. 8K.

Figure 7D:
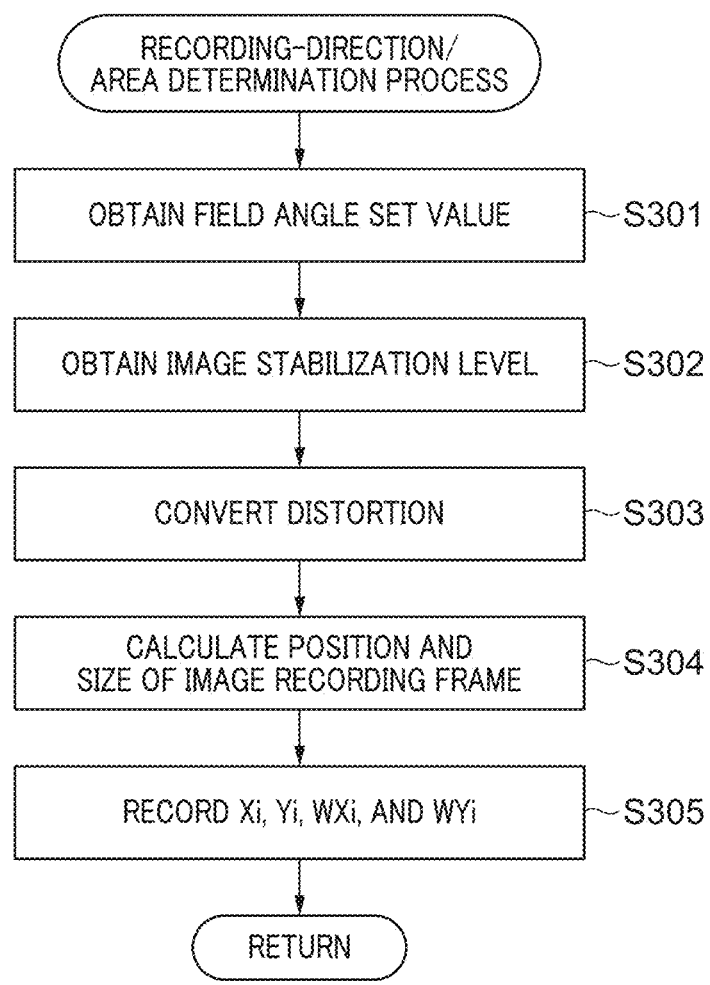
FIG. 7D is a flowchart showing a subroutine of a recording-direction/area determination process in a step S300 in FIG. 7A according to one or more aspects of the present disclosure.
Figure 11B:
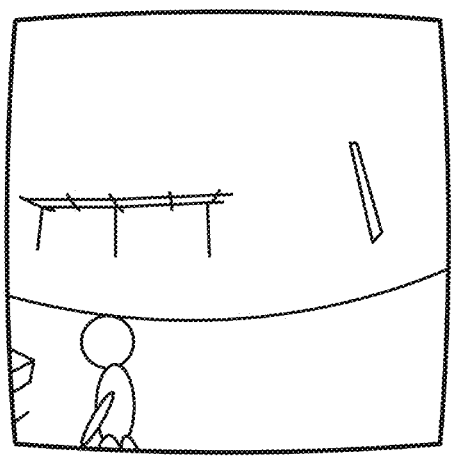
FIG. 11B is a view showing an image in the target visual field extracted from the superwide-angle image in FIG. 11A.

FIG. 7D is a flowchart showing a subroutine of the recording-direction/area determination process in the step S300 in FIG. 7A. Before describing details of this process, a superwide-angle image that is subjected to determine a recording direction and a recording area in this embodiment will be described first using FIG. 11A.

In the camera body 1 of this embodiment, the image pickup unit 40 picks up a superwide-angle image of the periphery of the image-pickup/detection unit 10 using the superwide-angle image pickup lens 16. An image of an observation direction can be obtained by extracting a part of the superwide-angle image.

FIG. 11A is a view showing a target visual field 125 set in a superwide-angle image picked up by the image pickup unit 40 in a case where the user faces the front.

As shown in FIG. 11A, a pixel area 121 that can be picked up by the solid state image sensor 42 is a rectangular area. Moreover, an effective projection area (a predetermined area) 122 is an area of a circular half-celestial sphere image that is a fish-eye image projected onto the solid state image sensor 42 by the image pickup lens 16. The image pickup lens 16 is adjusted so that the center of the pixel area 121 will match the center of the effective projection area 122.

The outermost periphery of the circular effective projection area 122 shows a position where an FOV (field of view) angle is 180°. When the user is looking at the center in both the vertical and horizontal directions, an angular range of the target visual field 125 that is picked up and recorded becomes 90° (a half of the FOV angle) centered on the center of the effective projection area 122. It should be noted that the image pickup lens 16 of this embodiment can also introduce light outside the effective projection area 122 and can project light within the maximal FOV angle 192° onto the solid state image sensor 42 as a fish-eye image. However, the optical performance falls greatly in the area outside the effective projection area 122. For example, resolution falls extremely, light amount falls, and distortion increases. Accordingly, in this embodiment, an image of an observation direction is extracted as a recording area only from the inside of the image (hereinafter referred to as a superwide-angle image, simply) projected in the pixel area 121 within the half-celestial sphere image displayed on the effective projection area 122.

Since the size of the effective projection area 122 in the vertical direction is larger than the size of the short side of the pixel area 121, the upper and lower ends of the image in the effective projection area 122 are out of the pixel area 121 in this embodiment. However, the relationship between the areas is not limited to this. For example, the optical system may be designed so that the entire effective projection area 122 will be included in the pixel area 121 by changing the configuration of the image pickup lens 16. Invalid pixel areas 123 are parts of the pixel area 121 that are not included in the effective projection area 122.

The target visual field 125 shows an area of an image of a user's observation direction that will be extracted from the superwide-angle image. The target visual field 125 is prescribed by left, right, upper, and lower field angles (45° in this case, the FOV angle 90°) centering on the observation direction. In the example of FIG. 11A, since the user faces the front, the center of the target visual field 125 becomes the observation direction (center direction) vo that matches the of the effective projection area 122.

The superwide-angle image shown in FIG. 11A includes an A-object 131 that is a child, a B-object 132 that shows steps that the child who is the A-object is trying to climb, and a C-object 133 that is locomotive-type playground equipment.

Next, the recording-direction/area determination process in the step S300 in FIG. 7A that is executed to obtain an image of an observation direction from the superwide-angle image described using FIG. 11A is shown in FIG. 7D. Hereinafter, this process is described using FIG. 12A through FIG. 12G that show concrete examples of the target visual field 125.

In a step S301, a field-angle set value $V_{ang}$ that is set in advance is obtained by reading from the primary memory 103.

In this embodiment, the internal nonvolatile memory 102 stores all the available field angles (45°, 90°, 110°, and 130°) as field-angle set values $V_{ang}$. The image extraction/development unit 50 extracts an image of an observation direction in an area defined by the field-angle set value $V_{ang}$ from the superwide-angle image. Moreover, the field-angle set value $V_{ang}$ included in the various set values read from the internal nonvolatile memory 102 in one of the steps S103, S106, and S108 in FIG. 7B is established and is being stored in the primary memory 103.

Moreover, in the step S301, the observation direction vi determined in the step S212 is determined as the recording direction, an image in the target visual field 125 of which the center is designated by the observation direction vi and of which an area is defined by the obtained field-angle set value $V_{ang}$ is extracted from the superwide-angle image, and the extracted image is stored into the primary memory 103.

In the case of the observation direction (center direction) vo, since the influence of the optical distortion caused by the image pickup lens 16 can be disregarded mostly, the shape of the established target visual field 125 is almost identical to the shape of a target visual field 125o (FIG. 12A) after converting the distortion in a step S303 mentions later. Hereinafter, a target visual field after converting the distortion in the case of the observation direction vi is called a target visual field 125i.

Next, an image stabilization level that is set in advance is obtained by reading from the primary memory 103 in a step S302.

In this embodiment, as mentioned above, the image stabilization level included in the various setting values read from the internal nonvolatile memory 102 in one of the steps S103, S106, and S108 is established and is being stored in the primary memory 103.

Moreover, in the step S302, an image-stabilization-margin pixel number Pis is set on the basis of the obtained image stabilization level.

In the image stabilization process, an image following in a direction opposite to a blur direction is obtained according to a blur amount of the image-pickup/detection unit 10. Accordingly, in this embodiment, an image stabilization margin required for the image stabilization is established around the target visual field 125i.

Moreover, in this embodiment, a table that keeps values of the image-stabilization-margin pixel number Pis in association with respective image stabilization levels is stored in the internal nonvolatile memory 102. For example, when the image stabilization level is "Middle", an image stabilization margin of which width is "100 pixels" that is the image-stabilization-margin pixel number Pis read from the above-mentioned table is established around the target visual field.

Figure 12A:
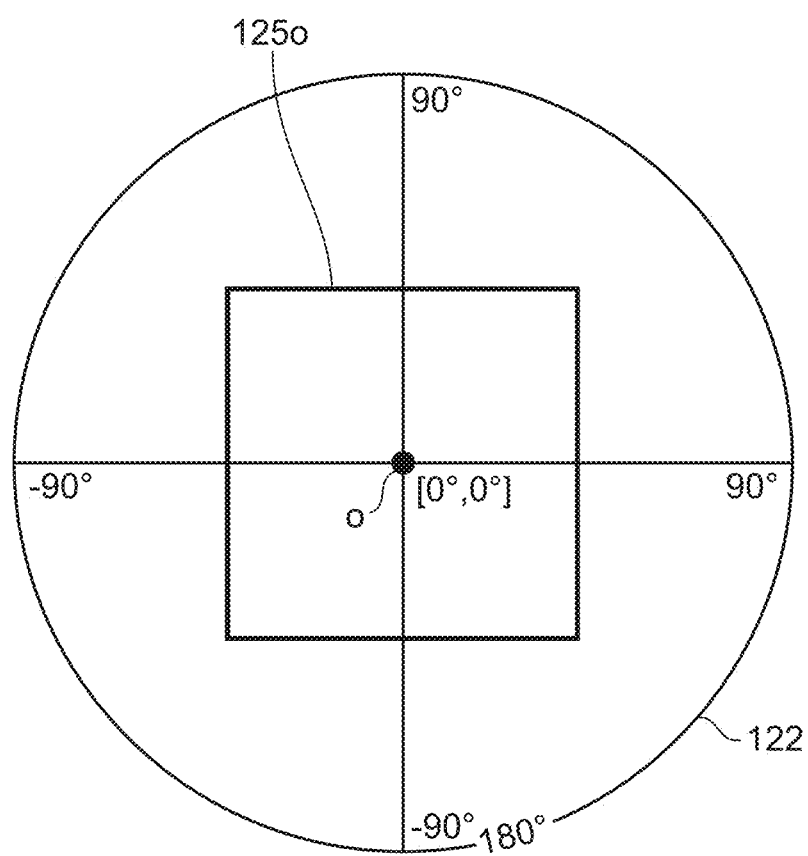
FIG. 12A is a view showing an example of the target visual field set in the superwide-angle image.
Figure 12B:
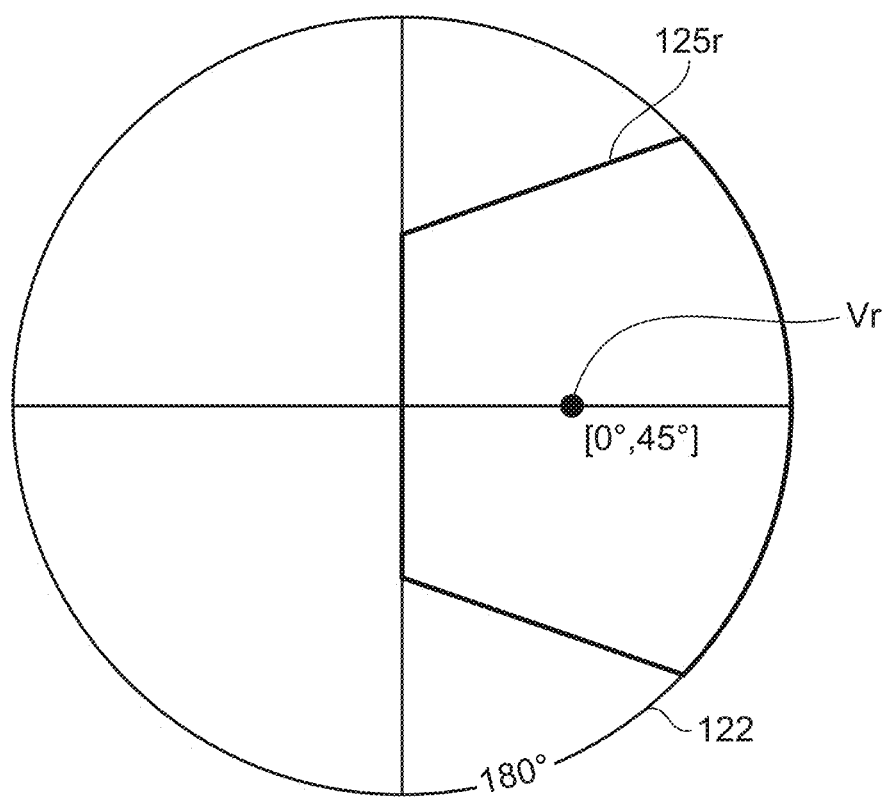
FIG. 12B is a view showing an example of the target visual field set in the superwide-angle image in a case where the field-angle set value is identical to that of the target visual field in FIG. 12A and where the observation direction differs.
Figure 12C:
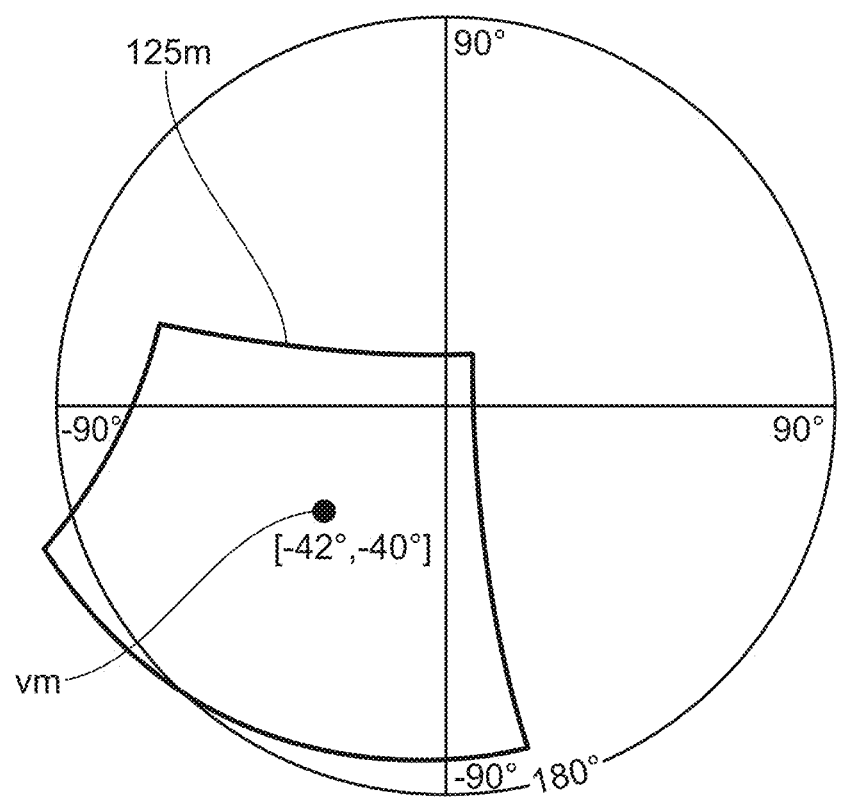
FIG. 12C is a view showing another example of the target visual field set in the superwide-angle image in a case where the field-angle set value is identical to that of the target visual field in FIG. 12A and where the observation direction differs.
Figure 12D:
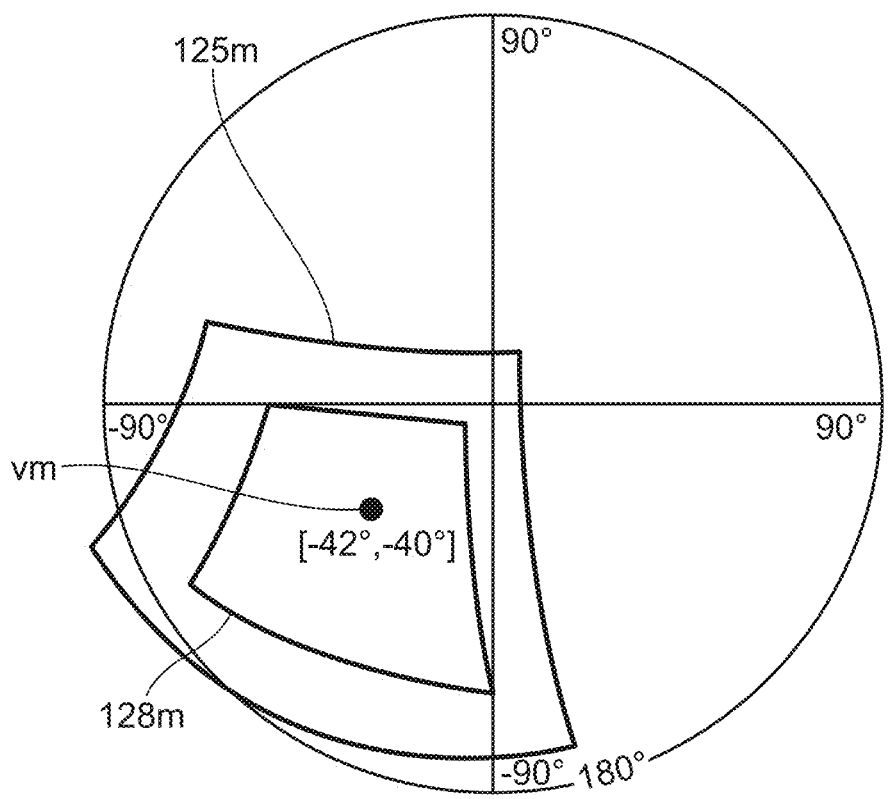
FIG. 12D is a view showing an example of the target visual field set in the superwide-angle image in a case where the observation direction is identical to that of the target visual field in FIG. 12C and where the field-angle set value is smaller.
Figure 12E:
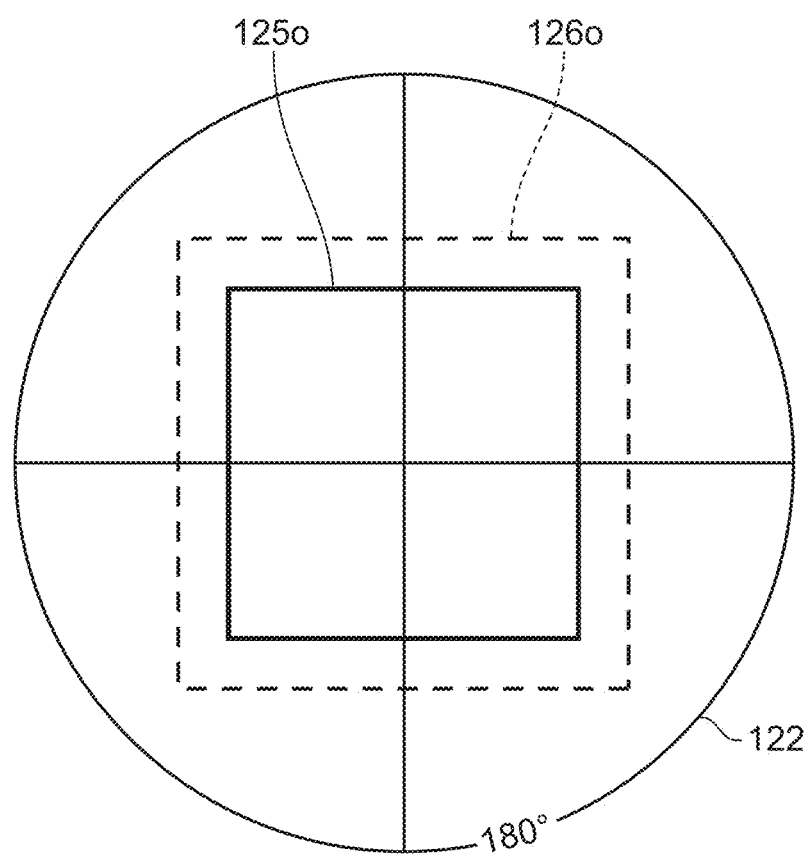
FIG. 12E is a view showing an example that gives an image stabilization margin corresponding to a predetermined image stabilization level around the target visual field shown in FIG. 12A.

FIG. 12E is a view showing an example that gives an image stabilization margin corresponding to a predetermined image stabilization level around the target visual field 125*o* shown in FIG. 12A. Hereinto, a case where the image stabilization level is "Middle", i.e., where the image-stabilization-margin pixel number Pis is "100 pixels" will be described.

As shown by a dotted line in FIG. 12E, an image stabilization margin 126*o* of which the width is "100 pixels" that is the image-stabilization-margin pixel number Pis is established at the left, right, upper, and lower sides of the target visual field 125*o*.

FIG. 12A and FIG. 12E show the case (the observation direction vo) where the observation direction vi matches the center O (the optical axis center of the image pickup lens 16) of the effective projection area 122 for simplification of the description. In the meantime, when the observation direction vi is directed to a periphery of the effective projection area 122, the conversion to reduce the influence of optical distortion is required.

In the step S303, the shape of the target visual field 125 established in the step S301 is corrected (converts distortion) in consideration of the observation direction vi and the optical property of the image pickup lens 16 to generate the target visual field 125*i*. Similarly, the image-stabilization-margin pixel number Pis set in the step S302 is also corrected in consideration of the observation direction vi and the optical property of the image pickup lens 16.

For example, the field-angle set value $V_{ang}$ shall be 90° and the user shall observe a right 45° direction from the center o. In this case, the observation direction vr (vector information [45°, 0°]) is determined in the step S212, and the area of 45° in left and right and 45° in up and down centering on the observation direction vr becomes the target visual field 125. Furthermore, the target visual field 125 is corrected to the target visual field 125*r* shown in FIG. 12B in consideration of the optical property of the image pickup lens 16.

As shown in FIG. 12B, the target visual field 125*r* becomes wider toward the periphery of the effective projection area 122. And the position of the observation direction vr approaches inside a little from the center of the target visual field 125*r*. This is because the optical design of the image pickup lens 16 in this embodiment is close to that of a stereographic projection fish-eye lens. It should be noted that contents of the correction depend on the optical design of the image pickup lens 16. If the image pickup lens 16 is designed as an equidistant projection fish-eye lens, an equal-solid-angle projection fish-eye lens, or an orthogonal projection fish-eye lens, the target visual field 125 is corrected according to its optical property.

Figure 12F:
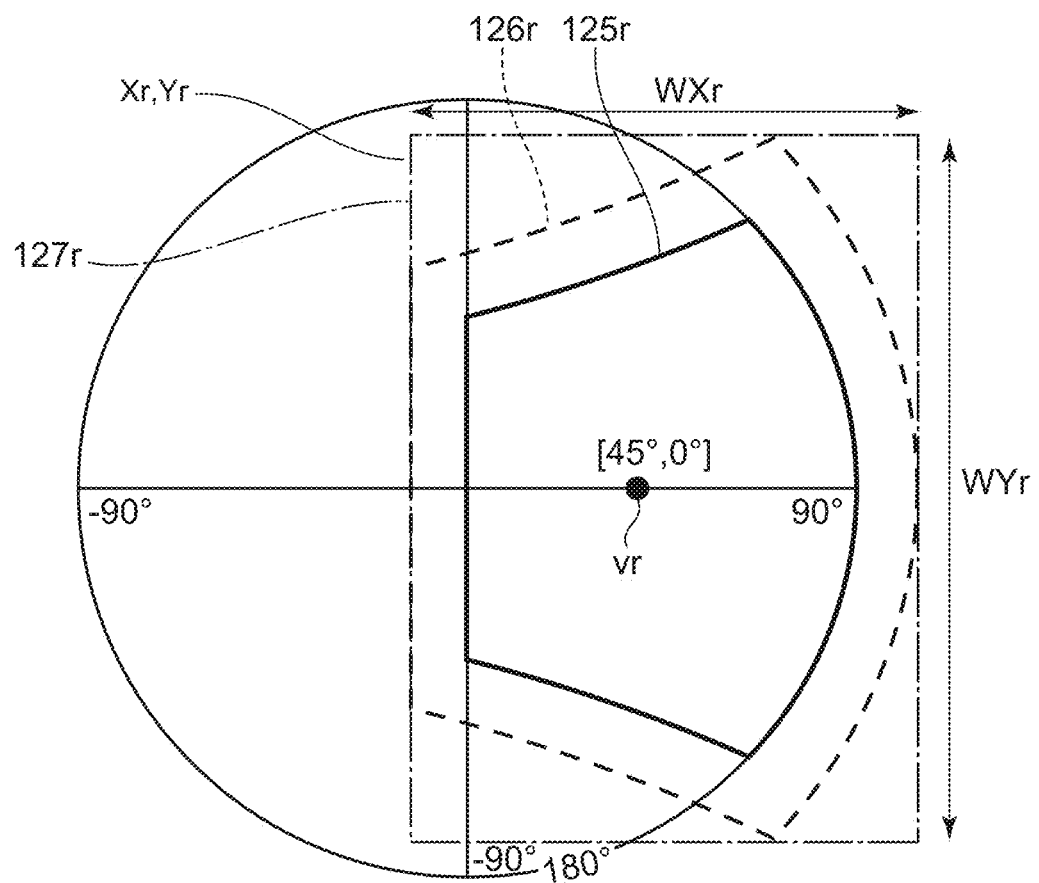
FIG. 12F is a view showing an example that gives an image stabilization margin corresponding to the same image stabilization level of the image stabilization margin in FIG. 12E around the target visual field shown in FIG. 12B.

FIG. 12F is a view showing an example that gives an image stabilization margin 126*r* corresponding to the same image stabilization level "Middle" of the image stabilization margin in FIG. 12E around the target visual field 125*r* shown in FIG. 12B.

The image stabilization margin 126*o* (FIG. 12E) is established at the left, right, upper, and lower sides of the target visual field 125*o* with the width of "100 pixels" that is the image-stabilization-margin pixel number Pis. As compared with this, the image-stabilization-margin pixel number Pis of the image stabilization margin 126*r* (FIG. 12F) is corrected so as to increase toward the periphery of the effective projection area 122.

In this way, the shape of the image stabilization margin established around the target visual field 125*r* is also corrected as with the shape of the target visual field 125*r* so that the correction amount will increase toward the periphery of the effective projection area 122 as shown by the image stabilization margin 126*r* in FIG. 12F. This is also because the optical design of the image pickup lens 16 in this embodiment is close to that of a stereographic projection fish-eye lens. It should be noted that contents of the correction depend on the optical design of the image pickup lens 16. If the image pickup lens 16 is designed as an equidistant projection fish-eye lens, an equal-solid-angle projection fish-eye lens, or an orthogonal projection fish-eye lens, the image stabilization margin 126*r* is corrected according to its optical property.

The process executed in the step S303 that switches successively the shapes of the target visual field 125 and its image stabilization margin in consideration of the optical property of the image pickup lens 16 is a complicated process. Accordingly, in this embodiment, the process in the step S303 is executed using a table that keeps shapes of the target visual field 125*i* and its image stabilization margin for every observation direction vi stored in the internal non-volatile memory 102. It should be noted that the overall control CPU 101 may have a computing equation depending on the optical design of the image pickup lens 16. In such a case, the overall control CPU 101 can calculate an optical distortion value using the computing equation.

In a step S304, a position and size of an image recording frame are calculated. As mentioned above, the image stabilization margin 126*i* is established around the target visual field 125*i*. However, when the position of the observation direction vi is close to the periphery of the effective projection area 122, the shape of the image stabilization margin becomes considerably special as shown by the image stabilization margin 126*r*, for example.

The overall control CPU 101 can extract an image only in such a special-shaped area and apply the development process to the extracted image. However, it is not general to use an image that is not rectangular in recording as image data in the step S600 or in transmitting image data to the display apparatus 800 in the step S700. Accordingly, in the step S304, the position and size of the image recording frame 127*i* of a rectangular shape that includes the entire image stabilization margin 126*i* are calculated.

FIG. 12F shows the image recording frame 127*r* that is calculated in the step S304 to the image stabilization margin 126*r* by an alternate long and short dash line.

In a step S305, the position and size of the image recording frame 127*i* that are calculated in the step S304 are recorded into the primary memory 103.

In this embodiment, an upper-left coordinate (Xi, Yi) of the image recording frame 127*i* in the superwide-angle image is recorded as the position of the image recording frame 127*i*, and a lateral width WXi and a vertical width WYi that start from the coordinate (Xi, Yi) are recorded as the size of the image recording frame 127*i*. For example, a coordinate (Xr, Yr), a lateral width WXr, and a vertical width WYr of the image recording frame 127*r* shown in FIG. 12F are recorded in the step S305. It should be noted that the coordinate (Xi, Yi) is a XY coordinate of which the origin is a predetermined reference point, specifically the optical center of the image pickup lens 16.

When the image stabilization margin 126*i* and the image recording frame 127*i* have been determined in this way, the process exits from this subroutine shown in FIG. 7D.

In the description so far, the observation directions of which the horizontal angle is 0°, such as the observation direction v0 (the vector information [0°, 0°]) and the observation direction vr (the vector information [45°, 0°]), have been described for simplifying the description of the complicated optical distortion conversion. In the meantime, an actual observation direction vi of the user is arbitrary.

Accordingly, the recording area development process executed in a case where the horizontal angle is not 0° will be described hereinafter. For example, when the field-angle set value $V_{ang}$ is 90° and the observation direction vm is [−42°, −40°], the target visual field 125m appears as shown in FIG. 12C.

Moreover, even when the observation direction vm (the vector information [−42°, −40°]) is the same as the target visual field 125m, when the field-angle set value $V_{ang}$ is 45°, a target visual field 128m, which is slightly smaller than the target visual field 125m, appears as shown in FIG. 12D.

Figure 12G:
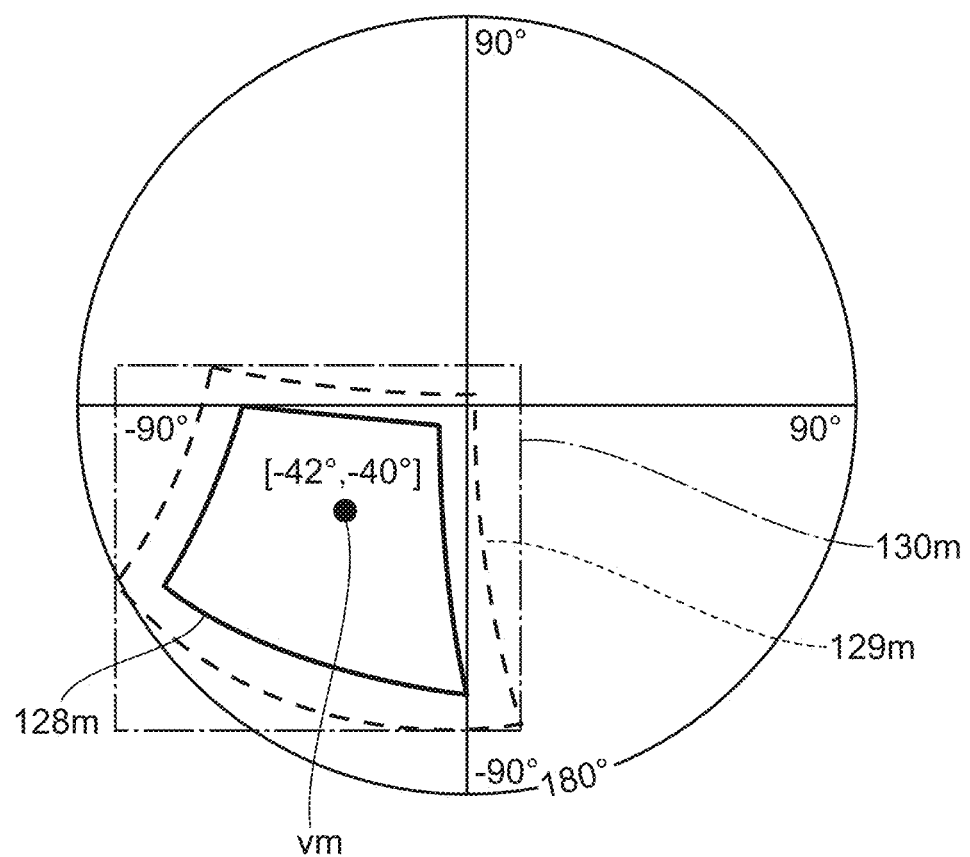
FIG. 12G is a view showing an example that gives an image stabilization margin corresponding to the same image stabilization level of the image stabilization margin in FIG. 12E around the target visual field shown in FIG. 12D.

Furthermore, an image stabilization margin 129m and an image recording frame 130m are established around the target visual field 128m as shown in FIG. 12G.

Since the process in the step S400 is a fundamental image pickup operation and employs a general sequence of the image pickup unit 40, its detailed description is omitted. It should be noted that the image signal processing circuit 43 in the image pickup unit 40 in this embodiment also performs a process that converts signals of an inherent output form (standard examples: MIPI, SLVS) output from the solid state image sensor 42 into pickup image data of a general sensor reading system.

When the video image mode is selected by the image pickup mode switch 12, the image pickup unit 40 starts recording in response to a press of the start switch 14. After that, the recording is finished when the stop switch 15 is pressed. In the meantime, when the still image mode is selected by the image pickup mode switch 12, the image pickup unit 40 picks up a static image every time when the start switch 14 is pressed.

Figure 7E:
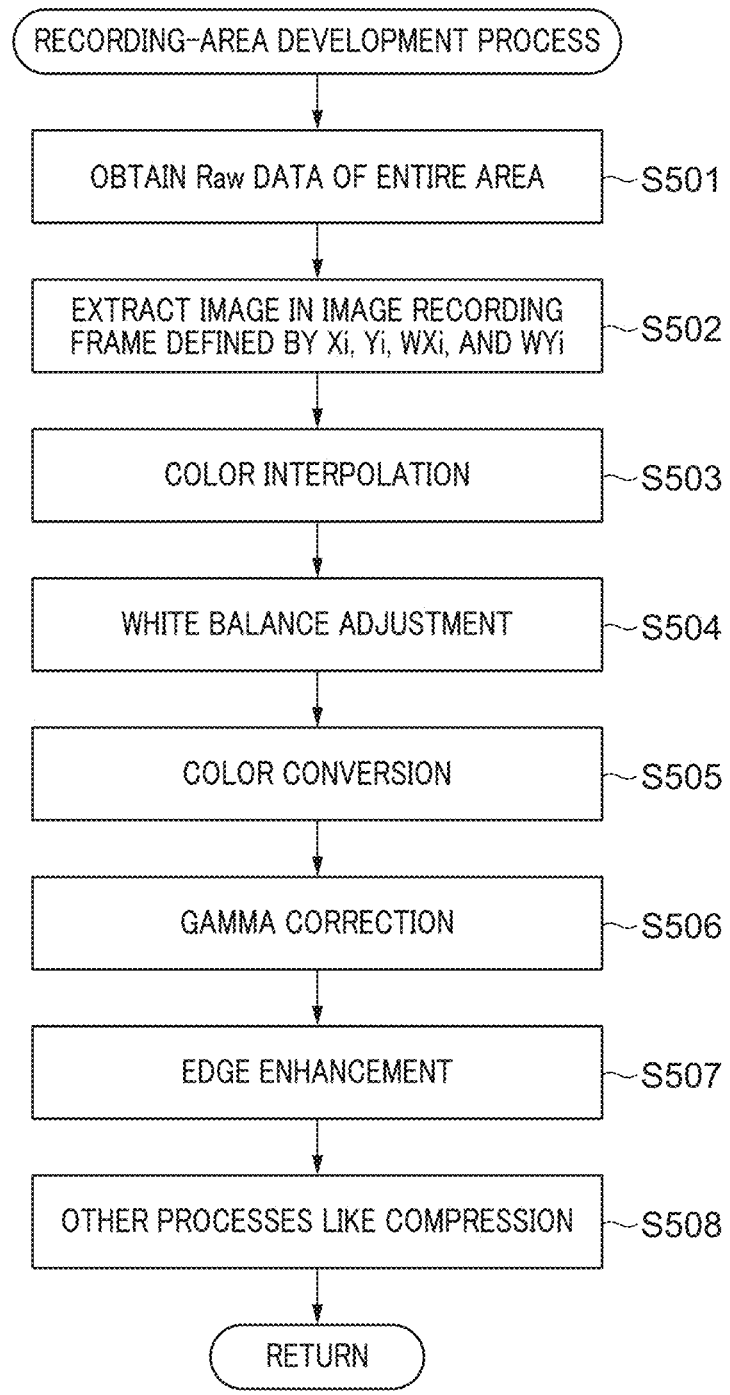
FIG. 7E is a flowchart showing a subroutine of a development process in a step S500 in FIG. 7A according to one or more aspects of the present disclosure.

FIG. 7E is a flowchart showing a subroutine of the recoding-area development process in the step S500 in FIG. 7A.

In a step S501, Raw data of the entire area of the pickup image data (superwide-angle image) generated by the image pickup unit 40 in the step S400 is obtained and is input into an image capturing unit called a head unit (not shown) of the overall control CPU 101.

Next, in a step S502, the image within the image recording frame 127i is extracted from the superwide-angle image obtained in the step S501 on the basis of the coordinate (Xi, Yi), lateral width WXi, and vertical width WYi that are recorded into the primary memory 103 in the step S305. After the extraction, a crop development process (FIG. 7F) consisting of steps S503 through S508 is executed only to the pixels within the image stabilization margin 126i. This can reduce a calculation amount significantly as compared with a case where the development process is executed to the entire area of the superwide-angle image read in the step S501. Accordingly, calculation time and electric power consumption can be reduced.

Figure 7F:
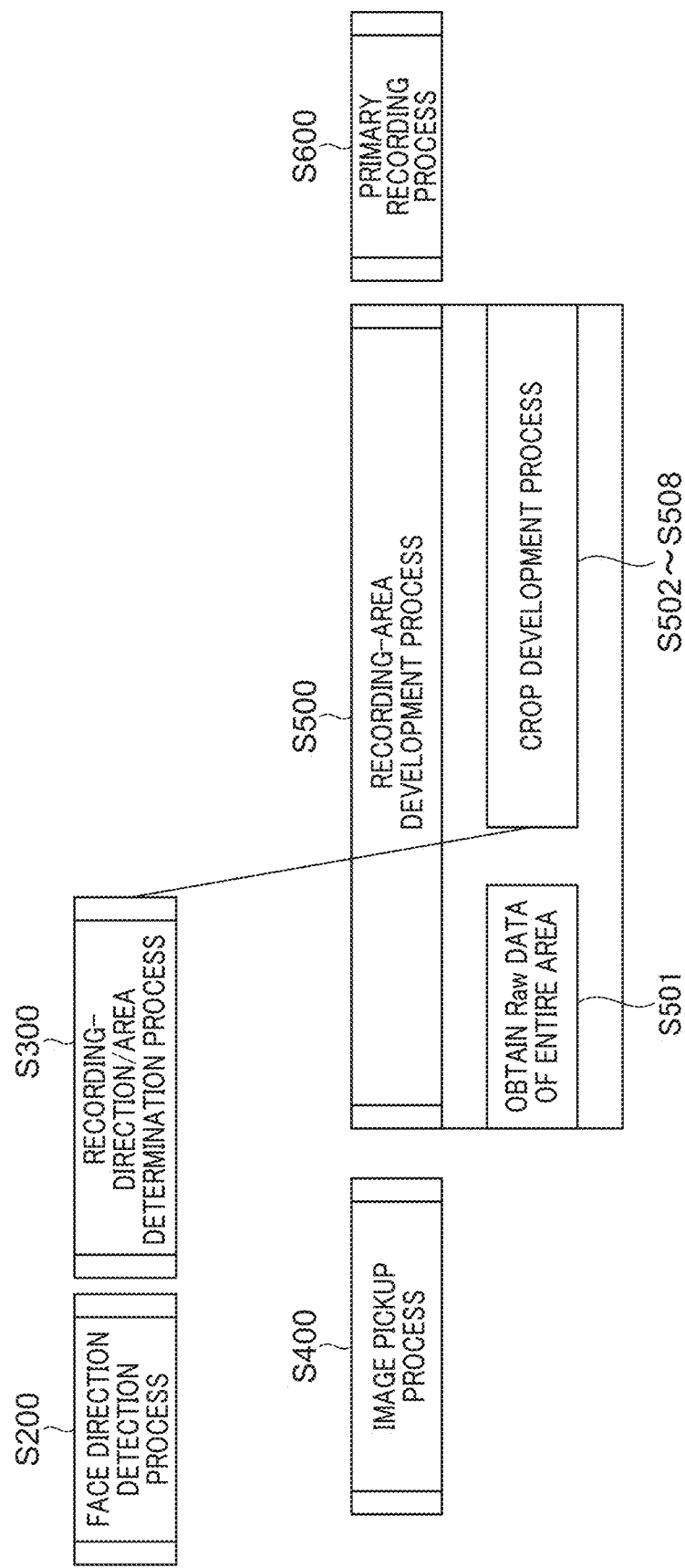
FIG. 7F is a view for describing a process in the steps S200 through S500 in FIG. 7A in a video image mode.

As shown in FIG. 7F, when the video image mode is selected by the image pickup mode switch 12, the processes of the steps S200 and S300 and the process of step S400 are executed in parallel by the same frame rate or different frame rates. Whenever the Raw data of the entire area of one frame generated by the image pickup unit 40 is obtained, the crop development process is executed on the basis of the coordinate (Xi, Yi), lateral width WXi, and vertical width WYi that are recorded in the primary memory 103 at that time point.

When the crop development process is started to the pixels within the image stabilization margin 126i, color interpolation that interpolates data of color pixels arranged in the Bayer arrangement is executed in the step S503. After that, a white balance is adjusted in a step S504, and then, a color conversion is executed in a step S505. In a step S506, gamma correction that corrects gradation according to a gamma correction value set up beforehand is performed. In a step S507, edge enhancement is performed in accordance with an image size.

In the step S508, the image data is converted into a data format that can be stored primarily by applying processes like compression. The converted image data is stored into the primary memory 103. After that, the process exits from the subroutine. Details of the data format that can be stored primarily will be mentioned later.

The order and presences of the processes in the steps S503 through S508 executed during the crop development process may be changed according to the property of the camera system and do not restrict the present disclosure. Moreover, when the video image mode is selected, the processes of the steps S200 through S500 are repeatedly executed until the recording is finished.

According to this process, the calculation amount is significantly reduced as compared with a case where the development process is executed to the entire area read in the step S501. Accordingly, an inexpensive and low-power consumption microcomputer can be employed as the overall control CPU 101. Moreover, heat generation in the overall control CPU 101 is reduced and consumption of the battery 94 is reduced.

Moreover, in order to reduce a control load on the overall control CPU 101, the optical correction process (the step S800 in FIG. 7A) and the image stabilization process (the step S900 in FIG. 7A) to the image are not executed by the camera body 1 in this embodiment. These processes are executed by the display-apparatus controller 801 after transferring the image to the display apparatus 800. The data of the extracted image does not include position information that is substituted for a formula in the optical correction process or that is referred from a correction table in the image stabilization process.

Accordingly, if only data of a partial image extracted from a projected superwide-angle image is transferred to the display apparatus 800, neither the optical correction process nor the image stabilization process can be executed correctly. Accordingly, in this embodiment, the camera body 1 transmits correction data including information about an extraction position of an image from a superwide-angle image together with data of the extracted image to the display apparatus 800.

When the extracted image is a still image, since the still image data corresponds to the correction data one-to-one, the display apparatus 800 can execute the optical correction process and image stabilization process correctly, even if these data are separately transmitted to the display apparatus 800. In the meantime, when the extracted image is a video image, if the video image data and the correction data are separately transmitted to the display apparatus 800, it becomes difficult to determine correspondence between each frame of the video image data and the correction data. Particularly, when a clock rate of the overall control CPU 101 in the camera body 1 slightly differs from a clock rate of the display-apparatus controller 801 in the display apparatus 800, the synchronization between the overall control CPU 101 and the display-apparatus controller 801 will be lost during the video image pickup operation for several minutes. This may cause a defect that the display-apparatus controller 801 corrects a frame with correction data different from the corresponding correction data.

Accordingly, in this embodiment, when transmitting data of an extracted video image to the display apparatus 800, the camera body 1 gives its correction data appropriately to the data of the video image. Hereinafter, the method is described.

Figure 14:
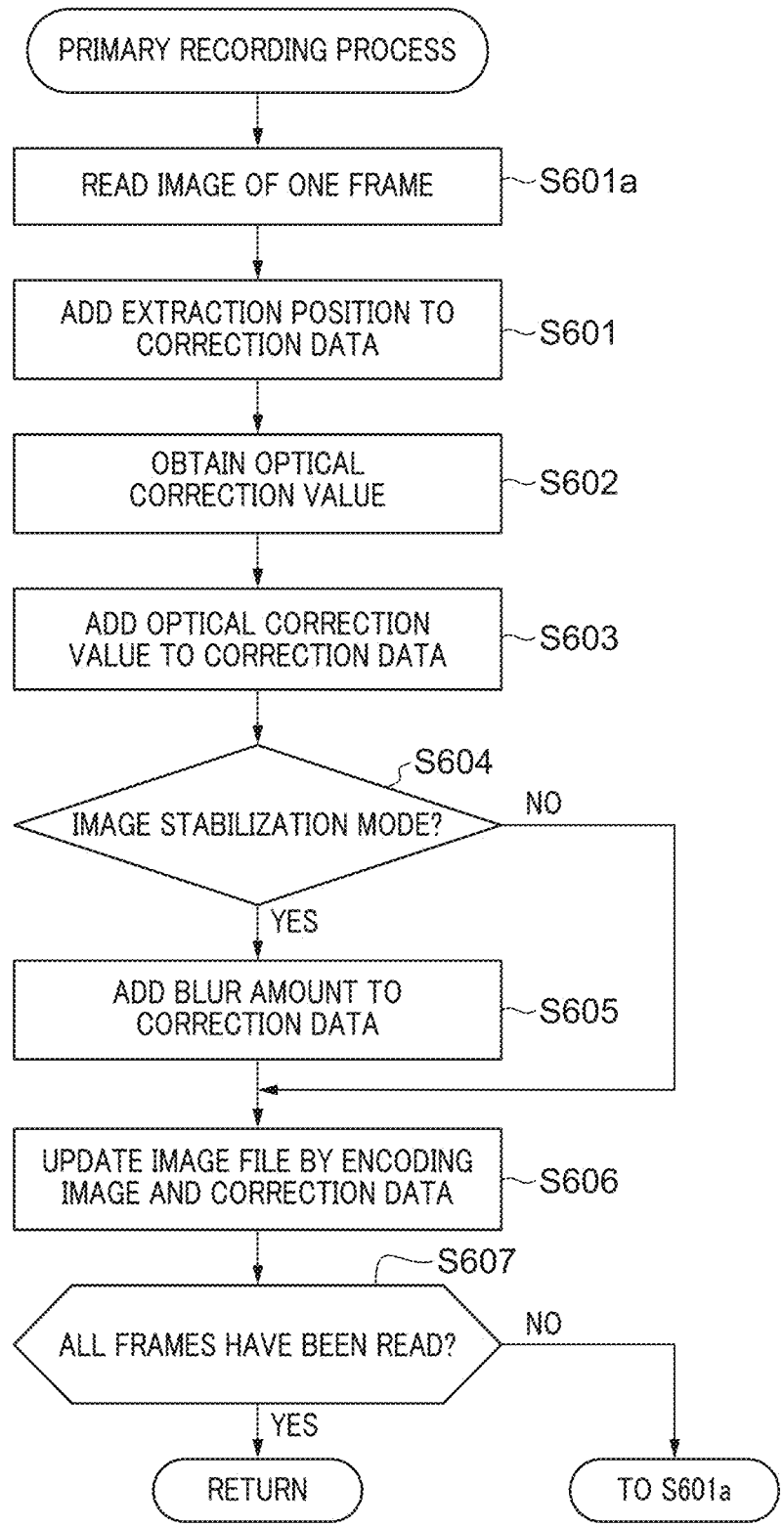
FIG. 14 is a flowchart showing a subroutine of a primary recording process in a step S600 in FIG. 7A.

FIG. 14 is a flowchart showing the subroutine of the primary recording process in the step S600 in FIG. 7A. Hereinafter, this process will be described by also referring to FIG. 15. FIG. 14 shows the process of a case where the video image mode is selected by the image pickup mode switch 12. When the still image mode is selected, this process starts from a step S601 and is finished after a process of a step S606.

In a step S601a, the overall control CPU 101 reads an image of one frame to which the processes in steps S601 through S606 have not been applied from among the video image developed in the recording-area development process (FIG. 7E). Moreover, the overall control CPU (a metadata generation unit) 101 generates correction data that is metadata of the read frame.

In the step S601, the overall control CPU 101 attaches the information about the extraction position of the image of the frame read in the step S601a to the correction data. The information attached in this step is the coordinate (Xi, Yi) of the image recording frame 127i obtained in the step S305. It should be noted that the information attached in this step may be the vector information that shows the observation direction vi.

In a step S602, the overall control CPU (an optical-correction-value obtainment unit) 101 obtains an optical correction value. The optical correction value is the optical distortion value set up in the step S303. Alternatively, the optical correction value may be a correction value corresponding to the lens optical property, such as a marginal-light-amount correction value or a diffraction correction value.

In a step S603, the overall control CPU 101 attaches the optical correction value used for the distortion conversion in the step S602 to the correction data.

In a step S604, the overall control CPU 101 determines whether the image stabilization mode is effective. Specifically, when the image stabilization mode set up in advance is "Middle" or "Strong", it is determined that the image stabilization mode is effective and the process proceeds to a step S605. In the meantime, when the image stabilization mode set up in advance is "OFF", it is determined that the image stabilization mode is not effective and the process proceeds to the step S606. The reason why the step S605 is skipped when the image stabilization mode is "OFF" is because the calculation data amount of the overall control CPU 101 and the data amount of the wireless communication are reduced and the power consumption and heat generation of the camera body 1 can be reduced by skipping the step S605. Although the reduction of the data used for the image stabilization process is described, the data about the marginal-light-amount value or the data about the diffraction correction value obtained as the optical correction value in the step S602 may be reduced.

Although the image stabilization mode is set up by the user's operation to the display apparatus 800 in advance in this embodiment, it may be set up as a default setting of the camera body 1. Moreover, when the camera system is configured to switch the effectiveness of the image stabilization process after transferring image data to the display apparatus 800, the process may directly proceed to the step S605 from the step S603 by omitting the step S604.

In the step S605, the overall control CPU (a moving amount detection unit) 101 attaches the image stabilization mode, which is obtained in the step S302, and the gyro data, which associates with the frame read in the step S601a and stored in the primary memory 813, to the correction data.

In the step S606, the overall control CPU 101 updates a video file 1000 (FIG. 15) by data obtained by encoding the image data of the frame read in the step S601a and the correction data to which the various data are attached in the steps S601 through S605. It should be noted that when a first frame of the video image is read in the step S601a, the video file 1000 is generated in the step S606.

In a step S607, the overall control CPU 101 determines whether all the frames of the video image developed by the recording area development process (FIG. 7E) have been read. When not all the frames have been read, the process returns to the step S601a. In the meantime, when all the frames have been read, the process exits from this subroutine. The generated video file 1000 is stored into the internal nonvolatile memory 102. The video file may be stored into the large-capacity nonvolatile memory 51 too in addition to the primary memory 813 and the internal nonvolatile memory 102. Moreover, the transmission process (the step S700 in FIG. 7A) that transfers the generated image file 1000 to the display apparatus 800 immediately is executed. The image file 1000 may be stored into the primary memory 813 after transferring it to the display apparatus 800.

In this embodiment, the encoding means to combine the image data and the correction data into one file. At that time, the image data may be compressed or the data file that is combined by the image data and correction data may be compressed.

Figure 15:
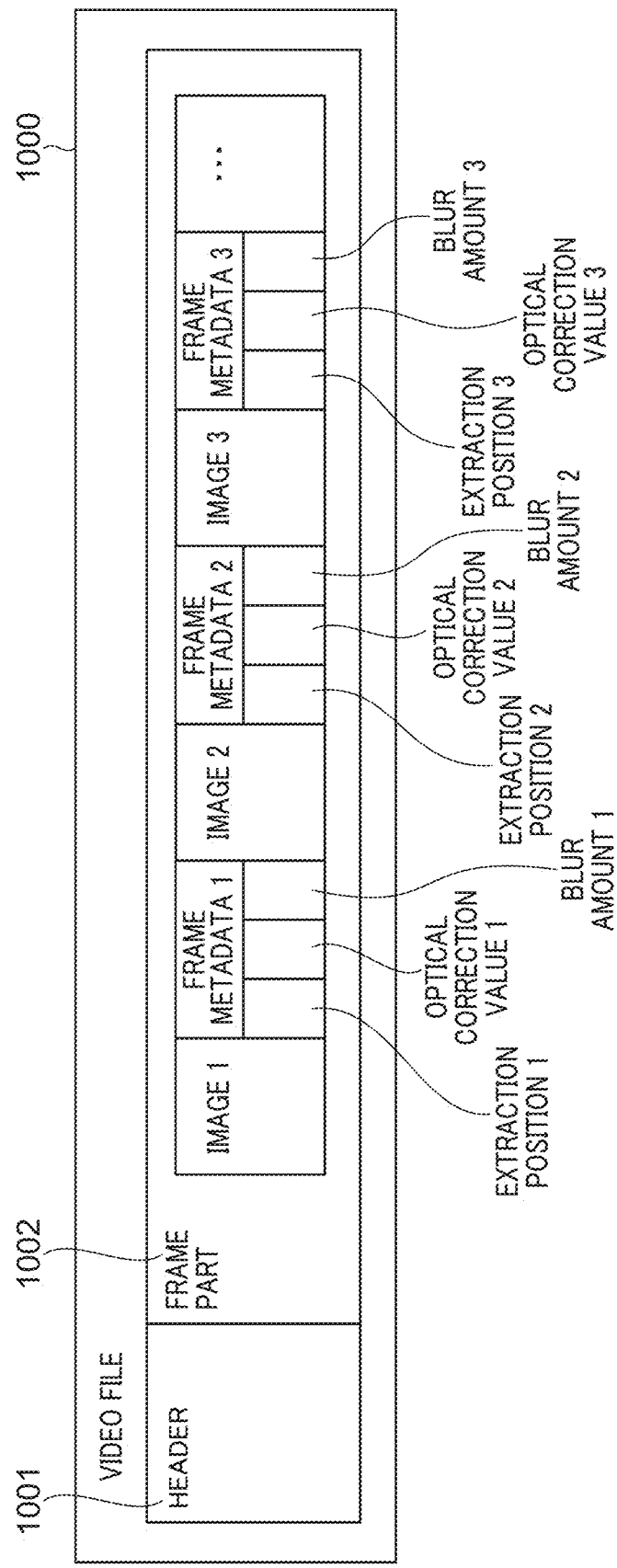
FIG. 15 is a view showing a data structure of an image file generated by the primary recording process.

FIG. 15 is a view showing a data structure of the video file 1000. The video file 1000 consists of a header part 1001 and a frame part 1002. The frame part 1002 consists of frame data sets each of which consists of an image of each frame and corresponding frame metadata. That is, the frame part 1002 includes frame data sets of the number of the total frames of the video image.

In this embodiment, the frame metadata is information obtained by encoding correction data to which an extraction position (in-image position information), an optical correction value, and gyro data are attached if needed. However, the frame metadata is not limited to this. An information amount of the frame metadata may be changed. For example, other information may be added to the frame metadata according to the image pickup mode selected by the image pickup mode switch 12. Alternatively, a part of the information in the frame metadata may be deleted.

An offset value to the frame data sets of each frame or a head addresses of each frame is recorded in the header part 1001. Alternatively, metadata like the time and size corresponding to the video file 1000 may be stored in the header part 1001.

In the primary recording process (FIG. 14), the video file 1000 is transferred to the display apparatus 800 in this way. The video file 100 includes data sets each of which consists of a frame of the video image developed by the recording area development process (FIG. 7E) and its metadata. Accordingly, even when the clock rate of the overall control CPU 101 in the camera body 1 slightly differs from the clock rate of the display-apparatus controller 801 in the display apparatus 800, the display-apparatus controller 801 appropriately applies the correction process to the video image developed in the camera body 1.

Although the optical correction value is included in the frame metadata in this embodiment, the optical correction value may be given to the entire video image.

Figure 16:
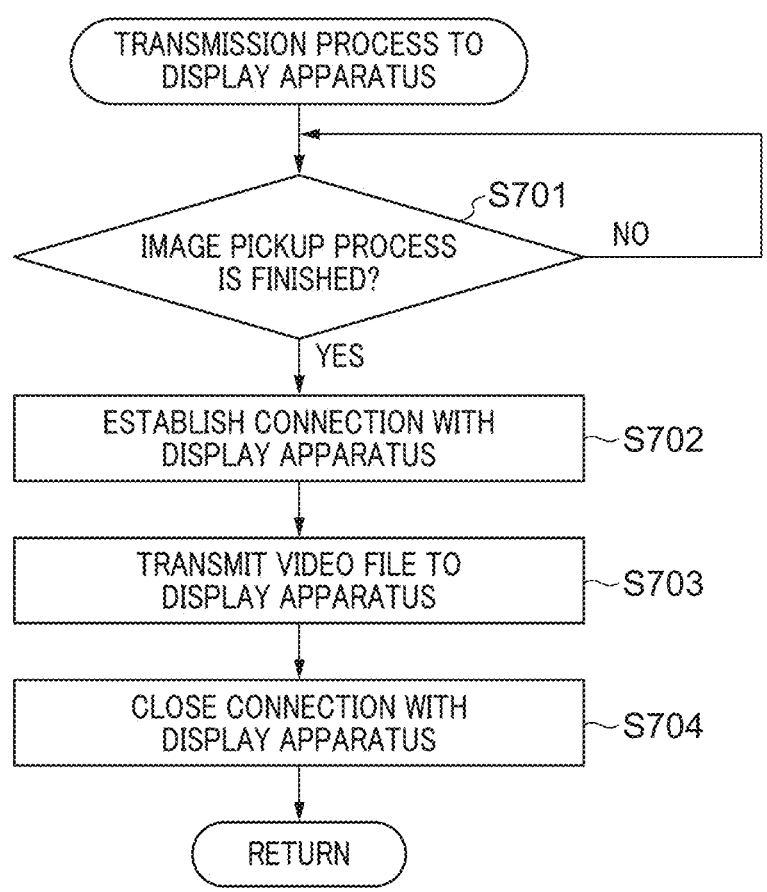
FIG. 16 is a flowchart of the subroutine of a transmission process to the display apparatus in a step S700 in FIG. 7A.

FIG. 16 is a flowchart showing the subroutine of the transmission process to the display apparatus 800 executed in the step S700 in FIG. 7A. FIG. 16 shows the process of a case where the video image mode is selected by the image pickup mode switch 12. It should be noted that when the still image mode is selected, this process starts from a process in a step S702.

In a step S701, it is determined whether the image pickup process (the step S400) of the video image by the image pickup unit 40 is finished or is under recording. When the video image is recording, the recording area development process (the step S500) for each frame and the update of the image file 1000 (the step S606) in the primary recording process (the step S600) are executed sequentially. Since a power load of wireless transmission is large, if the wireless transmission is performed during the video image pickup operation in parallel, the battery 94 is needed to have large battery capacity or a new measure against heat generation is needed. Moreover, from a viewpoint of arithmetic capacity, if the wireless transmission is performed during the video image pickup operation in parallel, an arithmetic load will become large, which needs to prepare a high-specification CPU as the overall control CPU 101, increasing the cost. In view of these points, in this embodiment, the overall control CPU 101 proceeds with the process to a step S702 after the video image pickup operation is finished (YES in the step S701), and establishes the wireless connection with the display apparatus 800. In the meantime, if the camera system of the embodiment has a margin in the electric power supplied from the battery 94 and a new measure against heat generation is unnecessary, the overall control CPU 101 may beforehand establish the wireless connection with the display apparatus 800 when the camera body 1 is started or before starting the recording.

In the step S702, the overall control CPU 101 establishes the connection with the display apparatus 800 through the high-speed wireless communication unit 72 in order to transfer the video file 1000 having much data volume to the display apparatus 800. It should be noted that the small-power wireless communication unit 71 is used for transmission of a low-resolution image for checking a field angle to the display apparatus 800 and is used for exchange of various set values with the display apparatus 800. In the meantime, the small-power wireless communication unit 71 is not used for transfer of the video file 1000 because a transmission period becomes long.

In a step S703, the overall control CPU 101 transfers the video file 1000 to the display apparatus 800 through the high-speed wireless communication unit 72. When the transmission is finished, the overall control CPU 101 proceeds with the process to a step S704. In the step S704, the overall control CPU 101 closes the connection with the display apparatus 800 and exits from this subroutine.

The case where one image file includes the images of all the frames of one video image has been described so far. In the meantime, if the recording period of the video image is longer than several minutes, the video image may be divided by a unit time into a plurality of image files. When the video file has the data structure shown in FIG. 15, even if one video image is transferred to the display apparatus 800 as a plurality of image files, the display apparatus 800 can correct the video image without the timing gap with the correction data.

Figure 17:
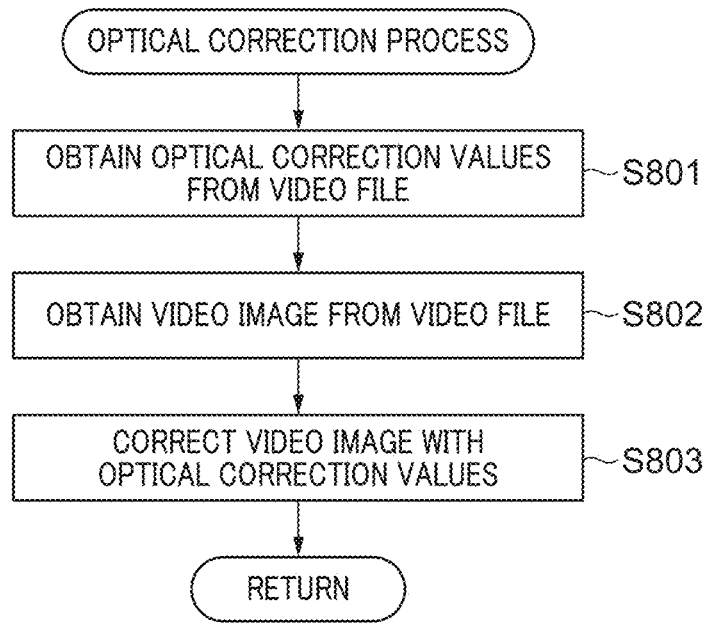
FIG. 17 is a flowchart showing a subroutine of an optical correction process in a step S800 in FIG. 7A.

FIG. 17 is a flowchart showing a subroutine of the optical correction process in the step S800 in FIG. 7A. Hereinafter, this process will be described by also referring to FIG. 18A through FIG. 18F. As mentioned above, this process is executed by the display-apparatus controller 801 of the display apparatus 800.

In a step S801, the display-apparatus controller (a video file reception unit) 801 first receives the video file 1000 from the camera body 1 transferred in the transmission process (the step S700) to the display apparatus 800. After that, the display-apparatus controller (a first extraction unit) 801 obtains the optical correction values extracted from the received video file 1000.

In the next step S802, the display-apparatus controller (a second extraction unit) 801 obtains an image (an image of one frame of the video image) from the video file 1000.

In a step S803, the display-apparatus controller (a frame image correction unit) 801 corrects optical aberrations of the image obtained in the step S802 with the optical correction value obtained in the step S801, and stores the corrected image into the primary memory 813. When the extraction from the image obtained in the step S802 is performed in the optical correction, an image area (extraction-development area) that is narrower than the development area (target visual field 125i) determined in the step S303 is extracted and is subjected to the process.

FIG. 18A through FIG. 18F are views for describing a process of applying distortion correction in the step S803 in FIG. 17.

Figure 18A:
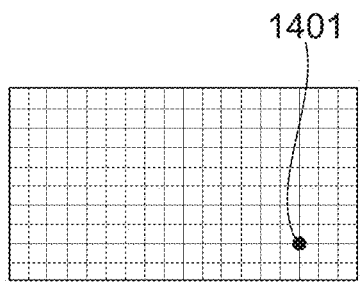
FIG. 18A through FIG. 18F are views for describing a process of applying distortion correction in a step S803 in FIG. 17.
Figure 18B:
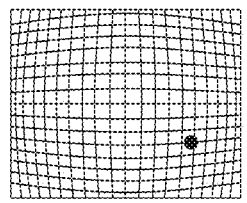

FIG. 18A is a view showing a position of an object 1401 at which the user looks with a naked eye in picking up an image. FIG. 18B is a view showing an image of the object 1401 formed on the solid state image sensor 42.

Figure 18C:
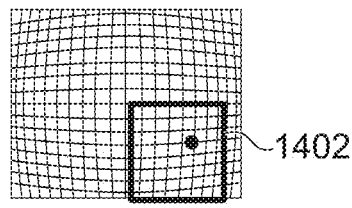

FIG. 18C is a view showing a development area 1402 in the image in FIG. 18B. The development area 1402 is the extraction-development area mentioned above.

Figure 18D:
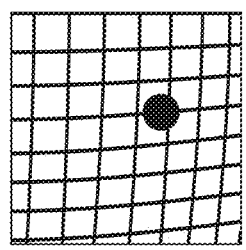
Figure 18E:
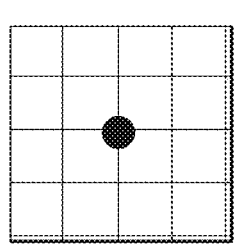

FIG. 18D is a view showing an extraction-development image obtained by extracting the image of the development area 1402. FIG. 18E is a view showing an image obtained by correcting distortion in the extraction-development image shown in FIG. 18D. Since an extraction process is performed in correcting distortion of the extraction-development image, a field angle of the image shown in FIG. 18E becomes still smaller than that of the extraction-development image shown in FIG. 18D.

Figure 19:
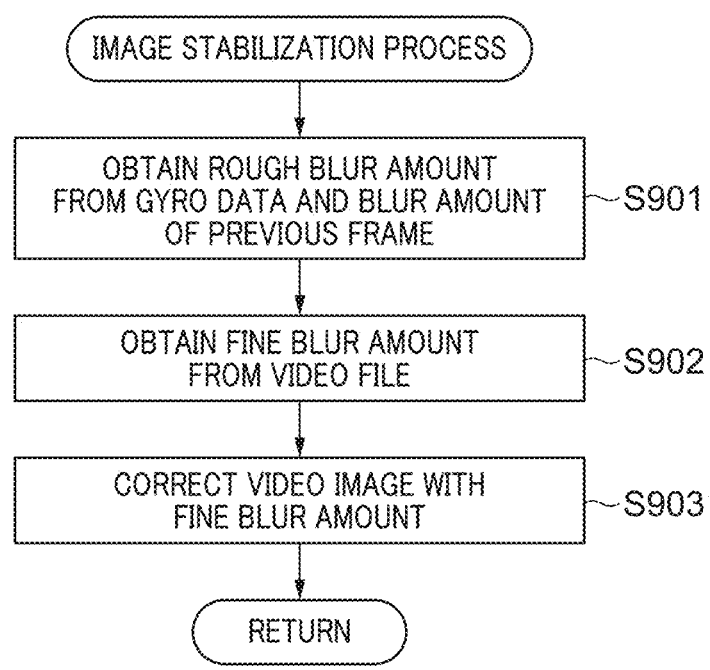
FIG. 19 is a flowchart showing a subroutine of an image stabilization process in a step S900 in FIG. 7A.

FIG. 19 is a flowchart showing a subroutine of the image stabilization process in the step S900 in FIG. 7A. Hereinafter, this process will be described by referring to FIG. 25. As mentioned above, this process is executed by the display-apparatus controller 801 of the display apparatus 800.

In a step S901, the display-apparatus controller 801 obtains a blur amount Vo and gyro data of a frame (current frame) that is currently processed, and a blur amount $V_{n-1}$ and gyro data of a frame (previous frame) that is an immediately preceding frame from the frame metadata of the video file 1000. After that, a rough blur amount $V_n^{Pre}$ is calculated from these pieces of information.

In the step S902, the display-apparatus controller 801 calculates a fine blur amount $V_n^{Det}$ from the video file. A blur amount is detected by calculating a moving amount of a feature point in the image from a previous frame to a current frame.

A feature point can be extracted by a known method. For example, a method using a luminance information image that is generated by extracting only luminance information of an image of a frame may be employed. This method subtracts an image that shifts the original luminance information image by one or several pixels from the original luminance information image. A pixel of which an absolute value of difference exceeds a threshold is extracted as a feature point. Moreover, an edge extracted by subtracting an image generated by applying a high-pass filter to the above-mentioned luminance information image from the original luminance information image may be extracted as a feature point.

Differences are calculated multiple times while shifting the luminance information images of the current frame and previous frame by one or several pixels. The moving amount is obtained by calculating a position at which the difference at the pixel of the feature point diminishes.

Since a plurality of feature points are needed as mentioned later, it is preferable to divide each of the images of the present frame and previous frame into a plurality of blocks and to extract a feature point for each block. A block division depends on the number of pixels and aspect ratio of the image. In general, 12 blocks of 4*3 or 54 blocks of 9*6 are preferable. When the number of blocks is too small, trapezoidal distortion due to a tilt of the image pickup unit 40 of the camera body 1 and rotational blur around the optical axis, etc. cannot be corrected correctly. In the meantime, when the number of blocks is too large, a size of one block becomes small, which shortens a distance between adjacent feature points, causing an error. In this way, the optimal number of blocks is selected depending on the pixel number, ease of detection of feature points, a field angle of an object, etc.

Since the calculation of the moving amount needs a plurality of difference calculations while shifting the luminance information images of the current frame and previous frame by one or several pixels, the calculation amount increases. Since the moving amount is actually calculated on the basis of the rough blur amount $V_n^{Pre}$ and deviation (the number of pixels) therefrom, the difference calculations are performed only near the rough blur amount, which can significantly reduce the calculation amount.

Next, in a step S903, the display-apparatus controller 801 performs the image stabilization process using the fine blur amount $V_n^{Det}$ obtained in the step S902. And then, the process exits form this subroutine.

It should be noted that Euclidean transformation and affine transformation that enable rotation and parallel translation, and projective transformation that enables keystone correction are known as the method of the image stabilization process.

Although the Euclidean transformation can correct movement in an X-axis direction and a Y-axis direction and rotation, it cannot correct blur caused by camera shake of the image pickup unit 40 of the camera body 1 in a front-back direction or directions of pan and tilt. Accordingly, in this embodiment, the image stabilization process is executed using the affine transformation that enables correction of skew. The affine transformation from a coordinate (x, y) of the feature point used as criteria to a coordinate (x', y') is expressed by the following formula 1.

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad \text{Formula 1}$$

Affine coefficients of a 3*3 matrix of the formula 1 are computable if deviations of at least three feature points are detected. However, when the detected feature points are mutually near or are aligned on a straight line, the image stabilization process becomes inaccurate in areas distant from the feature points or distant from the straight line. Accordingly, it is preferable to select the feature points to be detected that are mutually distant and do not lie on a straight line. Accordingly, when a plurality of feature points are detected, mutually near feature points are excluded and remaining feature points are normalized by a least square method.

Figure 18F:
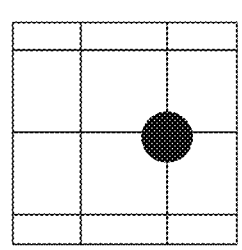

FIG. 18F is a view showing an image obtained by applying the image stabilization process in the step S903 to the distortion-corrected image shown in FIG. 18E. Since the extraction process is performed in executing the image stabilization process, a field angle of the image shown in FIG. 18F becomes smaller than that of the image shown in FIG. 18E.

It is available to obtain a high quality image of which blur is corrected by performing such an image stabilization process.

In the above, the series of operations executed by the camera body 1 and display apparatus 800 that are included in the camera system of this embodiment have been described.

When the user selects the video image mode by the image pickup mode switch 12 after turning the power switch 11 ON and observes the front without turning the face in the vertical and horizontal directions, the face direction defection unit 20 detects the observation direction vo (vector information [0°, 0°]) as shown in FIG. 12A. After that, the recording-direction/field-angle determination unit 30 extracts the image (FIG. 11B) in the target visual field 125o shown in FIG. 12A from the superwide-angle image projected onto the solid state image sensor 42.

Figure 11C:
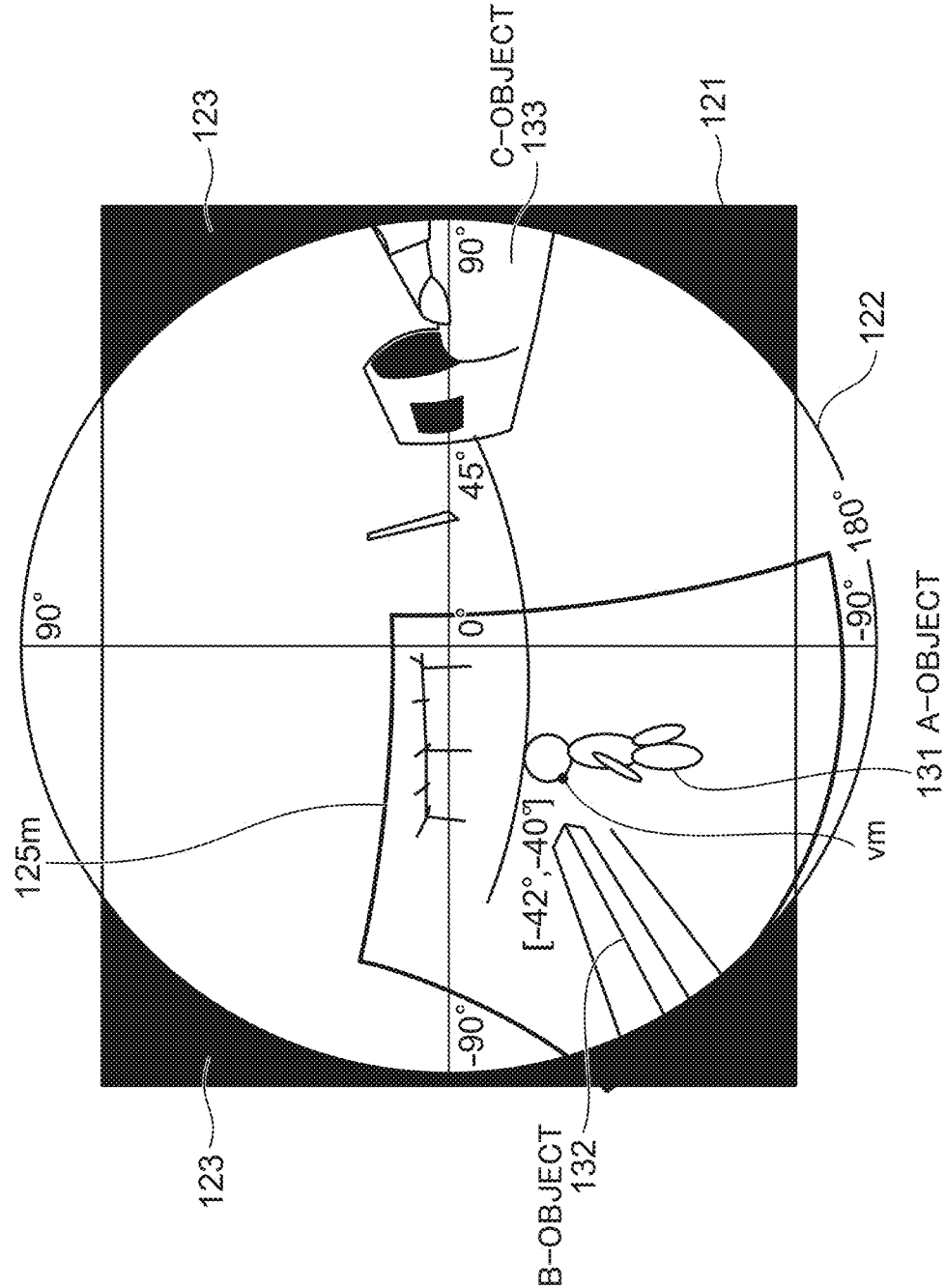
FIG. 11C is a view showing the target visual field set in the superwide-angle image in a case where the user is observing an A-object.

After that, when the user starts observing the child (A-object) 131 in FIG. 11A, for example, without operating the camera body 1, the face direction detection unit 20 detects the observation direction vm (vector information [−42°, −40°]) as shown in FIG. 11C. After that, the recording-direction/field-angle determination unit 30 extracts the image (FIG. 11C) in the target visual field 125m from the superwide-angle image picked up by the image pickup unit 40.

Figure 11D:
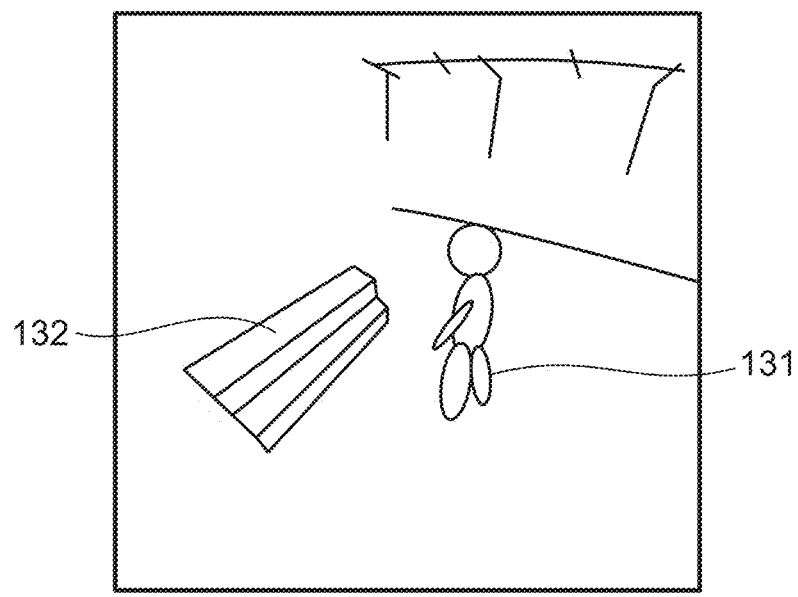
FIG. 11D is a view showing an image that is obtained by correcting distortion and blur of an image in the target visual field in FIG. 11C extracted from the superwide-angle image.
Figure 11E:
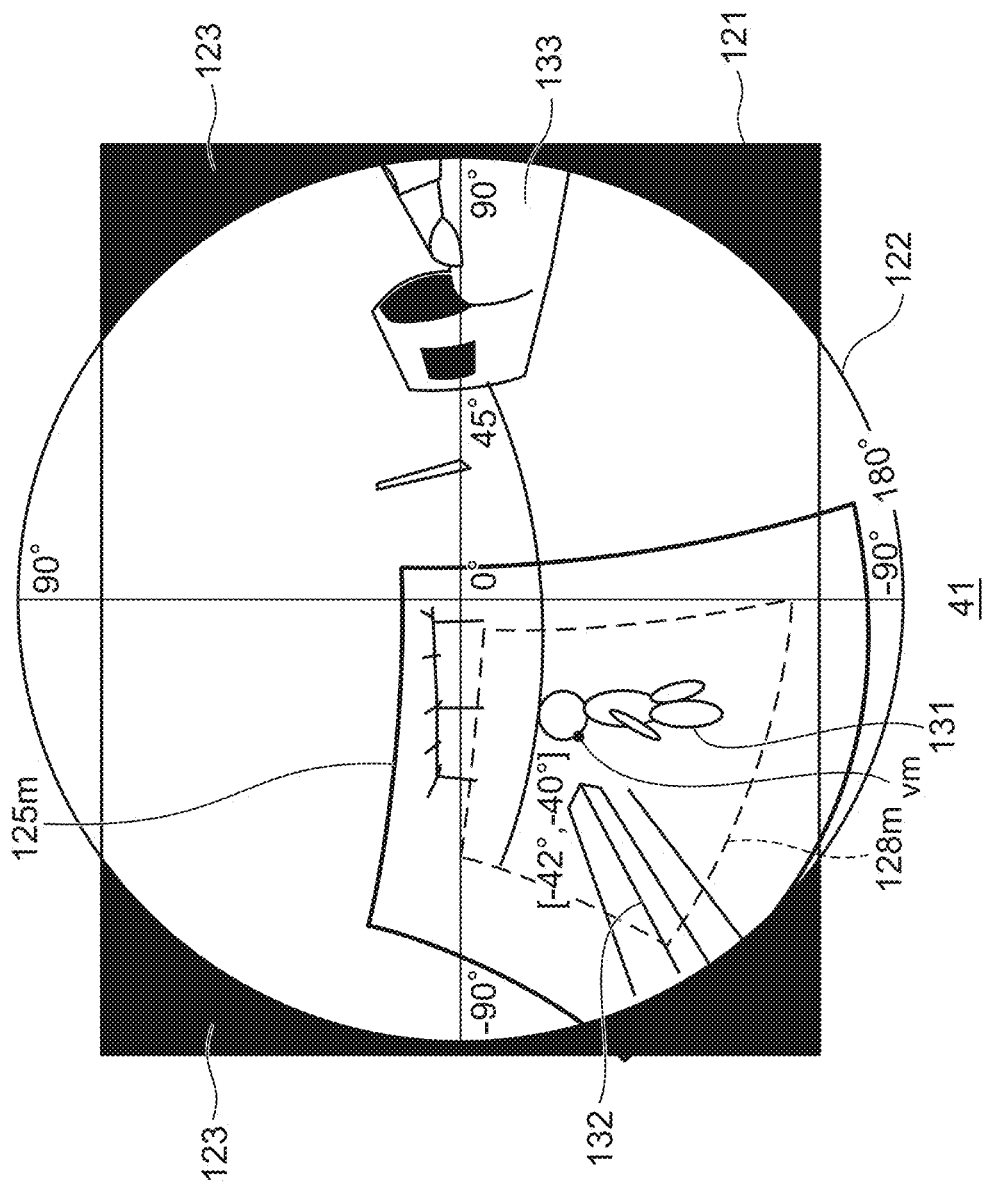
FIG. 11E is a view showing a target visual field set in the superwide-angle image in a case where the user is observing the A-object at a field-angle set value smaller than that in FIG. 11C.
Figure 11F:
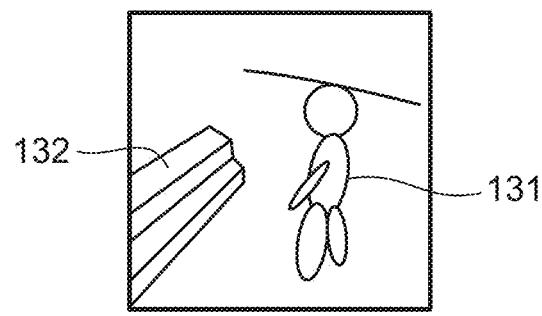
FIG. 11F is a view showing an image that is obtained by correcting distortion and blur of an image in the target visual field in FIG. 11E extracted from the superwide-angle image.

In this way, the display apparatus 800 applies the optical correction process and image stabilization process to the extracted image of the shape depending on the observation direction in the steps S800 and S900. Thereby, even if the specification of the overall control CPU 101 of the camera body 1 is low, the significantly distorted image in the target visual field 125m (FIG. 11C) is converted into the image around the child (A-object 131) of which the blur and distortion are corrected as shown in FIG. 11D. That is, the user is able to obtain an image picked up in the own observation direction, even if the user does not touch the camera body 1 except to turn the power switch 11 ON and to select the mode with the image pickup mode switch 12.

Although the case where the face direction detection unit 20 and the image pickup unit 40 are integrally constituted in the camera body 1 is described in this embodiment, the configuration is not limited to this as long as the face direction detection unit 20 is worn on the user's body part other than the head and the image pickup unit 40 is worn on the user's body. For example, the image pickup unit 40 of this embodiment can be worn on a shoulder or an abdomen. However, when the image pickup unit 40 is worn on a right shoulder, an object of the left side is obstructed by the head. In such a case, it is preferable that a plurality of image pickup units are worn on places including a right shoulder. Moreover, when the image pickup unit 40 is worn on an abdomen, spatial parallax occurs between the image pickup unit 40 and the head. In such a case, it is preferable to perform a correction calculation of the observation direction that compensate such parallax.

Hereinafter, a second embodiment will be described. In the second embodiment, a method to calibrate individual difference and adjustment difference of a user who wears the camera body 1 is described in detail using FIG. 20A through FIG. 23E.

This embodiment is described as a derivation from the first embodiment basically. Accordingly, configurations of the camera system in the second embodiment that are identical to the configurations of the camera system in the first embodiment are indicated by the same reference numerals and duplicated descriptions are omitted. A different configuration will be described by adding details.

A user who wears the camera body 1 has individual difference and adjustment difference, such as a physique, a tilt angle of periphery of a neck to which the camera body 1 is worn, a state of a cloth like a collar in wearing, and adjustment states of the band parts 82L and 82R. Accordingly, the optical axis center of the image pickup lens 16 of the camera body 1 and the visual field center in a state (hereinafter, referred to as a natural state of a user) where the user faces the front do not coincide usually. It is preferable for a user to match a center of an extraction recording area (target visual field 125) to a visual field center of the user in a current posture or operation rather than to match the center of the recording area to the optical axis center of the image pickup lens 16 of the camera body 1.

Moreover, there is individual difference not only in a visual field center of a user in the natural state but also in a visual field center depending on a head direction (up, down, right, left, or slants) and in a motion space of a head.

Accordingly, individual difference also generates in the relationship between the face direction (observation direction) detected by the face direction detection unit 20 and the center position (hereinafter referred to as a visual field center position) of the target visual field 125 established according to the observation direction. Accordingly, a calibration operation that associates a face direction to a visual field center position is needed.

Usually, the calibration operation is preferably performed as a part of the preparation process (the step S100) in FIG. 7A. It is assumed of performing the calibration operation at the first start-up of the camera body 1 usually. It should be noted that the calibration operation may be performed when a predetermined time elapses after the previous calibration or when the position of the camera body 1 to the user is changed from the position at the previous calibration. The calibration operation may be performed when the face direction detection unit 20 becomes impossible to detect a user's face. Moreover, when it is detected that the user detaches the camera body 1, the calibration operation may be performed at the time when the user again wears the camera body 1. In this way, it is preferable to perform the calibration operation suitably at a timing when it is determined that the calibration is needed to use the camera body 1 appropriately.

Figure 20A:
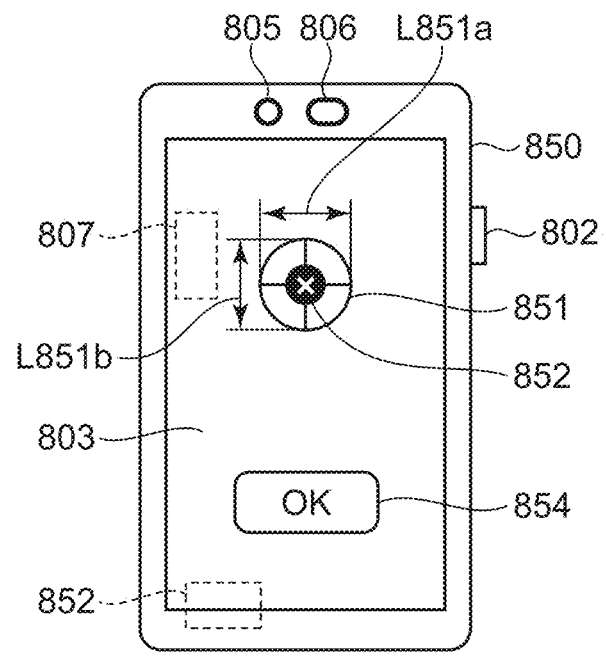
FIG. 20A and FIG. 20B are the views showing details of a calibrator used for a calibration process according to a second embodiment.
Figure 20B:
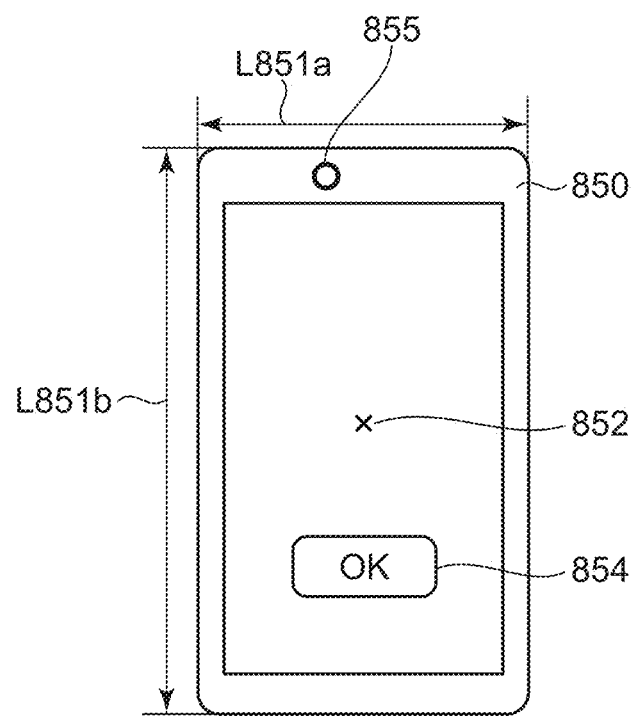

FIG. 20A and FIG. 20B are the views showing details of the calibrator 850 used for the calibration process according to the second embodiment. In this embodiment, the calibrator 850 shall combine the function of the display apparatus 800.

The calibrator 850 includes a positioning index 851 and calibration button 854 in addition to the A-button 802, display unit 803, in-camera 805, face sensor 806, and angular speed sensor 807 that are the components of the display apparatus 800 shown in FIG. 1D. The B-button 804 provided in the first embodiment is not illustrated in FIG. 20A because it is not used in this embodiment and is replaceable with the calibration button 854 as mentioned later.

FIG. 20A shows a case where the positioning index 851 is a specific pattern displayed on the display unit 803. FIG. 20B shows a case where the external appearance of the calibrator 850 is used as the positioning index. In the case of FIG. 20B, a positioning index center 852 mentioned later is calculated from the information about the contour of the calibrator 850.

It should be noted that the positioning index is not limited to the examples of FIG. 20A and FIG. 20B. For example, the positioning index may be separated from the calibrator 850. The positioning index may be anything as long as its size is easily measured and its shape is suitable to be looked at by the user. For example, the positioning index may be a lens cap of the image pickup lens 16 or a charge unit for the camera body 1. Anyway, since a fundamental way of thinking in the calibration operation is common, the calibrator 850 shown in FIG. 20A is exemplified and is mainly described hereinafter.

It should be noted that the calibrator 850 in this embodiment shall combine the function of the display apparatus 800. Moreover, the calibrator 850 may be a dedicated device, a general smart phone, or a tablet terminal, for example.

The positioning index 851 is displayed on the display unit 803 of the calibrator 850 and is a diagram of which a lateral width L851a, vertical width L851b, and positioning index center 852 can be calculated. Since the user directs the face toward the vicinity of the central part of the positioning index 851 in the calibration process mentioned later, the positioning index 851 is preferably shaped so as to be caught at the visual field center. In FIG. 20A, the positioning index 851 is shown by a circle in which a cross and a small black circle at the center of the cross are arranged. However, the shape of the positioning index 851 is not limited to this shape. Otherwise, the positioning index may be a rectangle, a triangle, a star-shaped figure, or an illustration of a character.

The positioning index 851 is picked up by the image pickup unit 40 of the camera body 1. The display-apparatus controller (a position calculation unit and a distance calculation unit) 801 calculates a distance between the image-pickup/detection unit 10 and the calibrator 850 and calculates a positional coordinate of the positioning index 851 appeared in an image area on the basis of the pickup image. The calibrator 850 equipped with the function of the display apparatus 800 performs these calculations in this embodiment. If the calibrator 850 does not combine the function of the display apparatus 800, these calculations are performed by the overall control CPU 101 of the camera body 1.

The angular speed sensor 807 can measure movement of the calibrator 850. On the basis of the measurement value of the angular speed sensor 807, the display-apparatus controller 801 calculates later-mentioned movement information about the calibrator 850.

The calibration button 854 is pressed when the user directs the face toward the vicinity of the central part of the positioning index 851 in the calibration process mentioned later. Although the calibration button 854 is a touch button displayed on the touch-sensitive display unit 803 in FIG. 20A, the A-button 802 may function as the calibration button.

Next, the calibration process executed in extracting an image from a superwide-angle image picked up by the image pickup unit 40 according to a user's face direction and in applying the image process to the extracted image will be described in detail using a flowchart in FIG. 21.

Figure 21:
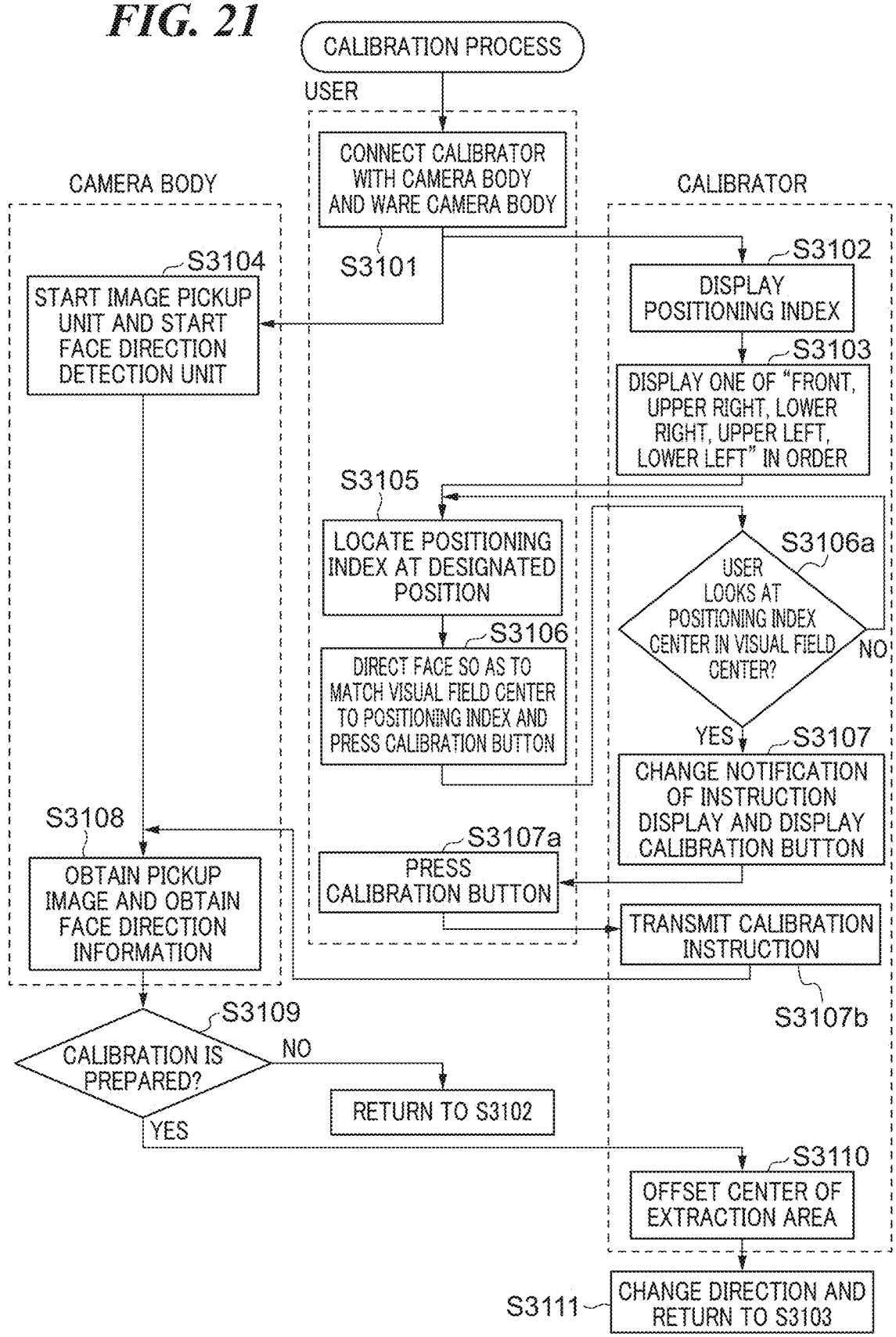
FIG. 21 is a flowchart showing the calibration process according to the second embodiment executed by the camera body and the calibrator.

FIG. 21 is the flowchart showing the calibration process according to this embodiment executed by the camera body (a first calibration unit) 1 and calibrator 805.

In order to assist the description, a step in which the camera body 1 or the calibrator 850 receives a user's instruction is included in a frame of which an operation subject is the user. Moreover, in FIG. 21, a step executed by the display-apparatus controller 801 of the calibrator 850 in response to the user's instruction is included in a frame of which an operation subject is the calibrator 850. Similarly, in FIG. 21, a step executed by the overall control CPU 101 of the camera body 1 in response to the user's instruction is included in a frame of which an operation subject is the camera body 1.

Specifically, the operation subject of steps S3104 and S3108 in FIG. 21 is the camera body 1. And the operation subject of steps S3101, S3105, and S3106 is the user. Moreover, the calibrator 850 is the operation subject of steps S3102, S3103, S3106a, S3107, S3107b, and S3110.

In this process, when the power of the calibrator 850 is not ON, the user turns the power of the calibrator 850 ON by operating the A-button 802 in the step S3101. Similarly, when the power of the camera body 1 is not ON, the user turns the power of the camera body 1 ON by switching the power switch 11 to ON. After that, the user establishes a connection between the calibrator 850 and the camera body 1. When this connection is established, the display-apparatus controller 801 and the overall control CPU 101 enter a calibration mode, respectively.

Moreover, in the step S3101, the user wears the camera body 1, and adjusts the lengths of the band parts 82L and 82R and the angle of the camera body 1 so that the camera body 1 will be arranged in a suitable position and the image-pickup/detection unit 10 can pick up an image.

In the step S3102, the display-apparatus controller (a first display unit) 801 displays the positioning index 851 on the display unit 803.

Figure 22A:
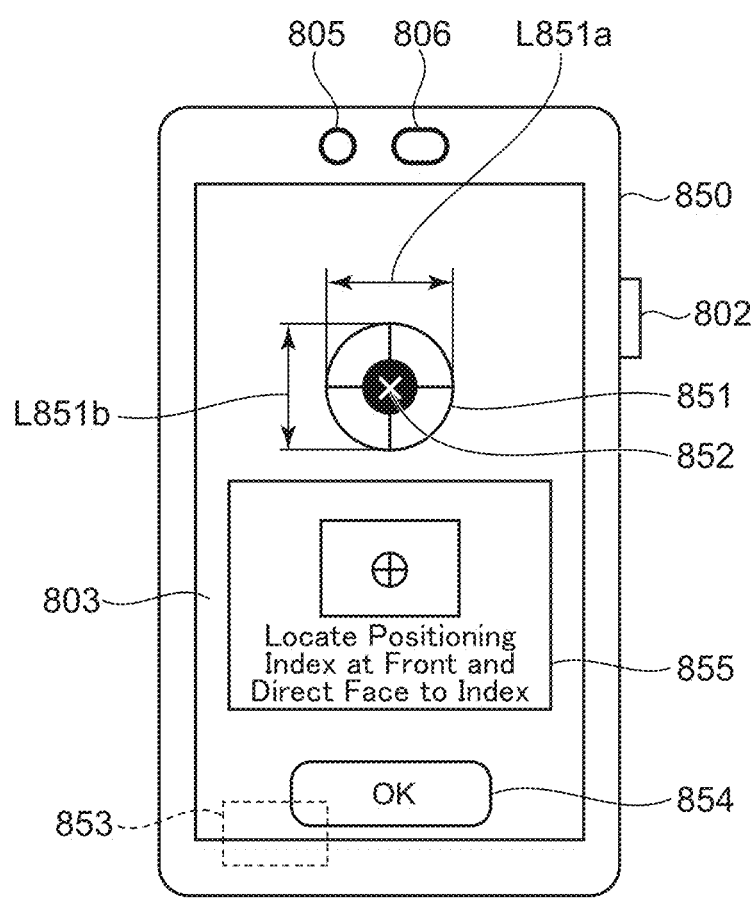
FIG. 22A is a view showing a screen displayed on a display unit of the calibrator in a step S3103 in FIG. 21 during a calibration operation for a front direction of the user.

In the next step S3103, the display-apparatus controller 801 designates a designation position at which the user should hold the calibrator 850 as an instruction display 855 (FIG. 22A). In this embodiment, five positions including front, upper right, lower right, upper left, and lower left are designated as the designation positions in order. The designation positions may be set to other positions as long as the calibration is available.

In the step S3104, the overall control CPU 101 activates the image pickup unit 40 so as to enable an image pickup operation and activates the face direction detection unit 20 so as to enable detection of a user's face direction.

In the step S3105, the user holds the calibrator 850 at the designation position designated in the step S3103.

In the next step S3106, the user directs the face in the direction of the positioning index 851 to match a user's visual field center with the positioning index 851 and presses the calibration button 854 while maintaining the position of the calibrator 850 at the designation position.

In the step S3106a, the display-apparatus controller (a second display unit) 801 determines whether the user looks at the positioning index center 852 of the positioning index 851, i.e., determines whether the user's visual field center matches the positioning index center 852. When it is determined that the user looks at the positioning index center 852 (YES in the step S3106a), the display-apparatus controller 801 notifies the user of start of the calibration for the designation position by the instruction display 855 in a step S3107 and redisplays the calibration button 854. When the determination result in the step S3106a is NO, the user repeats the process from the step S3105.

When the user presses the calibration button 854 in the step S3107a, the display-apparatus controller 801 transmits a calibration instruction to the camera body 1 in the step S3107b.

In the step S3108, the overall control CPU (an obtainment/detection unit) 101 obtains a superwide-angle image including the positioning index 851 picked up by the image pickup unit 40 and detects a face direction by the face direction detection unit 20 in response to the calibration instruction from the calibrator 850. After that, the overall control CPU (a generation unit) 101 calculates positional coordinate information about the positioning index center 852 in the obtained superwide-angle image and generates the information showing the relationship between the calculated positional coordinate information and the detected face direction.

Hereinafter, the details of the process in the steps S3103 through S3108 will be described using FIG. 22A through FIG. 22F. FIG. 22A through FIG. 22F are views for describing the calibration operation for the front direction of the user. The calibration operation is performed so that the center position of the target visual field 125 in the image picked up by the image pickup unit 40 of the camera body 1 will match the visual field center position of the user in the natural state.

FIG. 22A is a view showing a screen displayed on the display unit 803 of the calibrator 850 in the step S3103 in FIG. 21 during the calibration operation for the front direction of the user.

As shown in FIG. 22A, the positioning index 851 and the instruction display 855 that indicates a position at which the user should locate the positioning index 851 are displayed on the display unit 803 of the calibrator 850.

The instruction display 855 is a character string that instructs the user to locate the positioning index 851 at the visual field center of the user in directing the face to the front. It should be noted that the instruction displayed as the instruction display 855 is not restricted to the character string. For example, the instruction may be displayed by another method using an illustration, a picture, a moving image, or the like. Moreover, the instruction display 855 like what is called a general tutorial may be displayed first and the positioning index 851 may be displayed after that.

Figure 22B:
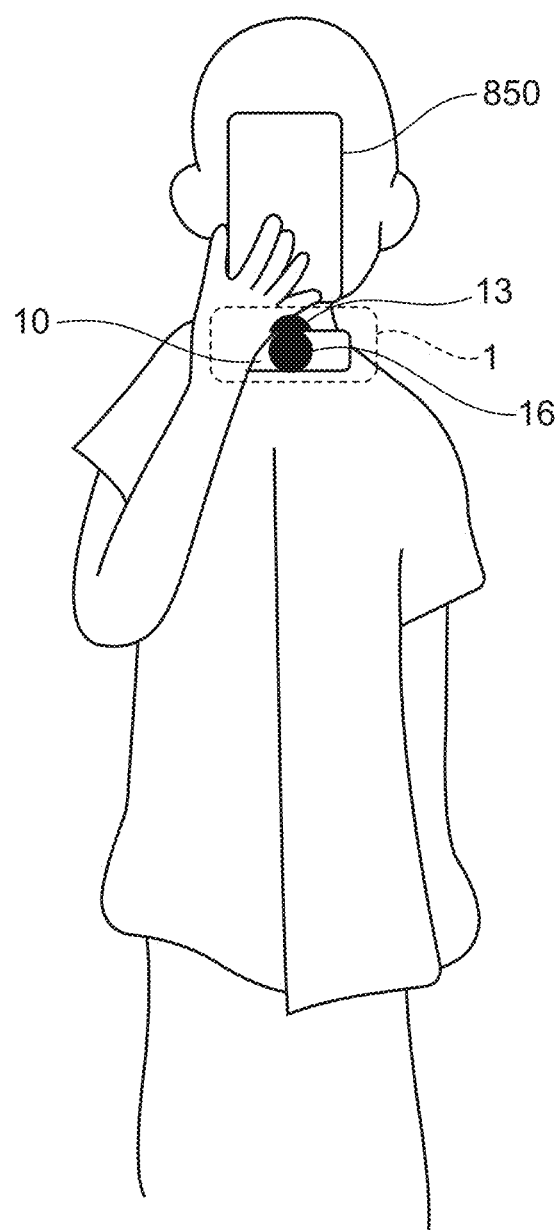
FIG. 22B is a view showing a state where the user holds the calibrator in the front according to an instruction shown as an instruction display in FIG. 22A.

FIG. 22B is a view showing a state where the user holds the calibrator 850 in the front according to the instruction displayed as the instruction display 855 in FIG. 22A.

In the step S3105, the user holds the calibrator 850 in the front according to the instructions displayed as the instruction display 855 in FIG. 22A. Then, in the step S3106, the user holds the calibrator 850 so that the positioning index 851 will match the visual field center of the user in directing the face to the front, and the user presses the calibration button 854 (FIG. 22A). In response to the press of the calibration button 854, the determination in the step S3106a is performed. The concrete procedure of this determination method will be mentioned later. When the determination result in the step S3106a is YES, the display-apparatus controller 801 changes the instruction display 855 shown in FIG. 22A to a notification of "Calibration for Front Direction is Started" and displays the calibration button 854.

Then, the user presses the calibration button 854 after confirming the change of the instruction display 855 shown in FIG. 22A to the notification of "Calibration for Front Direction is Started" (the step S3107a). In response to the press of the calibration button 854, a calibration instruction is transmitted to the camera body 1 in the step S3107*b*. And the image pickup unit 40 obtains a pickup image in the step S3108.

Figure 22C:
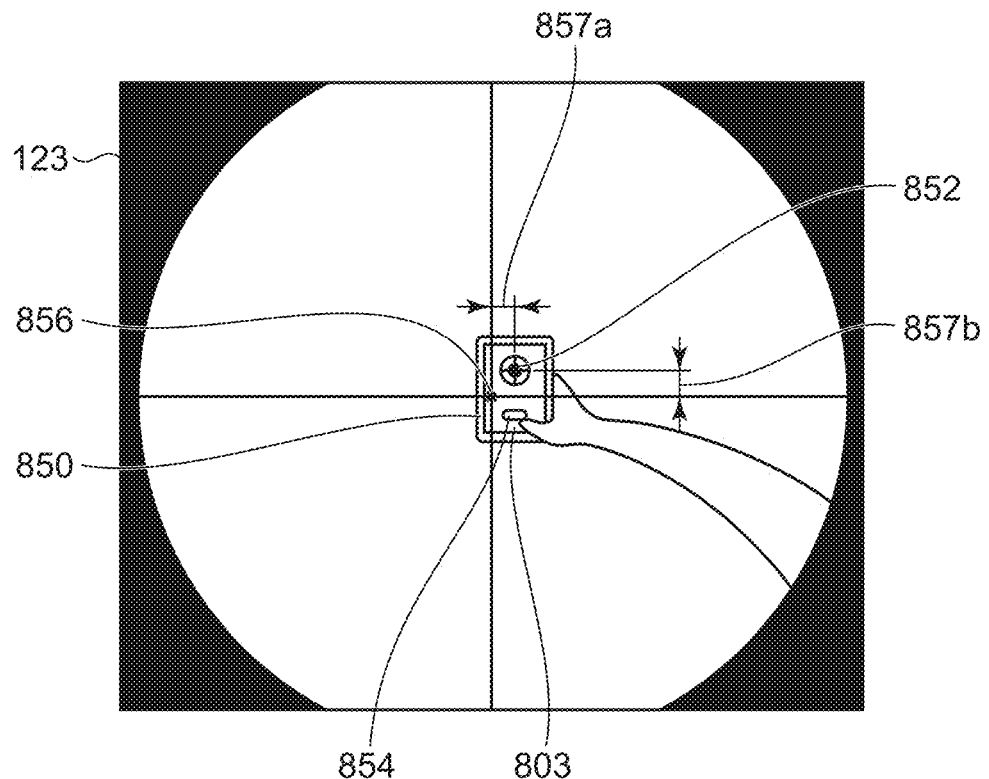
FIG. 22C is a schematic view showing an entire superwide-angle image that is caught by an image pickup lens in the state in FIG. 22B.
Figure 22D:
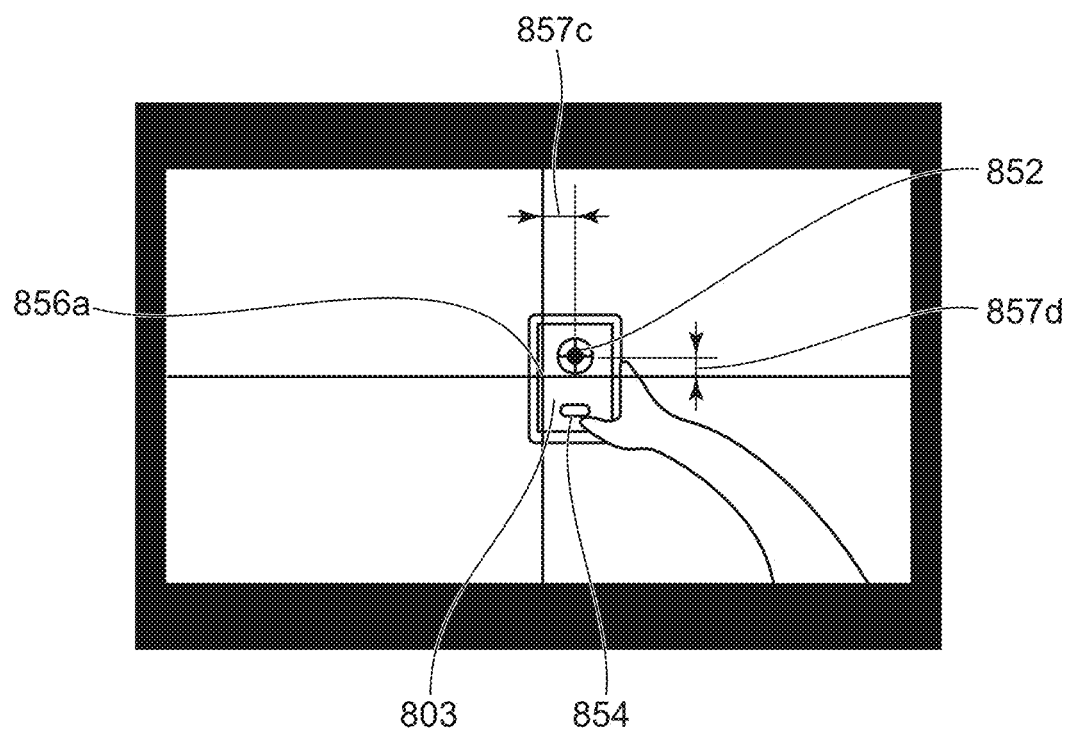
FIG. 22D is a schematic view showing an image that is obtained by correcting aberrations of the superwide-angle image shown in FIG. 22C.

FIG. 22C is a schematic view showing the entire superwide-angle image that is caught by the image pickup lens 16 in the state of FIG. 22B. FIG. 22D is a schematic view showing an image obtained by correcting aberrations of the superwide-angle image shown in FIG. 22C.

Moreover, in response to the press of the calibration button 854 by the user in the state of FIG. 22B, the face direction detection unit 20 obtains a face direction in the step S3108.

Figure 22E:
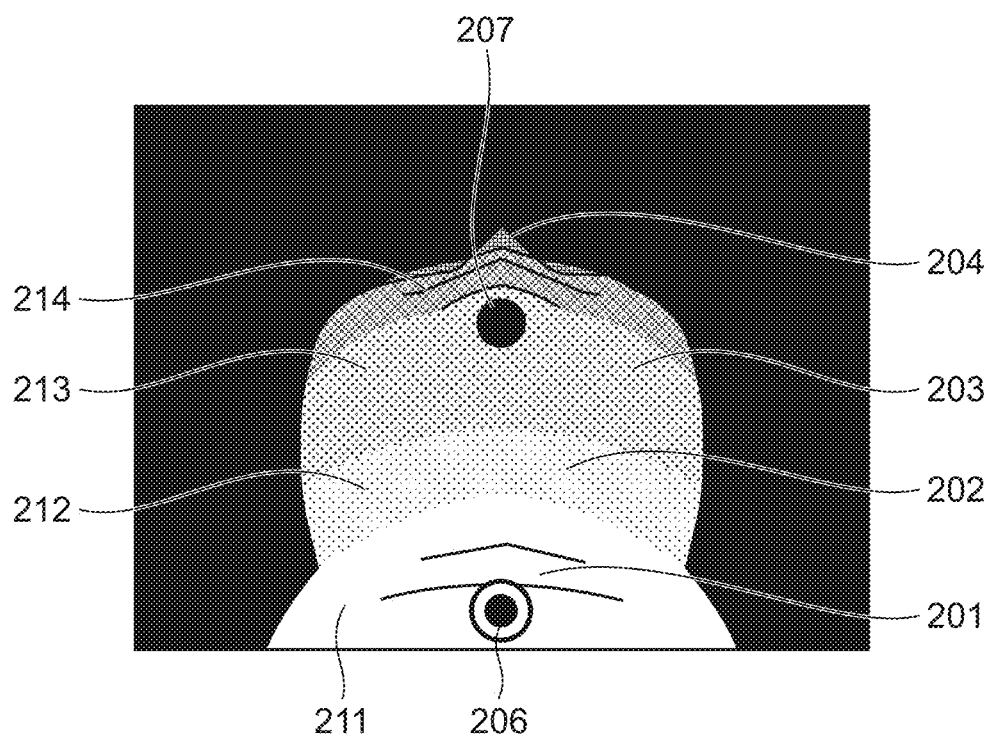
FIG. 22E is a schematic view showing a face direction image that is obtained by a face direction detection unit in a step S3108 in FIG. 21 during the calibration operation for the front direction of the user.

FIG. 22E is a schematic view showing a face direction image that is recorded by the face direction detection unit 20 in the step S3108 in FIG. 21 during the calibration operation for the front direction of the user.

As described in the first embodiment using FIG. 8G through FIG. 8K, the face direction detection unit 20 calculates the angles in the lateral and vertical directions of the face using the distances and angles of the chin positions 207, 207*r*, and 207*u* with respect to the throat position 206. However, since the distances and angles of the chin positions 207, 207*r*, and 207*u* with respect to the throat position 206 also have the individual difference and adjustment difference due to the user's physique etc. mentioned above as with the image center, they are not fixed. Accordingly, in this embodiment, the relationship between the chin position and the throat position 206 at the time of pressing the calibration button 854 is defined as a value (a reference position) of a case where the user puts the visual field center in the front. This can be used as information (reference position information) for calculating a user's face direction correctly irrespective of the individual difference and adjustment difference.

Returning back to FIG. 21, in a step S3109, the overall control CPU 101 determines whether the calibration for the front direction is prepared. That is, it is determined whether the information required to calculate the chin position 207, throat position 206, and positioning index center 852 has been obtained.

At this time, when the obtainment of the required information is not completed, it is determined that the calibration is not prepared (NO in the step S3109), and the operations from the step S3102 are repeated so as to obtain deficient information among the required information. When the obtainment of the required information is not completed, not all the operations from the step S3102 are necessary. Only the operations to obtain the deficient information may be performed again.

The determination in the step S3106*a* is performed using the face sensor 806 or in-camera 805 mounted in the calibrator 850. Hereinafter, the concrete procedure of this determination method will be described using a case where the calibration operation for the front direction is performed using the in-camera 805. Although a case using the face sensor 806 is different from the case using the in-camera 805 in the dimension of information (two-dimensional information or three-dimensional information), a fundamental way of thinking is common. Accordingly, detailed description of the case using the face sensor 806 is omitted. When the face sensor 806 is used in the determination in the step S3106*a*, the face direction detection unit 20 of the camera body 1 does not perform the face detection that irradiates the user with the infrared light 23 during a period when the user is irradiated with the infrared light 823 from the face sensor 806. This aims to prevent interference of the infrared lights 23 and 823.

First, when the user presses the calibration button 854 in FIG. 22A in the step S3106, the display-apparatus controller 801 obtains an in-camera image 858 (FIG. 22F) in which the user appears by picking up an image with the in-camera (a face detection unit) 805. Furthermore, the display-apparatus controller 801 detects the position information about the neck front part 201, chin 203, face 204 including a nose, and image-pickup/detection unit 10 (the image pickup unit 40) from the obtained in-camera image 858.

The display-apparatus controller (a determination unit) 101 determines whether the user is looking at the positioning index center 852 of the positioning index 851 at the visual field center in the step S3106*a* using the position information detected from the in-camera image 858.

As a result of the determination, when it is determined that the user is looking in a different direction, the display-apparatus controller 801 displays a message indicating that the correct information cannot be obtained as the instruction display 855. This can instruct the user to perform the calibration operation again.

The display-apparatus controller 801 can determine that the correct calibration operation cannot be performed using the in-camera image 858 when the image-pickup/detection unit 10 tilts beyond a certain angle or when the face direction detection window 13 is blocked or is dirty. In such a case, the display-apparatus controller 801 may display the message indicating that the correct information cannot be obtained as the instruction display 855.

Furthermore, it is also able to obtain information required for parallax correction mentioned later in a fifth embodiment using the in-camera image 858 obtained in the step S3106*a* and the superwide-angle image obtained in the step S3108.

Specifically, the information about the size (the lateral width L851*a* and vertical width L851*b*) of the positioning index 851 is transmitted to the camera body 1 beforehand from the calibrator 850 before the positioning index 851 is picked up by the image pickup unit 40 in the step S3108. Thereby, the overall control CPU 101 can calculate the distance between the image-pickup/detection unit 10 and the positioning index 851 by using the information about the size of the positioning index 851 and the image of the positioning index 851 appeared in the superwide-angle image obtained in the step S3108. Since the positioning index 851 and the in-camera 805 is installed in the same casing of the calibrator 850 and the calibrator 850 is directly faced to the user in FIG. 22B, the distance between the in-camera 805 and the image-pickup/detection unit 10 is equal to the distance between the positioning index 851 and the image-pickup/detection unit 10.

Figure 22F:
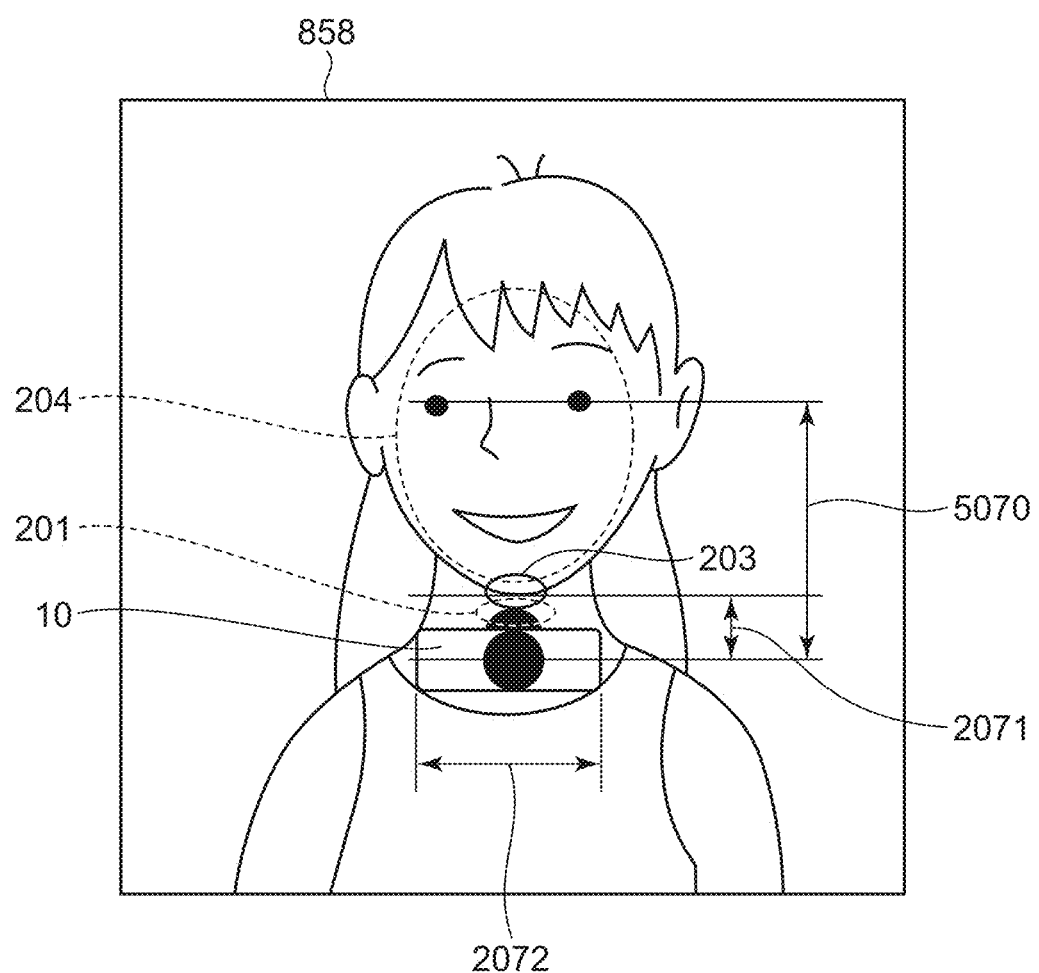
FIG. 22F is a schematic view showing an in-camera image displayed in a step S3107 in FIG. 21.

Similarly, information about the size of the image-pickup/detection unit 10 is transmitted to the calibrator 850 beforehand from the camera body 1 before the in-camera image shown in FIG. 22F is picked up by the in-camera 805 in the step S3106*a*. Thereby, the display-apparatus controller (a vertical distance calculation unit) 801 can estimate a vertical distance 5070 between the optical axis center of the image pickup lens 16 and a view position of the user by using the information about the size of the image-pickup/detection unit 10 and the image of the image-pickup/detection unit 10 appeared in the in-camera image 858 shown in FIG. 22F. In addition, the display-apparatus controller 801 can estimate a distance 2071 between the image pickup lens 16 and the chin

203 of the user. The distance 2071 may be a distance between the face direction detection window 13 and the chin 203.

In order that the face direction detection unit 20 calculates the throat position 206 and chin position of the user, it is necessary to separate the user's face from the face direction detection window 13 by a distance more than a certain distance according to design of the face direction detection unit 20.

Accordingly, this estimated result can be employed as one of determination conditions in determining whether the face direction detection unit 20 is able to detect the face direction correctly.

Returning back to FIG. 21, the overall control CPU 101 proceeds with the process to the step S3110 when determining that the required information is obtained and that the preparation of the calibration for the front direction is completed.

In the step S3110, the display-apparatus controller (the first calibration unit) 801 calculates information required to offset the extraction center position so as to absorb the individual difference and adjustment difference and offsets the extraction center position on the basis of the information.

Details of the calculation in the step S3110 will be described as follows. If the user is in an ideal state according to design values and the camera body 1 is worn ideally, a center 856 of the superwide-angle image obtained in the step S3108 shown in FIG. 22C should be almost coincident with the positioning index center 852 appeared in the superwide-angle image. However, since there are individual difference and adjustment difference due to the user's physique etc. actually, the center 856 of the superwide-angle image does not match the positioning index center 852 usually.

It is preferable for a user to match the extraction center position to a visual field center of the user in a current posture or operation (i.e., the positioning index center 852 in the superwide-angle image) rather than to match to the center 856 of the superwide-angle image shown by the camera body 1.

Accordingly, a deviation amount of the positioning index center 852 from the center 856 of the superwide-angle image is measured, and the extraction center position is offset to a position based on the positioning index center 852 that differs from the center 856 of the superwide-angle image. Moreover, the face direction that is detected by the face direction detection unit 20 in that time is also offset in a similar way.

Concrete offset methods will be described by referring to FIG. 22C and FIG. 22D. The deviation amount of the positioning index center 852 to the center 856 of the superwide-angle image is measured, and the measured deviation amount is divided into a lateral deviation amount 857*a* and a vertical deviation amount 857*b* as shown in FIG. 22C. An offset amount is determined on the basis of the deviation amounts 857*a* and 857*b* after performing a suitable conversion process in accordance with the projection method of the entire field angle.

Moreover, as shown in FIG. 22D, the offset amount may be determined after applying the suitable conversion process to the superwide-angle image in accordance with the projection method. That is, the deviation amount of the center 856*a* from the positioning index center 852 in the pickup image after conversion is measured. And the deviation amount is divided into a lateral deviation amount 857*c* and a vertical deviation amount 857*d*. Then, the offset amount may be determined on the basis of the deviation amounts 857*c* and 857*d*.

The offset method can be arbitrarily selected from among the methods shown in FIG. 22C and FIG. 22D in consideration of a processing load and a purpose of the camera system.

By performing the above-mentioned calibration operation for the front direction, a face direction of a user who wears the camera body 1, a visual field center in the face direction within a superwide-angle image, and a face direction detected by the face direction detection unit 20 are appropriately associated irrespective of individual difference and adjustment difference.

The calibration operation for the front direction is described up to here among the five directions (front, upper right, lower right, upper left, and lower left). It is necessary to execute similar calibration operations for the remaining four directions.

Accordingly, when the process in the step S3110 in FIG. 21 is completed, the process proceeds to a step S3111. In the step S3111, when there is a direction for which the calibration operation is not performed among the five directions, a target direction of the calibration operation is changed, and the process returns to the step S3103. Thereby, the calibration operation is similarly repeated for the remaining four directions other than the already finished front direction.

Although it is not shown in FIG. 21, when it is determined that there is no direction for which the calibration operation is not performed in the step S3111, this process is finished as-is.

FIG. 23A through FIG. 23E are views for describing the calibration operation for an upper right direction of the user (the upper right direction in the superwide-angle image). FIG. 23A through FIG. 23E respectively correspond to FIG. 22A through FIG. 22E and the fundamental operation is also identical. Accordingly, the common description is omitted.

Figure 23A:
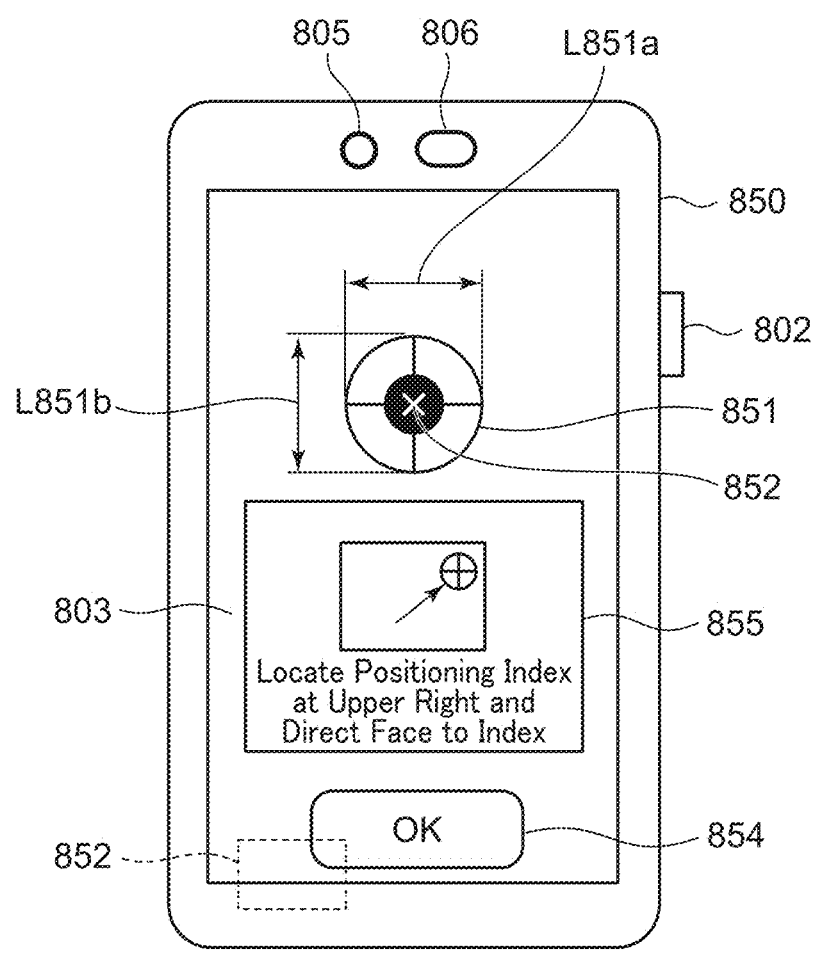
FIG. 23A is a view showing a screen displayed on the display unit of the calibrator in the step S3103 in FIG. 21 during the calibration operation in an upper right direction of the user.

As shown in FIG. 23A, the instruction display 855 displays a character string that instructs the user to locate the positioning index 851 at the visual field center of the user in directing the face to the upper right.

Figure 23B:
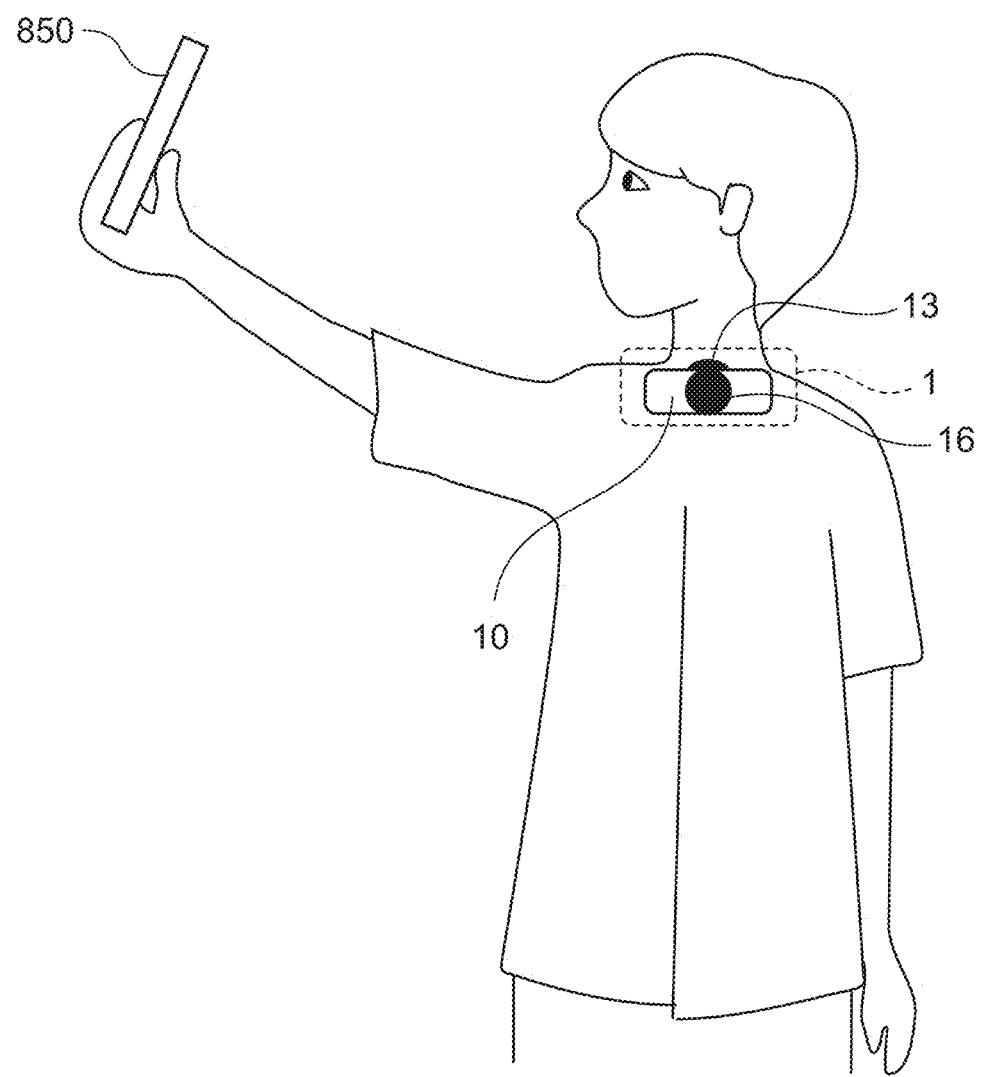
FIG. 23B is a view showing a state where the user holds the calibrator to upper right according to an instruction shown as the instruction display in FIG. 23A.
Figure 23C:
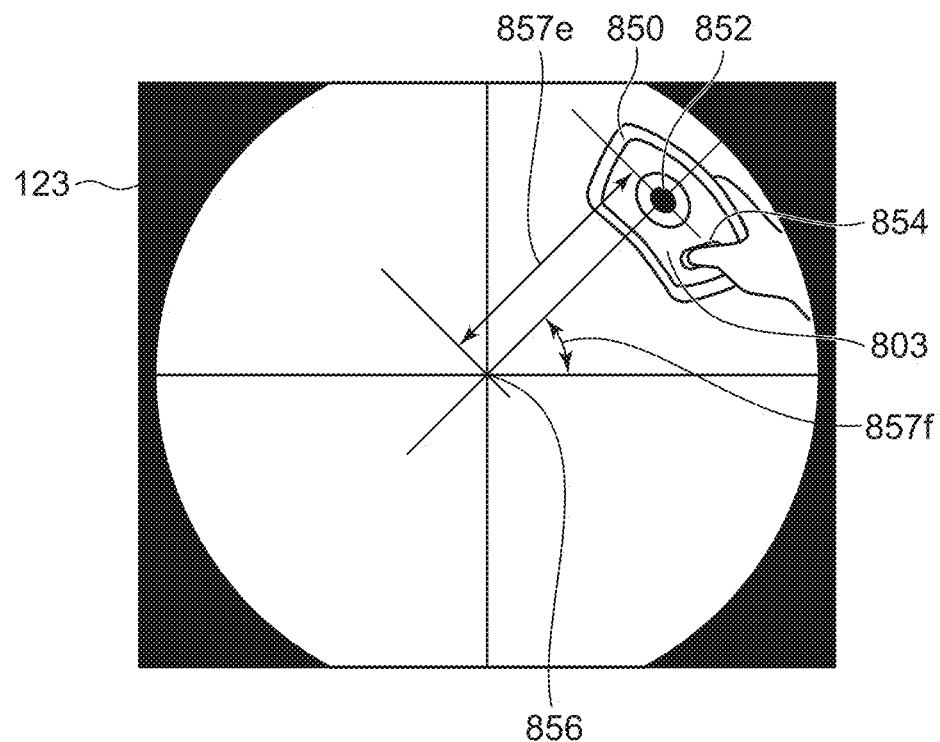
FIG. 23C is a schematic view showing the entire superwide-angle image that is caught by the image pickup lens in the state in FIG. 23B.

FIG. 23B is a view showing a state where the user holds the calibrator 850 to upper right according to the instruction shown by the instruction display 855 in FIG. 23A. FIG. 23C is a schematic view showing the entire superwide-angle image that is caught by the image pickup lens 16 in the state in FIG. 23B.

As shown in FIG. 23C, a deviation amount between the center 856 of the superwide-angle image and the positioning index center 852 is measured first according to a concrete offset method. After that, the measured deviation amount is divided into a radial deviation amount 857*e* and an angular deviation amount 857*f*. An offset amount is determined on the basis of the deviation amounts 857*e* and 857*f* after performing a suitable conversion process in accordance with the projection method of the entire field angle.

Figure 23D:
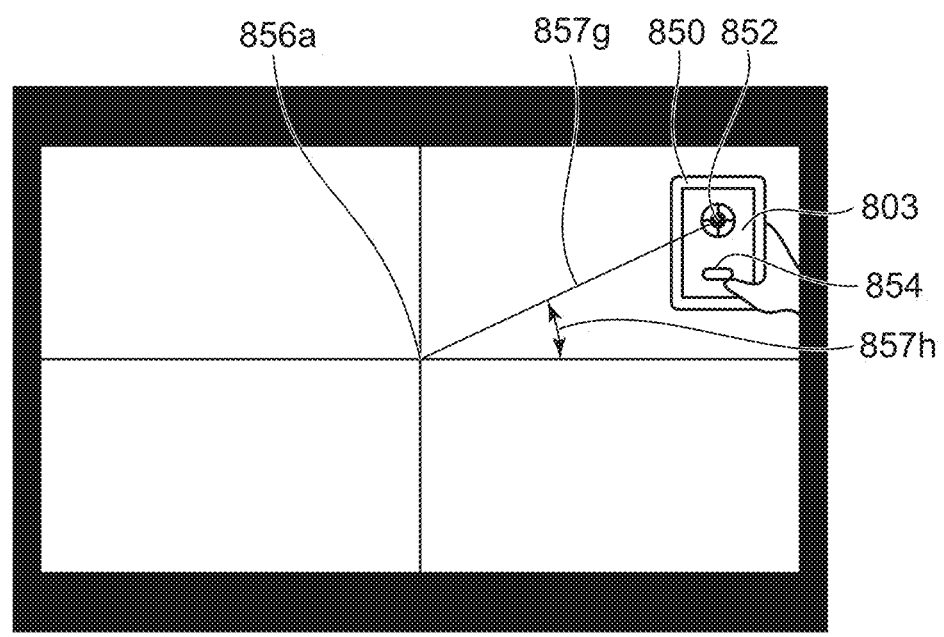
FIG. 23D is a schematic view showing an image that is obtained by correcting aberrations of the superwide-angle image shown in FIG. 23C.

Moreover, as shown in FIG. 23D, the offset amount may be determined after applying the suitable conversion process to the superwide-angle image in accordance with the projection method. That is, the deviation amount of the center 856*a* from the positioning index center 852 in the pickup image after conversion is measured. And the deviation amount is divided into a radial deviation amount 857*g* and an angular deviation amount 857*h*. Then, the offset amount may be determined on the basis of the deviation amounts 857*g* and 857*h*.

The determination of the offset amount described using FIG. 22A through FIG. 22E employs the method of dividing the deviation amount into the lateral deviation amount and vertical deviation amount. As compared with this, the determination of the offset amount described using FIG. 23A through FIG. 23E employs the method of dividing the deviation amount into the radial deviation amount and angular deviation amount. The difference in method is only for convenience of description, and either method can be employed.

Figure 23E:
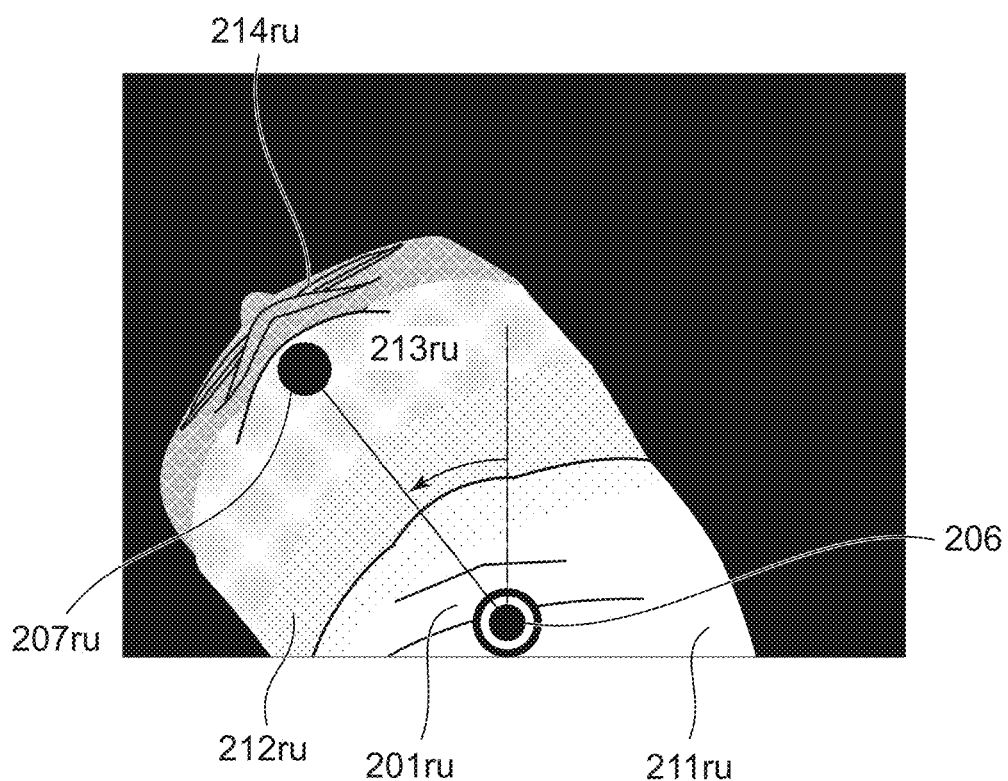
FIG. 23E is a schematic view showing a face direction image that is obtained by the face direction detection unit in the step S3108 in FIG. 21 during the calibration operation for the upper right direction of the user.

Moreover, the face direction detection unit 20 has obtained, as shown in FIG. 23E, the throat position 206 and the chin position 207ru required to calculate the face direction in directing the face to the upper right. Accordingly, the face direction of the user in looking in the direction (in this case, the upper right direction) toward the positioning index center 852 can be correctly measured irrespective of individual difference and adjustment difference of the user.

As mentioned above, the calibration operations for upper right, lower right, upper left, and lower left directions in addition to the front direction are performed in the calibration process shown in FIG. 21. Thereby, when the user turns the head in either of the upper, lower, right, and left directions, the face direction detection unit 20 can correctly detect the direction in which the user turns. Accordingly, the user can use the camera body 1 appropriately irrespective of individual difference and adjustment difference.

In the above description, the method of performing the calibration operation repeatedly for the five directions (front, upper right, lower right, upper left, and lower left) is described to simplify the description.

However, the calibration operation is not limited to this method. For example, the following method may be employed. That is, a user continuously moves the calibrator 850 along a Z-shaped locus, a spiral locus, a polygonal locus, or the like according to the instruction display 855. At the same time, the user continuously catches the positioning index 851 displayed on the calibrator 850 at the visual field center. In this method, the display-apparatus controller 801 transmits the calibration instructions to the camera body 1 multiple times while the calibrator 850 is moving.

Whenever receiving the calibration instruction, the overall control CPU 101 obtains the face direction detected by the face direction detection unit 20 and the positional coordinate information about the positioning index center 852 in the superwide-angle image picked up by the image pickup unit 40, and saves them as history information. After that, the overall control CPU 101 calculates the relationship of the extraction center position of the image and the face direction of the user by combining the information extracted from the obtained history information. Furthermore, in this method, the information extracted from the history information may be limited to the information obtained when the user looks at the positioning index 851. The information is limited using the information about the in-camera 805 and face sensor 806 obtained by the calibrator 850 during movement of the calibrator 850. Thereby, the information obtained when the user is looking away is no longer extracted from the history information, which raises the accuracy of calculation of the relationship.

Moreover, the display-apparatus controller 801 may transmit a measurement value of the angular speed sensor 807 to the camera body 1 together with the calibration instruction. In this case, the overall control CPU 101 obtains movement information showing a moving locus of the calibrator 850 by the user and the position and posture of the calibrator 850 from the transmitted measurement value of the angular speed sensor 807. The movement information is also saved as the history information. Thereby, the calibration operation can be performed easily and correctly on the basis of the movement information based on the measurement value of the angular speed sensor 807, the face direction detected by the face direction detection unit 20, and the positional coordinate information about the positioning index center 852 in the superwide-angle image picked up by the image pickup unit 40.

In this case, the movement information based on the measurement value of the angular speed sensor 807 should be coincident with the movement information based on the positional coordinate information about the positioning index 851. Accordingly, when the measurement value of the angular speed sensor 807 is used, it is required to synchronize communication between the camera body 1 and the calibrator 850.

As mentioned above, the second embodiment describes the calibration method that enables to associate the face direction of the user with the center position of the target visual field 125 set in the superwide-angle image irrespective of individual difference and adjustment difference. In the meantime, the present disclosure is not limited to the various configurations exemplified in the second embodiment and various modifications are available within the scope of the present disclosure.

Next, a third embodiment will be described. In the third embodiment, a method for detecting a deviation of the camera body 1 from the user and operations in detecting the deviation are described in detail using FIG. 24A through FIG. 29.

This embodiment is described as a derivation from the first embodiment basically. Accordingly, configurations of the camera system in the third embodiment that are identical to the configurations of the camera system in the first embodiment are indicated by the same reference numerals and duplicated descriptions are omitted. A different configuration will be described by adding details.

The image pickup apparatus of this embodiment detects a user's face direction by observing a user's head from a user's throat and obtains an output image by extracting an image from a superwide-angle image on the basis of the detection result. Accordingly, when the user incorrectly wears the camera body 1 that has the face direction detection unit 20 and image pickup unit 40, or when a deviation arises from the position determined by the calibration, the face direction cannot be detected correctly and the output video image will incline. Accordingly, it is preferable to detect the positional deviation of the camera body 1 to the user and to perform correction or warning.

Since the image pickup apparatus of this embodiment assumes wear of a neck hanging type as with the first embodiment, there is a high possibility that a roll deviation and a pitch deviation occur around a main axis that is a visual line when a user looks at the front.

Figure 24A:
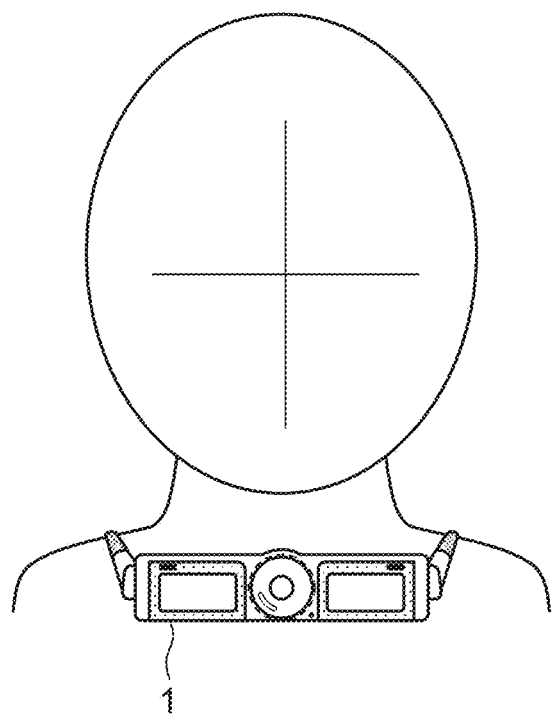
FIG. 24A and FIG. 24B are front views schematically showing a user who wears the camera body.
Figure 24B:
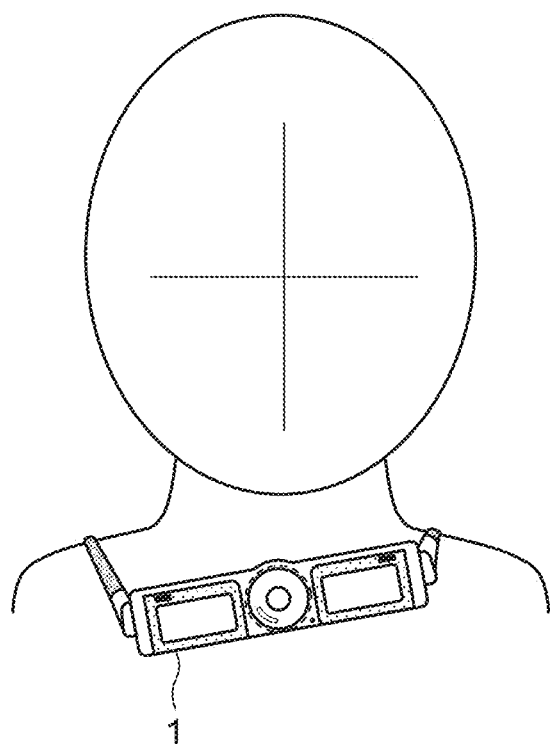

FIG. 24A and FIG. 24B are front views schematically showing a user who wears the camera body 1. FIG. 24A shows a state where the user correctly wears the camera body 1. FIG. 24B shows a state where the camera body 1 causes the roll deviation to the user.

Figure 25A:
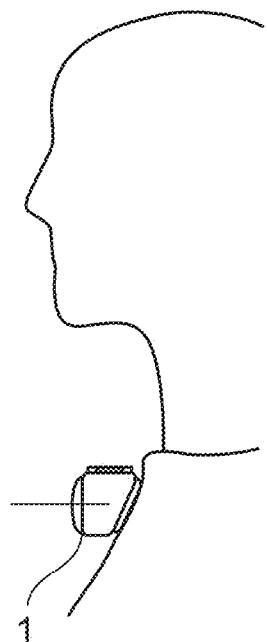
FIG. 25A and FIG. 25B are side views schematically showing the user who wears the camera body.
Figure 25B:
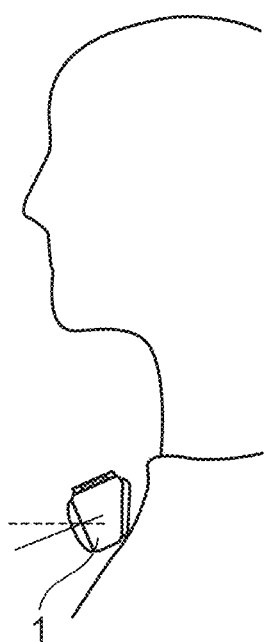

FIG. 25A and FIG. 25B are side views schematically showing the user who wears the camera body 1. FIG. 25A shows the state where the user correctly wears the camera body 1. FIG. 25B shows a state where the camera body 1 causes the pitch deviation to the user.

Figure 26:
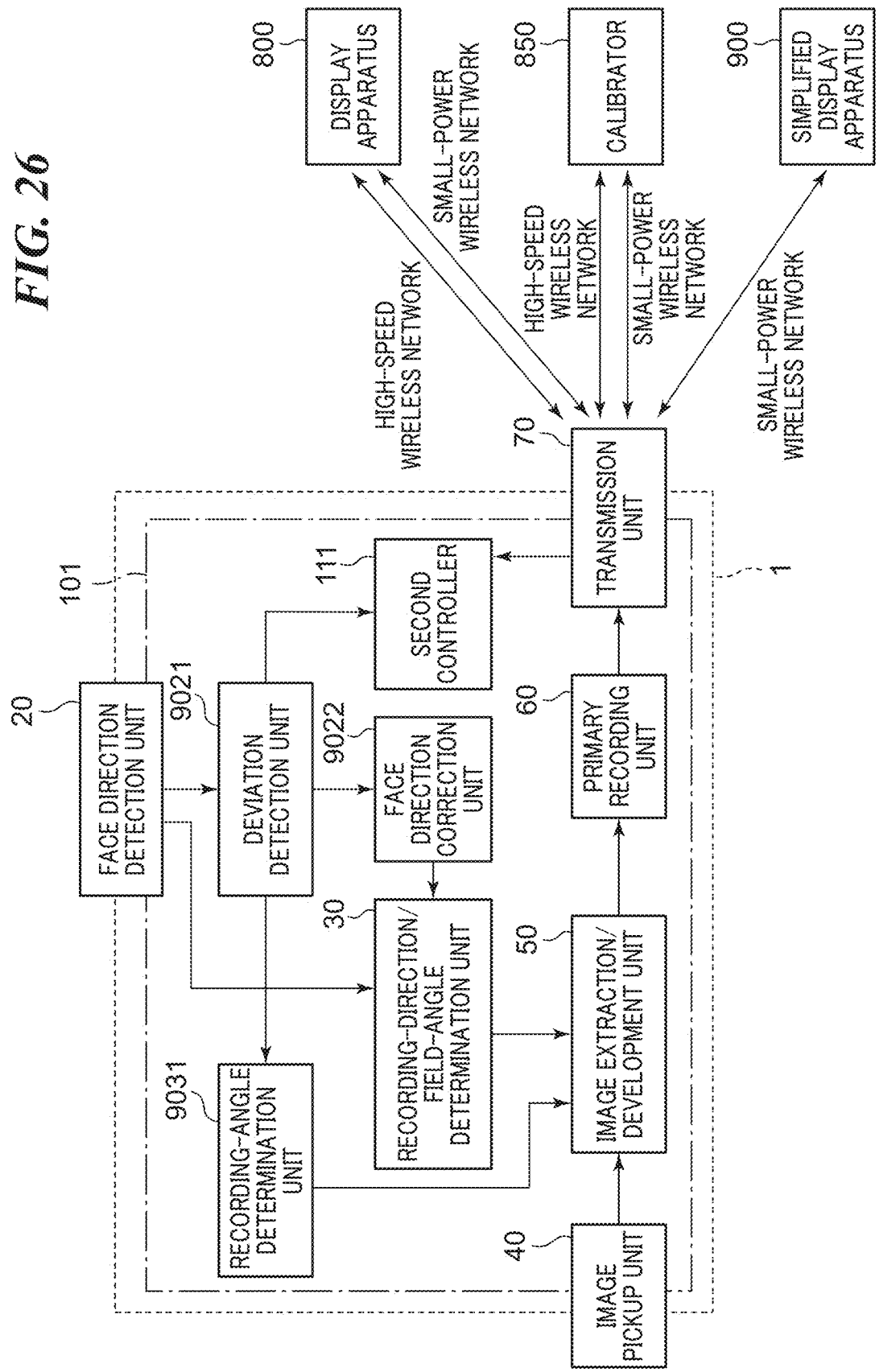
FIG. 26 is a functional block diagram showing the camera body according a third embodiment.

FIG. 26 is a functional block diagram showing the camera body 1 according this embodiment. Hereinafter, the process executed by the camera body 1 will be described roughly using FIG. 26. Details will be mentioned later.

As shown in FIG. 26, the camera body 1 is provided with the face direction detection unit 20, recording-direction/ field-angle determination unit 30, image pickup unit 40, image extraction/development unit 50, primary recording unit 60, and transmission unit 70. Furthermore, the camera body 1 is provided with the second controller 111, a deviation detection unit 9021, a face direction correction unit (an observation direction correction unit) 9022, and a recording-angle determination unit (a recording-image correction unit) 9031. These functional blocks are achieved by control of the overall control CPU 101 that controls the entire camera body 1.

The face direction detection unit 20 detects the state of the face and passes it to the deviation detection unit 9021. Moreover, the face direction detection unit 20 estimates the observation direction from the detected state of the face and passes it to the recording-direction/field-angle determination unit 30.

The deviation detection unit 9021 detects a roll deviation amount and pitch deviation amount of the camera body 1 to the user from the state of the face detected by the face direction detection unit 20, passes the roll deviation amount to the recording-angle determination unit 9031, and passes the roll deviation amount and pitch deviation amount to the face direction correction unit 9022. Moreover, when detecting the roll deviation or the pitch deviation, the deviation detection unit 9021 notifies the second controller 111 of the deviation information.

When receiving the deviation information, the second controller 111 notifies the user of a warning using the speaker 105 and vibrator 106 of the camera body 1. Alternatively, when receiving the deviation information, the second controller 111 notifies the display apparatus 800 of the deviation information through the transmission unit 70 so as to notify the user of a warning using the display unit 803, speaker 815, vibrator 816, or LED 817.

At this time, one or more of the speaker 105 vibrator 106 of the camera body 105, the display unit 803, speaker 815, vibrator 816, and LED 817 of the display apparatus 800 are used as warning members.

The recording-angle determination unit 9031 calculates a roll correction angle of the recording image from the roll deviation amount and passes it to the image extraction/development unit 50.

The face direction correction unit 9022 calculates the correction amount of the observation direction from the roll deviation amount and pitch deviation amount and passes the correction amount of the observation direction to the recording-direction/field-angle determination unit 30.

The recording-direction/field-angle determination unit 30 performs various calculations on the basis of the observation direction estimated by the face direction detection unit 20 and the correction amount of the observation direction calculated by the face direction correction unit 9022, and determines information about a position and an area of an image to be extracted from the superwide-angle image from the image pickup unit 40. Then, the recording-direction/field-angle determination unit 30 passes the determined information to the image extraction/development unit 50.

The image pickup unit 40 converts light from an object into an image and passes the image to the image extraction/development unit 50. The image extraction/development unit 50 extracts only an image of a direction at which the user looks from the image output from the image pickup unit 40 by using the information from the recording-direction/field-angle determination unit 30 and the information from the recording-angle determination unit 9031, develops the extracted image, and passes the developed image to the primary recording unit 60. Since the process thereafter is the same as that of the first embodiment, their descriptions are omitted.

Figure 27A:
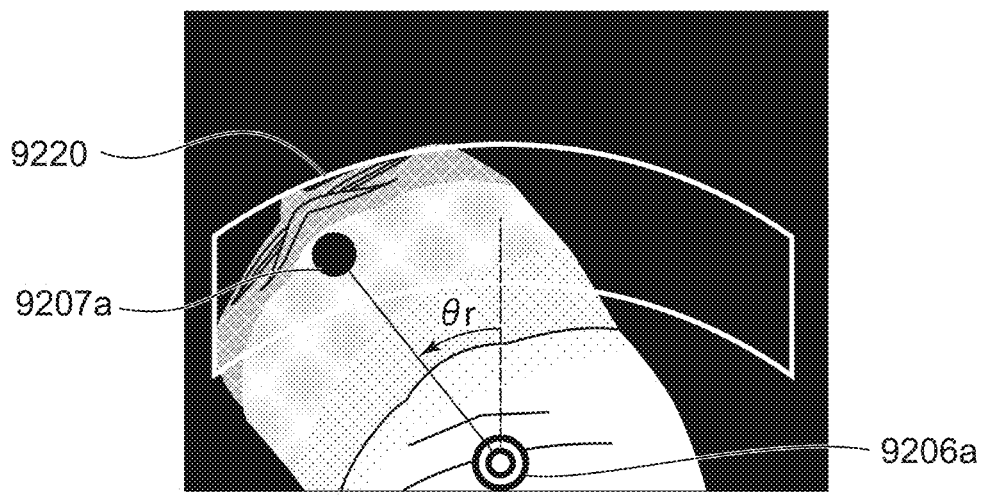
FIG. 27A through FIG. 27C are views showing images of the user viewed from the face direction detection window.
Figure 27B:
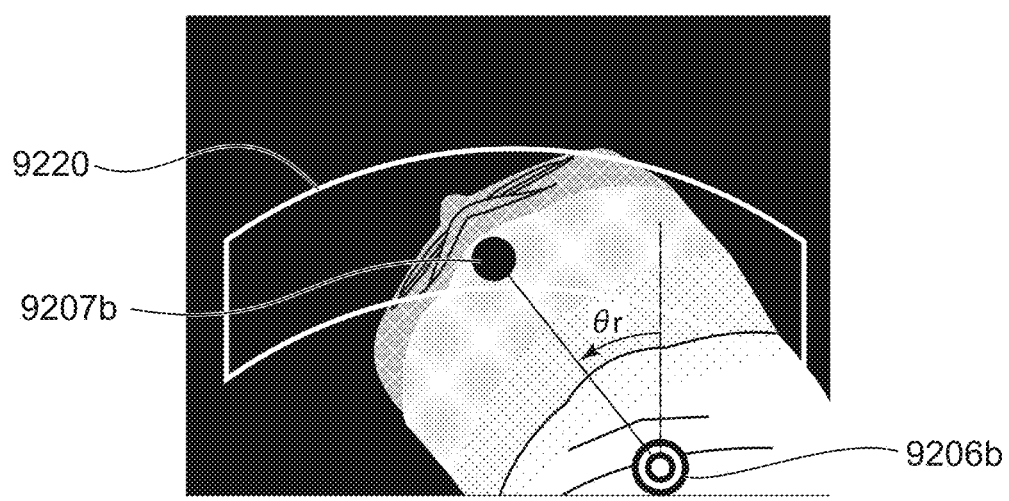
Figure 27C:
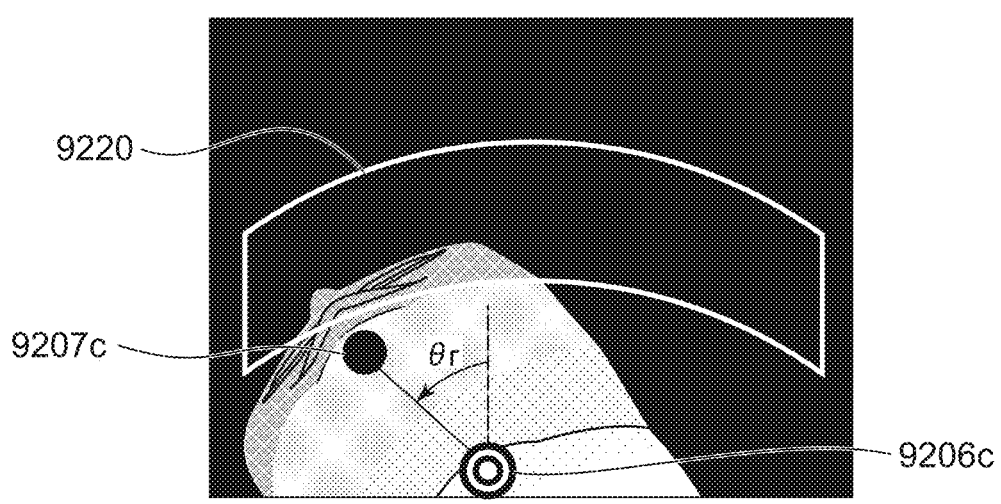

FIG. 27A through FIG. 27B are views showing images of the user viewed from the face direction detection window 13. FIG. 27A shows the state where the user correctly wears the camera body 1. FIG. 27B shows a state where the camera body 1 causes the roll deviation to the user. FIG. 27C shows a state where the camera body 1 causes the pitch deviation to the user.

As shown in FIG. 27A, when the user wears correctly, a throat position 9206a (a rotation center of a head) is located at a center of a screen. As shown in FIG. 27B, when the roll deviation occurs, a throat position 9206b is located at a right side in the screen. Accordingly, when the deviation amount of the throat position 9206b from the center of right and left of the screen exceeds a predetermined threshold, it can be determined that the camera body 1 causes the roll deviation to the user. Otherwise, when the deviation amount of the throat position 9206b from a position determined by the calibration exceeds a predetermined threshold, it can be determined that the camera body 1 causes the roll deviation to the user.

At this time, since the performances of the infrared condenser lens 26 and infrared detection device 27 are known, the roll deviation amount can be calculated from the deviation amount of the throat position 9206b.

A white frame 9220 in FIG. 27A through FIG. 27C shows an area in which the chin position known in the calibration may be located. As shown in FIG. 27A, when the user wears correctly, a chin position 9207a falls within the white frame 9220. As shown in FIG. 27C, when the pitch deviation occurs, the chin position 9207c does not falls within the white frame 9220. Accordingly, when the chin position 9207c is located outside the white frame 9220 in which the chin position known in the calibration may be located, it can be determined that the camera body 1 causes the pitch deviation to the user.

At this time, since the performances of the infrared condenser lens 26 and infrared detection device 27 are known, the pitch deviation amount can be calculated roughly from a separation amount of the throat position 9206c from the white frame 9220.

Moreover, although the user faces the same direction in FIG. 27A and FIG. 27C, the moving angles θr is changed because the throat position 9206c in FIG. 27C moves due to the influence of the pitch deviation. This change amount is calculated and corrected.

Figure 28A:
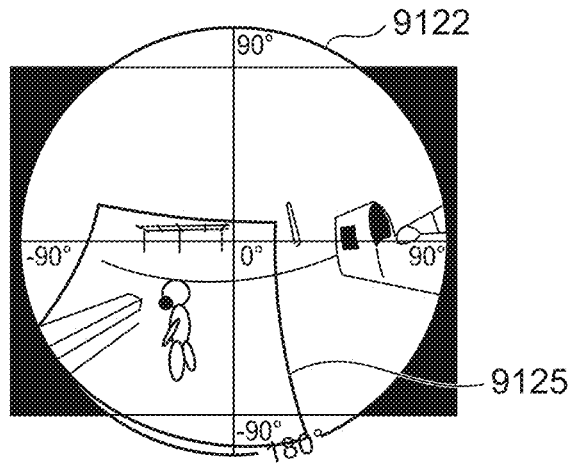
FIG. 28A through FIG. 28C are views each of which shows an effective projection area of a superwide-angle image picked up by the image pickup unit and a target visual field that will be extracted by an image extraction/development unit.
Figure 28B:
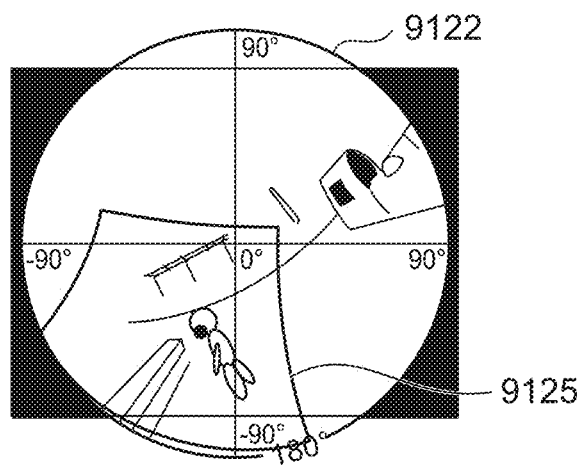
Figure 28C:
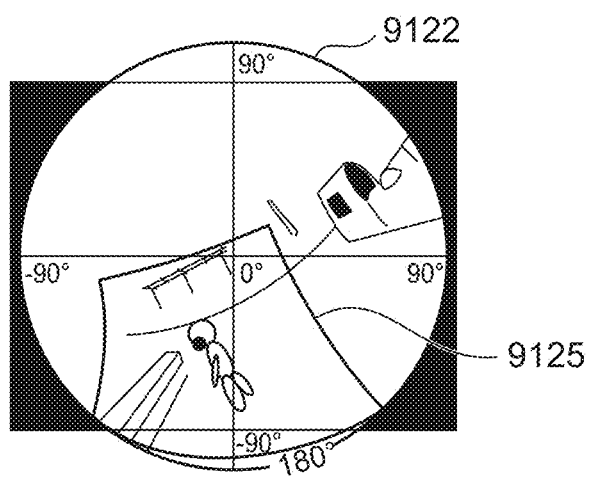

FIG. 28A through FIG. 28C are views each of which shows an effective projection area 9122 of the superwide-angle image picked up by the image pickup unit 40 and a target visual field 9125 that will be extracted by the image extraction/development unit 50. FIG. 28A shows a state where the user correctly wears the camera body 1. FIG. 28B shows a state where the camera body 1 causes the roll deviation to the user. FIG. 28C shows a state where the camera body 1 causes the roll deviation to the user and the target visual field 9125 is corrected by the recording-angle determination unit 9031.

As shown in FIG. 28B, when the camera body 1 causes the roll deviation, the image tilted with respect to the angle that the user is looking at will be recorded. However, as shown in FIG. 28C, when the roll correction of the target visual field 9125 is performed, an image close to the image that the user is looking at can be recorded.

Figure 29:
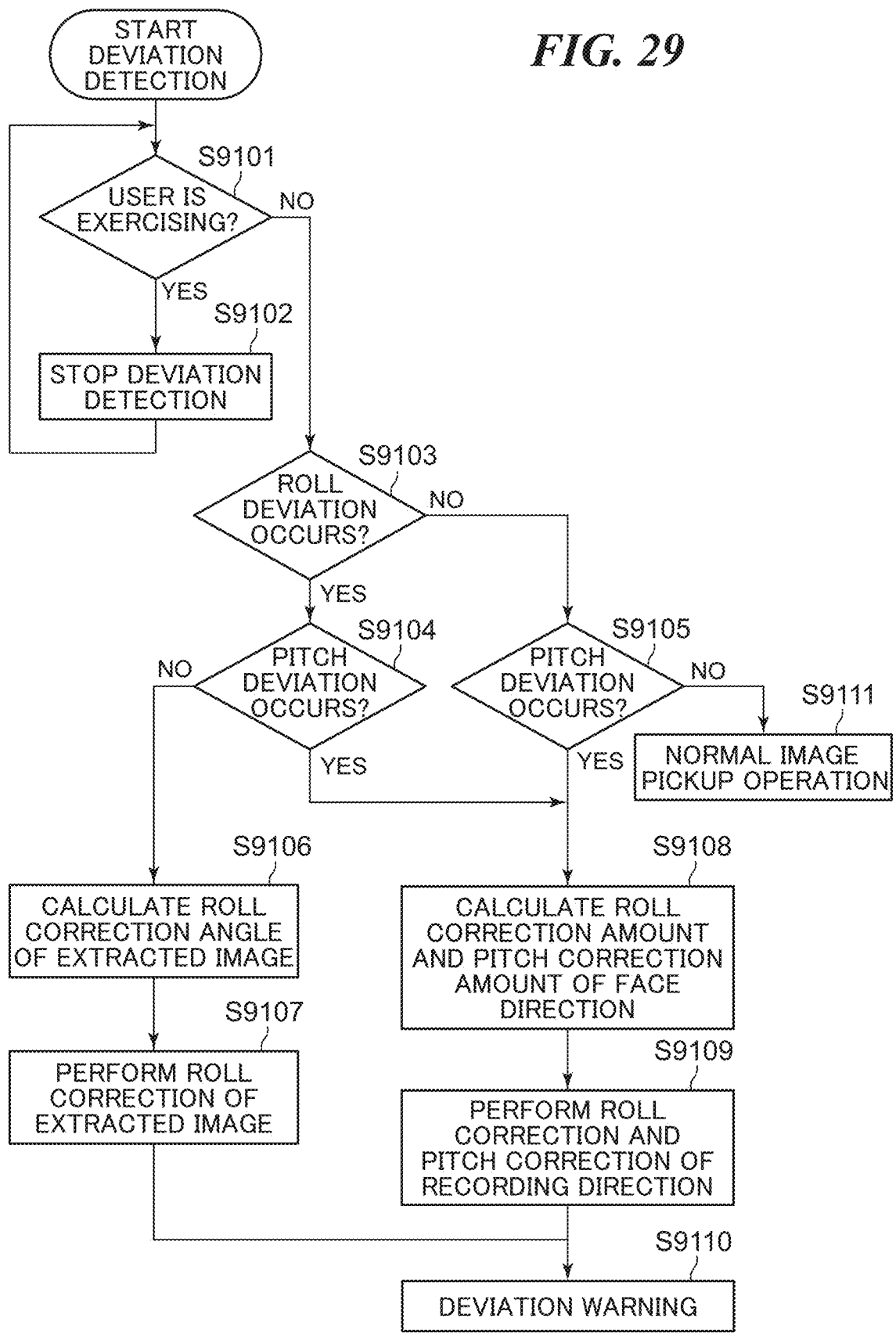
FIG. 29 is a flowchart showing a deviation detection process.

FIG. 29 is a flowchart showing a deviation detection process. The flow of the deviation detection process is described using FIG. 29.

First, it is detected whether the user is exercising on the basis of the output of the angular speed sensor 107 or acceleration sensor 108 (posture detection members) in a step S9101. The deviation detection is stopped in a step S9102 while it is detected that the user is exercising. Since the position of the camera body 1 to the user is unstable during the exercise of the user, an effect of the deviation detection is not expectable, and a deviation is output whenever the user exercises, which is troublesome. In order to avoid the troublesomeness, the deviation detection is stopped during the exercise.

When it is detected that the user is not exercising in the step S9101, the deviation detection unit 9021 detects whether the roll deviation has occurred by the method as described by referring to FIG. 27A through FIG. 27C in a step S9103. Next, it is also detected whether the pitch deviation has occurred in a step S9104 and a step S9105.

When it is detected that the roll deviation has occurred and the pitch deviation has not occurred, the recording-angle determination unit 9031 calculates the roll correction angle of the extracted image in a step S9106, the image extraction/development unit 50 performs the roll correction of the extracted image (recording-image roll correction) in a step S9107. This correction enables to reduce an amount of a rotational deviation amount between the image that the user is actually looking at by the eye and the image to be recorded.

Moreover, when it is detected that the pitch deviation has occurred, the face direction correction unit 9022 calculates a roll correction amount and pitch correction amount of the face direction in a step S9108 and corrects the recording direction in the recording-direction/field-angle determination unit 30 in a step S9109. This correction enables to reduce the deviation between the direction that the user actually faces and the direction to be recorded actually.

In addition, when one of the roll deviation and the pitch deviation is detected, the target visual field 9125 that is extracted by the image extraction/development unit 50 may be enlarged. Thereby, even if a deviation occurs in the camera body 1, the image in the direction that the user wants to record can be recorded as much as possible.

When at least one of the roll deviation and the pitch deviation is detected, the correction for the detected deviation is performed in the step S9107 or the step S9109. After that, the user is notified of deviation warning by using the warning member in a step S9110. By this notification, the user can notice the deviation of the camera body 1 and can support correction of the deviation. It should be noted that the timing of notifying the user of the deviation warning is not limited to this example. For example, the deviation warning may be performed when the roll deviation and pitch deviation are continuously detected beyond a predetermined period. The deviation warning may be performed when the roll deviation and pitch deviation are detected beyond a predetermined number of times. When the roll deviation and pitch deviation are not detected, a normal image pickup operation is continued in a step S9111.

Although the occurrence of the roll deviation is detected in advance in the process in FIG. 29, the occurrence of the pitch deviation may be detected in advance. The order of detections does not matter.

Although the method that detects the face direction and deviation using the infrared camera is described in this embodiment as with the first embodiment, they may be detected by using a 3D sensor represented by a ToF sensor, a millimetre wave radar, or the like.

Although the pattern that performs all of the roll correction of an image, the correction of the face direction detection, and the deviation warning is described in this embodiment, only a part of them may be performed. In such a case, the process is performed along a flow that omits no-execution step from the flow described in FIG. 29.

Next, a fourth embodiment will be described. In the fourth embodiment, an operation to correct an output image into an angle that a user is looking at when a user laterally tilts a head (inclines the head) will be descried in detail using FIG. 30A through FIG. 34.

This embodiment is described as a derivation from the first embodiment basically. Accordingly, configurations of the camera system in the fourth embodiment that are identical to the configurations of the camera system in the first embodiment are indicated by the same reference numerals and duplicated descriptions are omitted. A different configuration will be described by adding details.

The image pickup apparatus of this embodiment detects a user's face direction by observing a user's head from a user's throat and obtains an output image by extracting an image from a superwide-angle image on the basis of the detection result. Accordingly, the user is able to record an image that is extremely close to an image that the user is observing. In the camera of such a concept, even when a user laterally tilts a head (inclines the head), it is desirable to match an angle (a roll angle) of an image that the user is looking at to an angle of an output image.

Figure 30A:
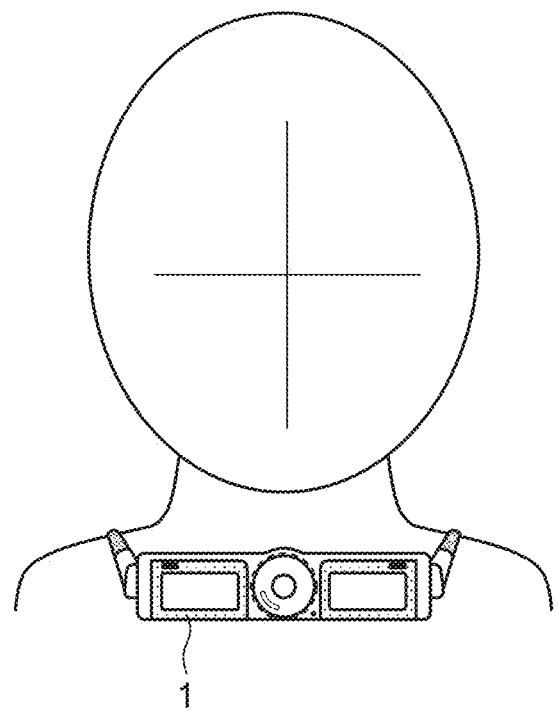
FIG. 30A is a view showing a state where a user does not tilt a head.
Figure 30B:
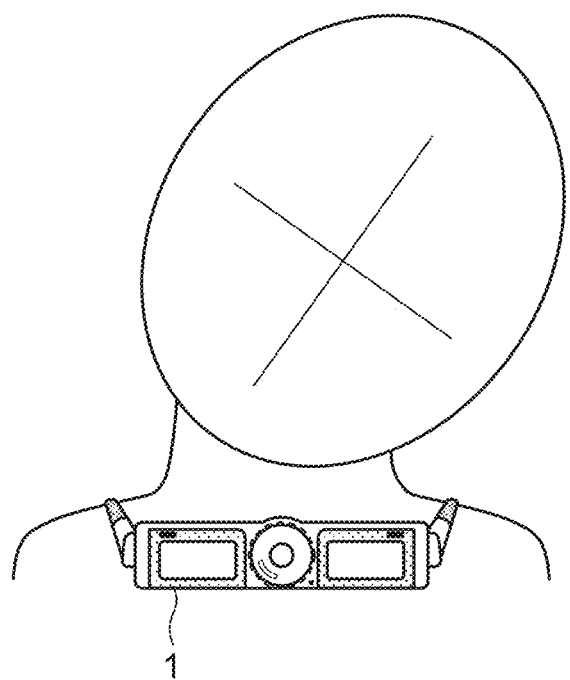
FIG. 30B is a view showing a state where the user laterally tilts the head (inclines the head).

FIG. 30A is a view showing a state where a user does not tilt a head. FIG. 30B is a view showing a state where the user laterally tilts the head (inclines the head).

Figure 33A:
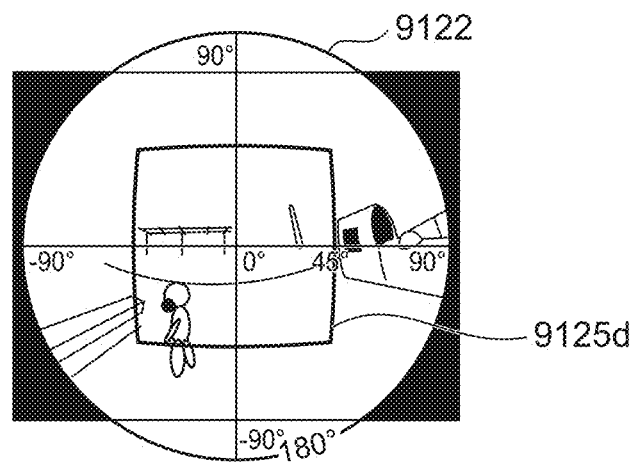
FIG. 33A and FIG. 33B are views each of which shows an effective projection area in a superwide-angle image picked up by the image pickup unit and a target visual field that will be extracted by the image extraction/development unit.
Figure 33B:
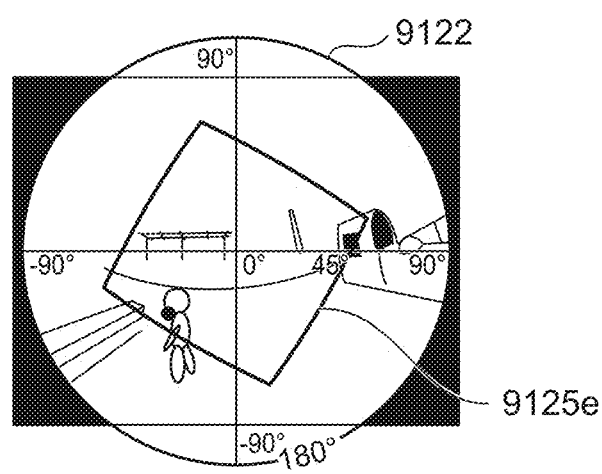

FIG. 23A and FIG. 23B are views shows an effective projection area 9122 of a superwide-angle image picked up by the image pickup unit 40 and target visual fields 9125d and 9125e that will be extracted by the image extraction/development unit 50. FIG. 33A shows the target visual field 9125d of a case where the user looks at the front without tilting the head. FIG. 33B shows the target visual field 9125e of a case where the user looks at the front while tilting the head.

As shown in FIG. 33A and FIG. 33B, a positional relationship of the effective projection area 9122 to the body is not changed regardless of the tilt of the head. However, since the image that the user is currently looking at tilts when the user tilts the head, it is necessary to apply roll rotation only to the target visual field 9125.

Figure 31:
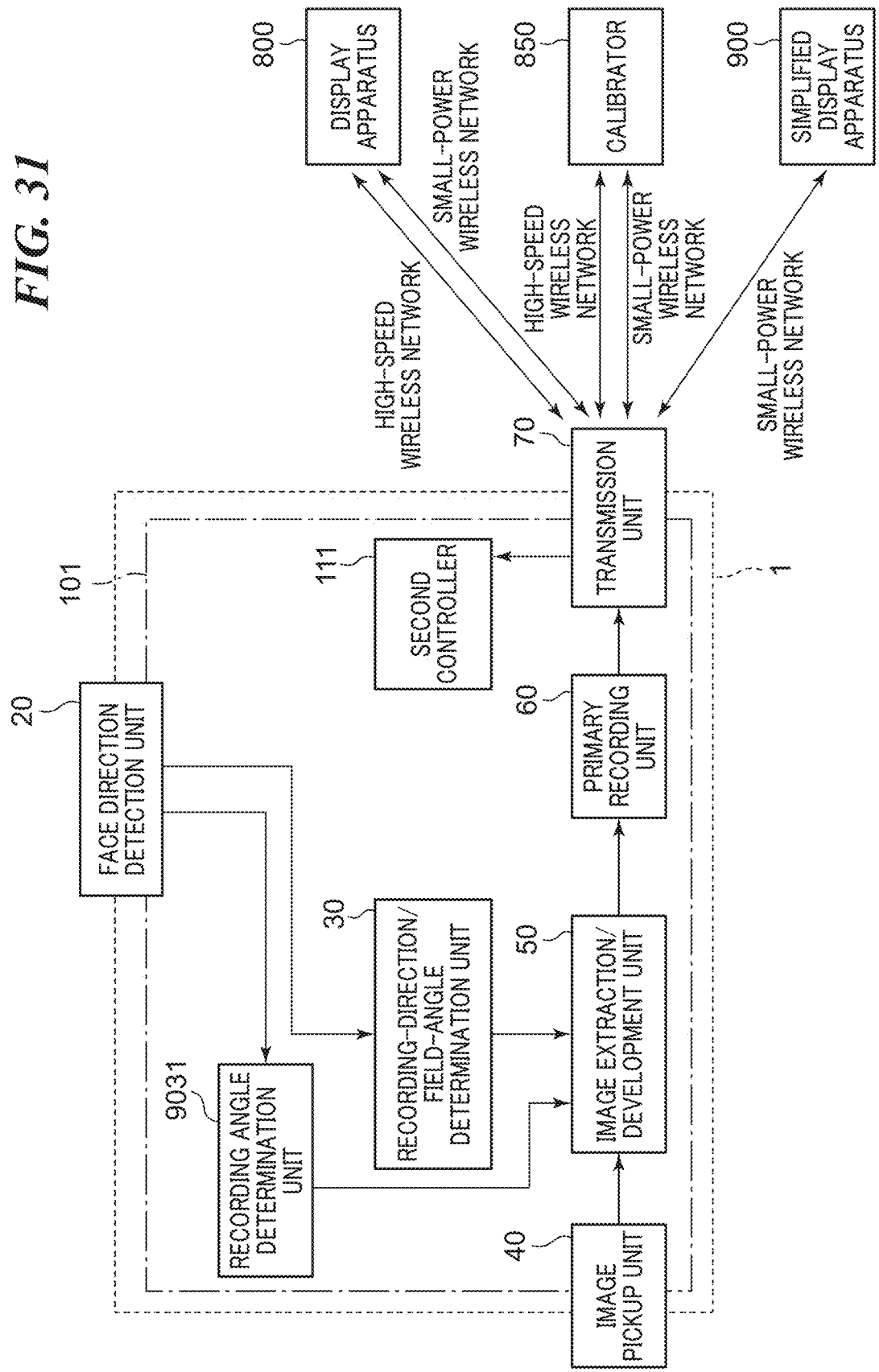
FIG. 31 is a functional block diagram showing the camera body according a fourth embodiment.

FIG. 31 is a functional block diagram showing the camera body 1 according this embodiment. Hereinafter, the process executed by the camera body 1 will be described roughly using FIG. 31. Details will be mentioned later.

As shown in FIG. 31, the camera body 1 is provided with the face direction detection unit (a distance measurement unit) 20, the recording-direction/field-angle determination unit 30, the image pickup unit 40, the image extraction/development unit 50, the primary recording unit 60, the transmission unit 70, the second controller 111, and the recording-angle determination unit (a roll angle detection unit) 9031. These functional blocks are achieved by control of the overall control CPU 101 that controls the entire camera body 1.

The face direction detection unit 20 detects the state of the face and passes it to the recording-angle determination unit 9031. Moreover, the face direction detection unit 20 estimates the observation direction from the detected state of the face and passes it to the recording-direction/field-angle determination unit 30.

The recording-angle determination unit 9031 calculates a head tilting amount (a roll angle correction amount) from the state of the face received from the face direction detection unit 20 and passes it to the image extraction/development unit 50.

The recording-direction/field-angle determination unit 30 determines information about a position and an area that will be extracted from an image picked up by the image pickup unit 40 by performing various calculations on the basis of the observation direction estimated by the face direction detection unit 20. And then, the information is passed to the image extraction/development unit 50.

The image pickup unit 40 converts light from an object into an image and passes the image to the image extraction/development unit 50. The image extraction/development unit 50 extracts only an image of a direction at which the user looks from the image from the image pickup unit 40 by using the information from the recording-direction/field-angle determination unit 30 and the information from the recording-angle determination unit 9031, develops the extracted image, and passes the developed image to the primary recording unit 60. Since the process thereafter is the same as that of the first embodiment, their descriptions are omitted.

Figure 32A:
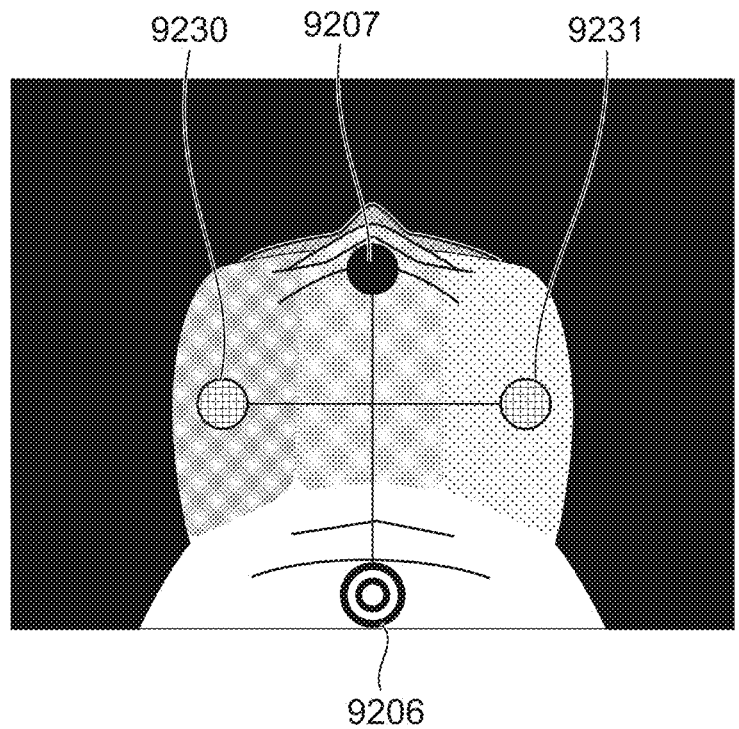
FIG. 32A and FIG. 32B are images of the user viewed from the face direction detection window.
Figure 32B:
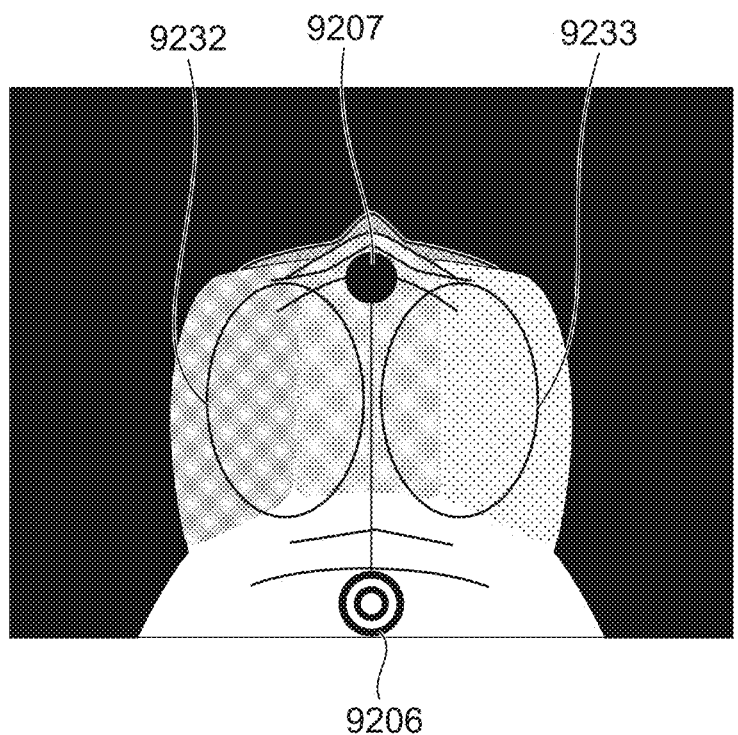

FIG. 32A and FIG. 32B are images of the user viewed from the face direction detection window 13 and show the state where the user tilts the head at the angle corresponding to FIG. 30B. How to detect the head tilting amount (a roll angle of the face) will be described using FIG. 32A and FIG. 32B.

First and second points 9230 and 9231 (a plurality of points) in FIG. 32A are arranged so that a straight line connecting the first and second points 9230 and 9231 intersects perpendicularly with a straight line connecting the throat position 9206 and the chin position 9207 and is equally divided by the straight line connecting the throat position 9206 and the chin position 9207. The rough head tilting amount can be detected by comparing a distance between the first point 9230 and the camera body 1 with a distance between the second point 9231 and the camera body 1.

In the meantime, first and second areas 9232 and 9233 (a plurality of areas) in FIG. 32B are arranged at the both sides of the straight line connecting the throat position 9206 and the chin position 9207 so as to be linearly symmetrical. The rough head tilting amount can be detected by comparing an average of distances between the first area 9232 and the camera body 1 with an average of distances between the second area 9233 and the camera body 1.

A face roll angle can be calculated by either of the method of comparing the first and second points in FIG. 32A and the method of comparing the first and second area in FIG. 32B.

Figure 34:
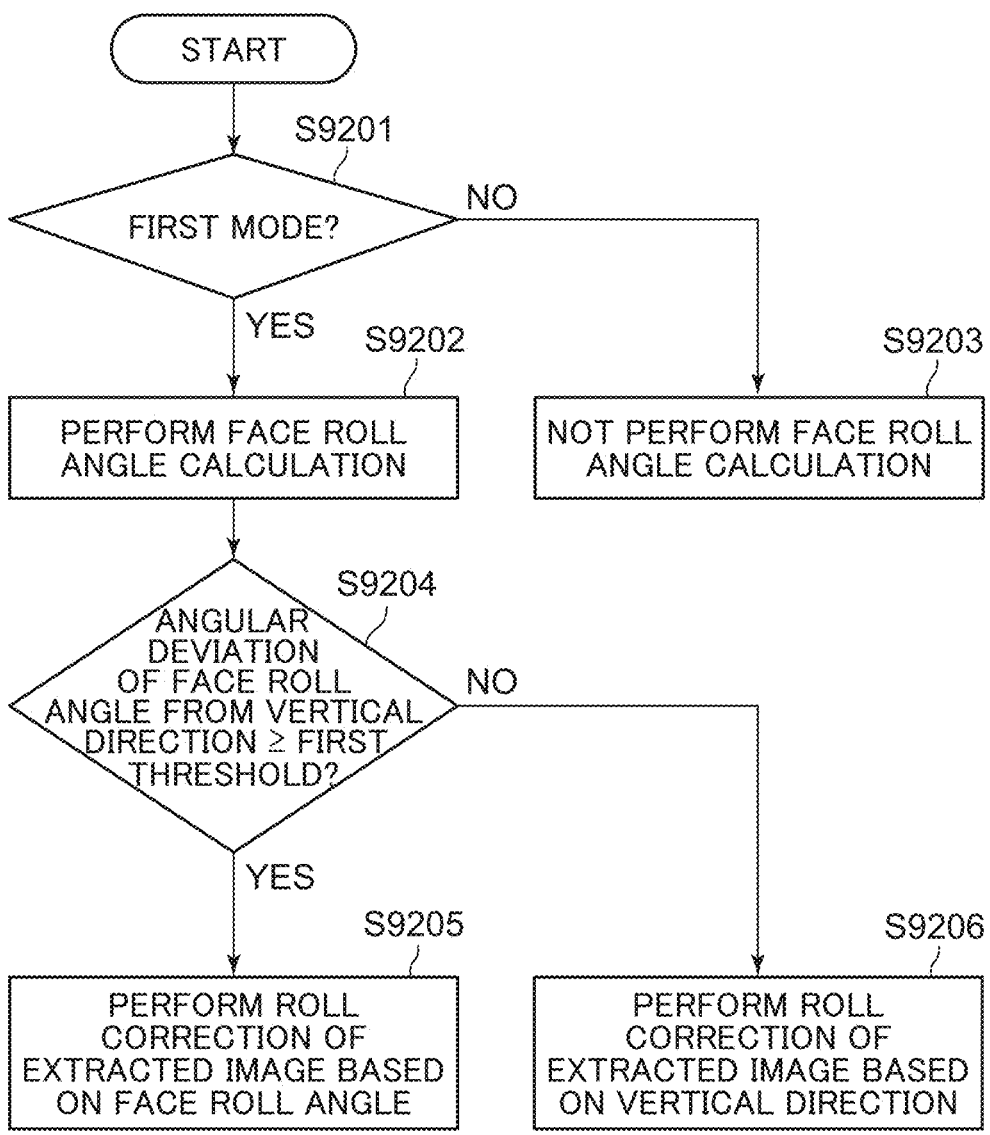
FIG. 34 is a flowchart showing a process from face roll angle detection to roll correction of an extracted image.

FIG. 34 is a flowchart showing a process from face roll angle detection to roll correction of an extracted image. A flow of a face roll angle correction will be described using FIG. 34.

The image pickup apparatus of this embodiment is provided with a first mode in which the roll correction of an output image is performed and a second mode in which the roll correction is not performed. In the process in FIG. 34, it is determined whether the image pickup apparatus is in the first mode in a step S9201. When it is in the first mode, the recording-angle determination unit 9031 calculates the face roll angle based on the information obtained by the face direction detection unit 20 using the method as shown in FIG. 32A and FIG. 32B in a step S9202. Moreover, when it is the second mode, the process proceeds to a step S9203 and the face roll angle calculation is not performed.

In the case of the first mode, it is determined whether an angular deviation of the face roll angle calculated by the recording-angle determination unit 9031 from the vertical direction detected by the angular speed sensor 107 or the acceleration sensor 108 is equal to or more than a predetermined threshold in a step S9204. Specifically, the tilting angle of the head with respect to a plane along the vertical direction detected by the angular speed sensor 107 or the acceleration sensor 108 is determined (see FIG. 30B).

When it is determined that the deviation is equal to or more than the predetermined threshold, the recording-angle determination unit 9031 calculates a recording angle on the basis of the calculation result of the face roll angle, and the image extraction/development unit 50 performs the roll correction of the extracted image in a step S9205.

When it is determined that the angular deviation is less than the predetermined threshold, the recording-angle determination unit 9031 calculates the recording angle on the basis of the vertical direction detected by the angular speed sensor 107 or the acceleration sensor 108. Moreover, with this calculation, the image extraction/development unit 50 performs the roll correction of the extracted image in a step S9206. According to the above-mentioned flow, the image in which horizontality is ensured can be output when the user who is not standing upright wants to see an image in which horizontality is ensured. Then, when the user looks at the image of which the angle is inclined with respect to the horizontal direction, the image of the angle that is looked at by the user can be recorded.

Although the flow that determines to select one of the face roll angle and the vertical direction based on the comparison result of them is described in this embodiment, the determination based on only the face roll angle may be performed without the comparison with the vertical direction. In such a case, the step S9204 and the step S9206 will be omitted.

Although the method that detects the face direction and deviation using the infrared camera is described in this embodiment as with the first embodiment, they may be detected by using a 3D sensor represented by a ToF sensor, a millimetre wave radar, or the like.

Next, a fifth embodiment will be described. In the fifth embodiment, a method for detecting a change of a jaw position, and an operation in detecting the change of the jaw position will be described in detail using FIG. 35A through FIG. 35C, FIG. 36A, and FIG. 36B.

This embodiment is described as a derivation from the first embodiment basically. Accordingly, configurations of the camera system in the third embodiment that are identical to the configurations of the camera system in the first embodiment are indicated by the same reference numerals and duplicated descriptions are omitted. A different configuration will be described by adding details.

The image pickup apparatus of this embodiment detects a user's face direction by observing a user's head from a user's throat and obtain an output image by extracting an image from a superwide-angle image on the basis of the detection result. Since the face direction is estimated by observing a state of a jaw, when positional relationship between the face direction and the state of the jaw is changed (when a mouth opens and closes), an error will occur in the estimation result of the face direction. This shows that the correct detection is difficult during a conversation and a meal.

Figure 35A:
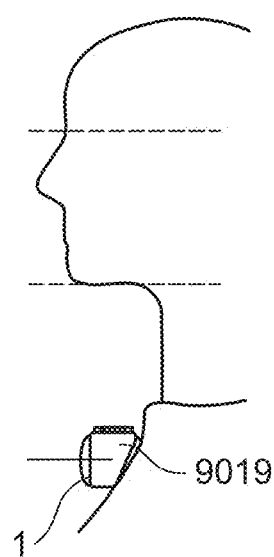
FIG. 35A through FIG. 35C are side views schematically showing the user who wears the camera body according to one or more aspects of the present disclosure.
Figure 35B:
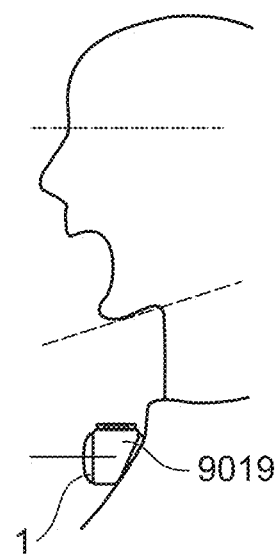
Figure 35C:
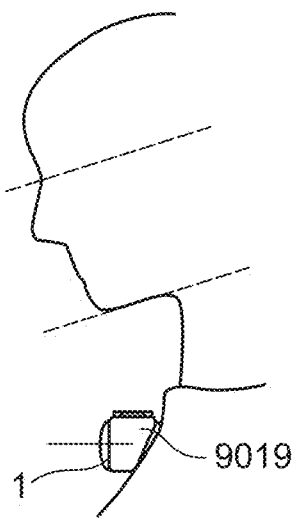

FIG. 35A through FIG. 35C are side views schematically showing the user who wears the camera body 1. FIG. 35A shows a state where the user looks at the front and closes the mouth. FIG. 35B shows a state where the user looks at the front and opens the mouth. FIG. 35C shows a state where the user looks diagonally downward and closes the mouth.

Actually, FIG. 35A and FIG. 35B shows the state where the user looks at the front and FIG. 35C shows the state where the user looks diagonally downward. However, when viewed from the camera body 1, the user seems to look at the front in FIG. 35A, and the user seems to look diagonally downward in FIG. 35B and FIG. 35C. That is, when the detection result in closing the mouth can be used, the face direction is correctly detectable.

Figure 36A:
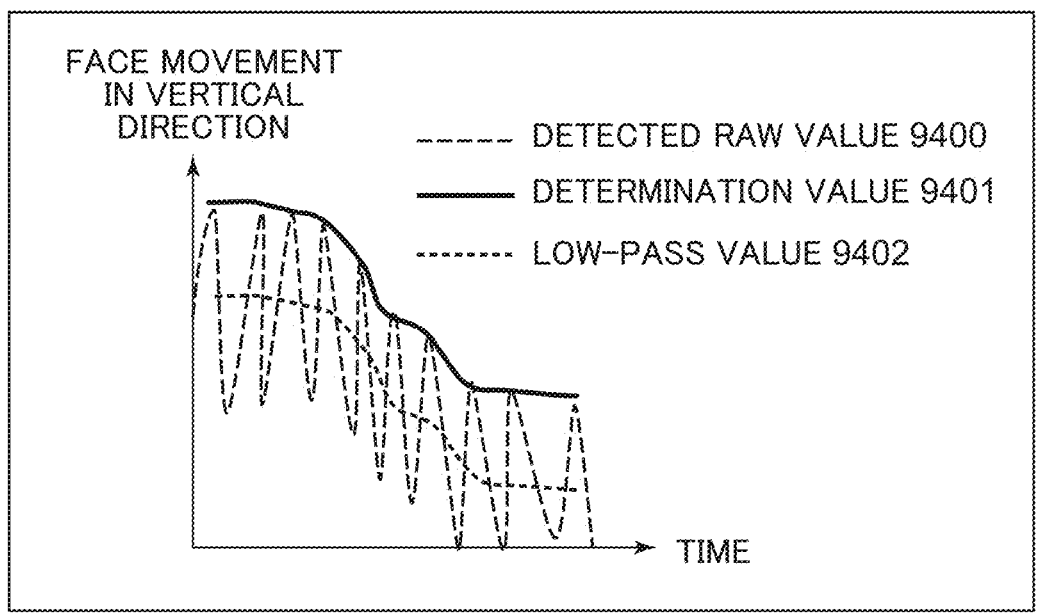
FIG. 36A and FIG. 36B are graphs showing examples of a detection result of face movement (a pitch angle) in the vertical direction.
Figure 36B:
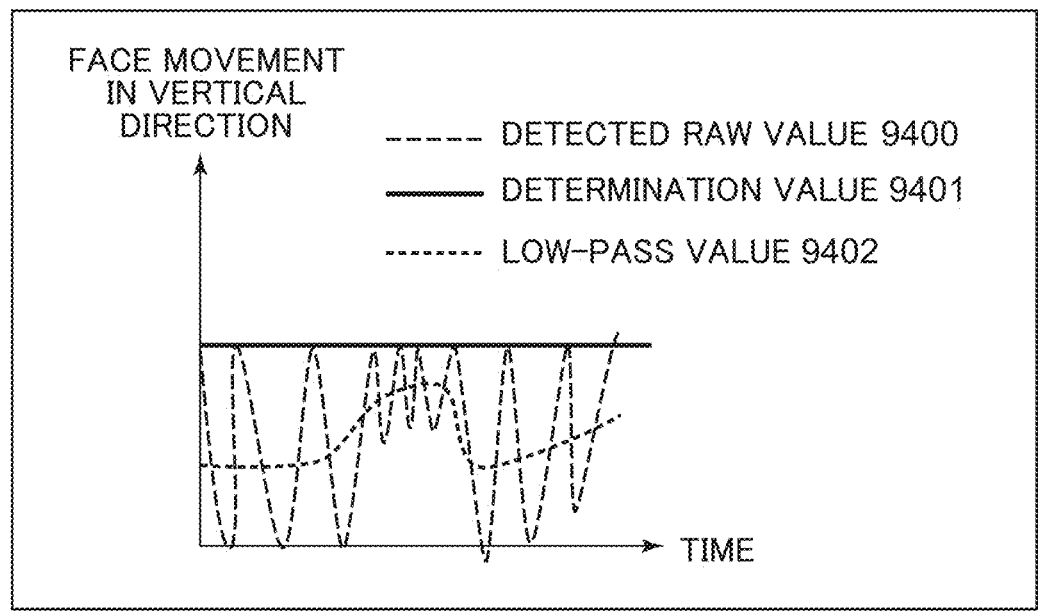

FIG. 36A and FIG. 36B are graphs showing examples of a detection result of face movement in the vertical direction (pitch direction). A horizontal axis denotes time and a vertical axis denotes an angle in the vertical direction. FIG. 36A shows a detection result of a case where the user is directing the face downward while opening and closing the mouth (conversation etc.). A detected raw value 9400 is moving downward while waving up and down. At this time, a Low-pass value 9402 that is obtained by applying a general Low-pass filtering process to the detected raw value 9400 is a median of the detected raw value 9400. If the Low-pass value 9402 is used for the detection, the face movement is detected in a state where the user half opens the mouth. At this time, a determination value 9401 in a state where the user correctly closes the mouse is obtained by connecting peaks of the fine waveform of the detected raw value 9402.

FIG. 36B shows a detection result of a case where the user who looks at the front opens and closes the mouth while changing an opening amount. As understood from FIG. 36B, although the user is looking at the front, when the detection direction is determined based on the Low-pass value 9402, the output image will shake up and down. Also in this case, when the face direction is determined based on the determination value 9401 that is obtained by connecting peaks of the fine waveform of the detected raw value 9402, the output image will remain directing to the front. Accordingly, when the detected raw data of the face direction in the vertical direction (pitch angle) vibrates at a frequency within a predetermined range, the determination value 9401 is obtained by connecting the maximum values (upper peaks) of the waveform of the respective cycles. As a result of this, the face direction is correctly detectable even during a conversation and a meal.

The frequency of opening and closing of the mouth in a conversation and a meal is assumed to be about 1 Hz to 10 Hz in this embodiment.

As shown in FIG. 35A through FIG. 35C, the camera body 1 is provided with a user-side microphone 9019 (sound detection member) that detects user's utterance and mastication sound. A conversation and a meal may be determined based on the frequency of the detected raw value 9400 shown in FIG. 36A and FIG. 36B. Moreover, when the user-side microphone 9019 detects sound equal to or larger than a predetermined threshold, the face direction may be determined by the determination value 9401 that connects the peak points of the fine waveform of the detected raw value 9400.

Moreover, when the calibration in the second embodiment is performed, an instruction that urges to perform the calibration in closing the mouth may be given from the display apparatus 800 or the calibrator 850. This enables to improve accuracies of the calibration and the pitch angle correction. For example, the calibrator 850 may announce a sound message in performing the calibration. This urges the user to perform the calibration while closing the mouth.

Next, a sixth embodiment will be described. As described in the second embodiment, individual difference occurs in the relationship between the face direction detected by the face direction detection unit 20 and the center position (extraction position of an image) of the target visual field 125 due to a physique of a user and a mounting state of the camera body 1. Accordingly, the calibration process that associates the extraction position of an image with the face direction is needed. It is necessary to perform the calibration operations for upper right, lower right, upper left, and lower left directions in addition to the front direction. Such operations may be troublesome for a user. The sixth embodiment reduces a user's time and effort in the calibration process.

This embodiment is described as a derivation from the second embodiment basically. Accordingly, configurations of the camera system in the sixth embodiment that are identical to the configurations of the camera system in the first and second embodiments are indicated by the same reference numerals and duplicated descriptions are omitted. A different configuration will be described by adding details.

Figure 37:
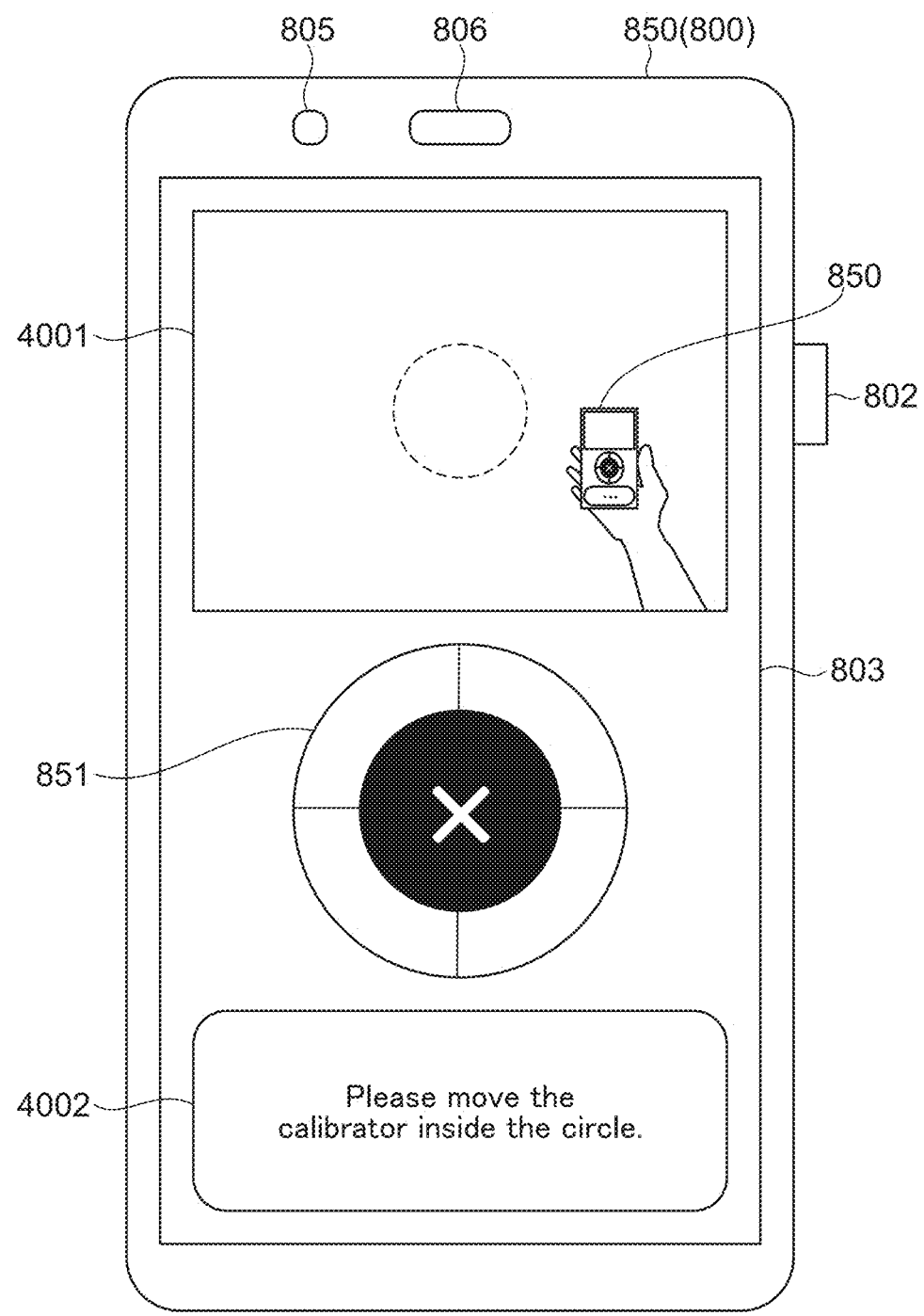
FIG. 37 is a view showing details of a calibrator used for a calibration process according to one or more aspects of the present disclosure.

FIG. 37 is a view showing details of the calibrator 850 used for the calibration process according to the sixth embodiment. In this embodiment, the calibration system is provided with the camera body (image pickup apparatus) 1 and the calibrator 850. And the display apparatus 800 doubles as the calibrator 850. It should be noted that the calibrator 850 may be a dedicated device, a general smart phone, or a tablet terminal as with the first and second embodiments.

As shown in FIG. 37, the A-button 802, the display unit 803, the in-camera 805, the face sensor 806, the positioning index 851, a camera image display 4001, and a message display 4002 are included in the calibrator 850. Although the positioning index 851, camera image display 4001, and message display 4002 shall be displayed on the display unit 803 in this embodiment, they are not limited to this. In this way, the display unit 803 functions as a received-image display unit that displays the camera image display 4001 and an index display unit that displays the positioning index 851. This omits to provide the index display unit separately from the display unit 803, which simplifies the configuration of the calibrator 850 and contributes to miniaturization.

As described in the first embodiment, the superwide-angle image picked up by the camera body 1 is transmitted by the transmission unit 70 and is received by the high-speed wireless communication unit 872 or the small-power wireless communication unit 871 of the calibrator 850. Then, an image drawn by superimposing various kinds of information to the superwide-angle image picked up by the camera body 1 (image pickup unit) is displayed as the camera image display 4001. As shown in FIG. 37, this image includes the calibrator 850 as one of the various kinds of information. A message that urges a user to perform an operation and an error message are displayed as the message display 4002.

Figure 38:
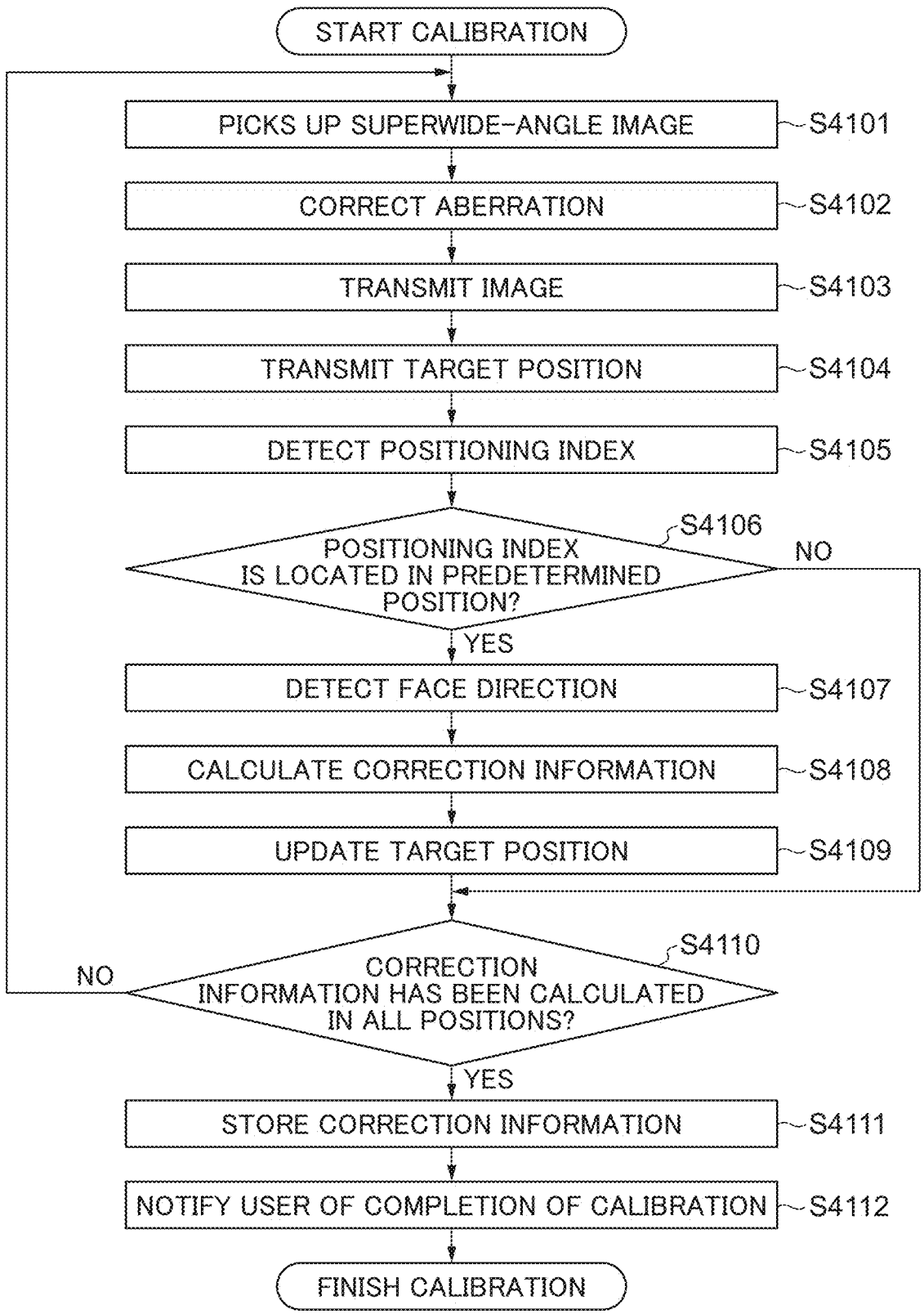
FIG. 38 is a flowchart showing a process of the camera body in the calibration process according to one or more aspects of the present disclosure.

A process of the camera body 1 will be described first. FIG. 38 is a flowchart showing the process of the camera body 1 in a calibration process according to this embodiment. It should be noted that each process in this flowchart is achieved because the overall control CPU 101 runs a program stored in the internal nonvolatile memory 102.

When the calibration process is started, the image pickup unit 40 picks up a superwide-angle image by in a step S4101 first.

Next, in a step S4102, aberration of the superwide-angle image picked up (obtained) in the step S4101 is corrected.

Figure 40A:
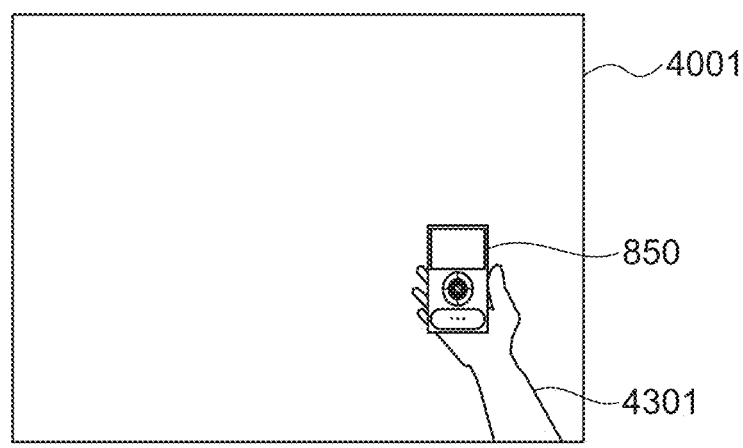
FIG. 40A and FIG. 40B are schematic views showing examples of the superwide-angle image during the calibration.

FIG. 40A is a schematic view showing an example of the superwide-angle image that is picked up by the camera body 1 and of which the aberration is corrected in the calibration process. As described in the second embodiment, the user holds up the calibrator 850 in front of the own body in the calibration process. Accordingly, the calibrator 850 and a user's hand 4301 that holds the calibrator 850 appear in the image picked up by the camera body 1 worn at the clavicle position as shown in FIG. 40A.

Next, in a step S4103, the transmission unit 70 of the camera body 1 transmits the image corrected in the step S4102 to the calibrator 850.

Next, in a step S4104, the transmission unit (a coordinate transmission unit) 70 transmits a target position for the calibration to the calibrator 850. The calibrator 850 receives this target position through the high-speed wireless communication unit 872 or the small-power wireless communication unit 871 (a coordinate reception unit). Hereinafter the "target position for the calibration" is a position toward which the user moves the calibrator 850 for the calibration, i.e., it is coordinate information of the movement destination of the calibrator 850. In this embodiment, a center, an upper left, a lower left, an upper right, and a lower right of the camera image display 4001 are set (designated) as the target positions. However, the target positions are not limited to this example. Moreover, a target position may be added or omitted if needed.

Next, in a step S4105, the overall control CPU (an index detection unit) 101 detects the positioning index 851 displayed on the calibrator 850 on the basis of the superwide-angle image corrected in the step S4102 and calculates the coordinate of the positioning index 851 concerned. It should be noted that the positioning index 851 can be detected by searching an image area of which characteristic features, such as a color and a shape, are coincident with the positioning index 851, for example. In addition, the positioning index 851 can be detected by using machine learning like deep learning.

Next, in a step S4106, the overall control CPU 101 determines whether the positioning index 851 detected in the step S4105 matches is located in the target position (predetermined position). This determination is executed by determining whether the coordinate of the positioning index 851 calculated in the step S4105 is located at or near the coordinate of the target position. Then, as a result of the determination in the step S4106, when it is determined that the positioning index 851 is located in the target position, the process proceeds to a step S4107. Then, the overall control CPU (a calibration unit) 101 starts executing the calibration. In the meantime, as a result of the determination in the step S4106, when it is determined that the positioning index 851 is not located in the target position, the process proceeds to a step S4110. When it is determined that the positioning index 851 is not located in the target position, the calibrator 850 gives a user the instruction to move the positioning index 851 to the predetermined position. This is later mentioned by referring to FIG. 39.

In the step S4107 after the determination in the step S4106, the face direction detection unit 20 detects a face direction (a user's face direction). This face direction detection process is the same as the process in the step S200 described in the first embodiment.

In a step S4108 after the determination in the step S4106, the overall control CPU 101 calculates correction information. This correction information is the same as what is described in the second embodiment, and is the information that shows the relation between the coordinate of the positioning index 851 detected in the step S4105 and the face direction detected in the step S4107. It should be noted that a description about the determination of whether the user is looking at the positioning index 851 at the visual field center is omitted in this embodiment in order to simplify the description. However, the correction information may be calculated when the user is looking at the positioning index 851 at the visual field center as with the second embodiment.

Next, in a step S4109, the overall control CPU 101 updates the target position. In this embodiment, the target position is updated in an order of a center, an upper left, a lower left, an upper right, and a lower right of the camera image display 4001. However, the target positions are not limited to this example.

Next, in the step S4110, the overall control CPU 101 determines whether the correction information has been calculated in all the target positions. As a result of the determination in the step S4110, when it is determined that the correction information has been calculated in all the target positions, the process proceeds to a step S4111. In the meantime, as a result of the determination in the step S4110, when it is determined that the correction information has been calculated in not all the target position, the process returns to the step S4101 and the steps from the step S4101 will be sequentially executed.

In the step S4111 after the determination in the step S4110, the correction information obtained p to the step S4110 is stored into the internal nonvolatile memory 102 or the large-capacity nonvolatile memory 51 (a correction information storage unit) of the camera body 1. Thereby, the stored correction information can be transmitted to the calibrator 850 at an arbitrary timing, for example. In this case, the correction information is transmitted through the transmission unit (a correction information transmission unit) 70 of the camera body 1 and is received by the high-speed wireless communication unit 872 or the small-power wireless communication unit 871 (a correction information reception unit) of the calibrator 850. Then, the correction information will be stored also in the large-capacity nonvolatile memory (a correction information storage unit) 814 of the calibrator 850.

Next, in a step S4112, the transmission unit 70 notifies the calibrator 850 of the completion of the calibration process and the process is finished.

Next, the process of the calibrator 850 will be described. FIG. 39 is a flowchart showing the process of the calibrator 850 in the calibration process according to this embodiment. It should be noted that each process in this flowchart is achieved because the overall control CPU 801 runs a program stored in the internal nonvolatile memory 812.

When the calibration is started, the display-apparatus controller 801 displays the positioning index 851 on the display unit 803 in a step S4201 first. The process in the step S4105 detects the positioning index 851 displayed on the display unit 803 in this step S4201.

Figure 41A:
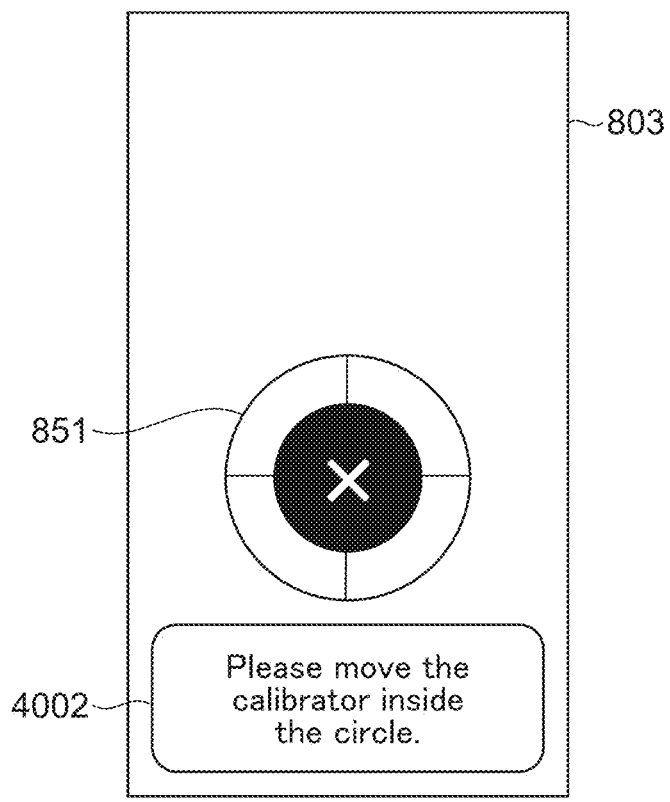
FIG. 41A and FIG. 41B are schematic views showing displaying states of the display unit 803.

Next, in a step S4202, the display-apparatus controller 801 displays a message that urges the user to perform an operation on the display unit 803. FIG. 41A is a schematic view showing a displaying state of the display unit 803 when completing the step S4202. As shown in FIG. 41A, the positioning index 851 arranged near the central part of the display unit 803 and the message display 4002 arranged below the positioning index 851 are displayed on the display unit 803. A message that urges the user to move the calibrator 850 is displayed as the message display 4002. It should be noted that the position and shape of the positioning index 851 are not limited to that shown in FIG. 41A as long as they are detectable by the camera body 1. Moreover, when the positioning index 851 is located in the peripheral side in the superwide-angle image, the shape of the positioning index 851 may be distorted. In this case, the display unit (an index display unit) 803 changes the shape or color of the positioning index 851 with lapse of time so that the positioning index 851 can be detected. For example, the shape of the positioning index 851 is changed by repeatedly switching a rectangle and a circle. Moreover, the color of the positioning index 851 is changed by repeatedly switching a chromatic color (for example, red) and an achromatic color (for example, black), for example.

Next, in a step S4203, the high-speed wireless communication unit 872 or the small-power wireless communication unit 871 receives the superwide-angle image from the camera body 1. This image is transmitted in the step S4103.

Next, in a step S4204, the high-speed wireless communication unit 872 or the small-power wireless communication unit 871 receives the coordinate of the target position from the camera body 1. This coordinate of the target position is transmitted in the step S4104.

Next, in a step S4205, the display-apparatus controller (a drawing unit) 801 draws a mark showing the coordinate of the target position received in the step S4204 so as to superimpose over the superwide-angle image received in the step S4203. The coordinate of the target position (coordinate information) shows the movement destination of the calibrator 850 to the user, i.e., it is the coordinate of the mark used when moving the calibrator 850. Moreover, although the mark of the coordinate of the target position is a circle that is arranged in concentric with the center of the camera image display 4001 and has a predetermined radius, for example, the shape is not limited to the circle. For example, a quadrangle or other shape may be employed.

Figure 40B:
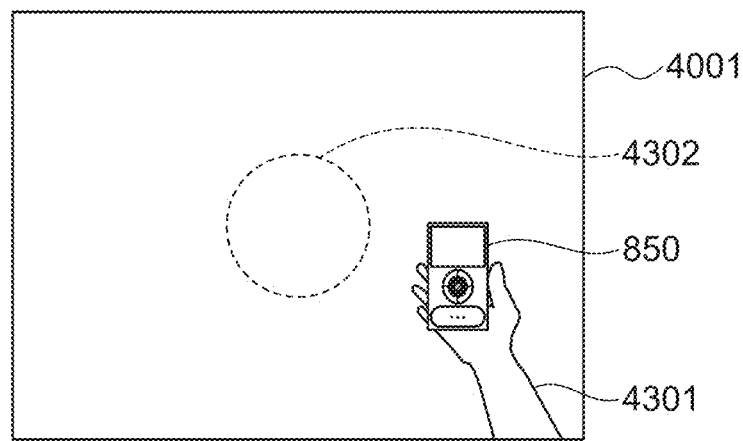

FIG. 40B is a schematic view showing an image in which the target position is drawn as a circular mark 4302 to be superimposed over the superwide-angle image in a case where the target position is located in the center of the camera image display 4001. As shown in FIG. 40B, the mark 4302 is drawn by a dotted line in addition to a user's hand 4301 in the camera image display 4001. The mark 4302 urges the user to move the calibrator 850 so that the calibrator 850 will be arranged inside the mark 4302 concerned. Accordingly, the radius of the mark 4302 is determined in consideration of the size of the calibrator 850. Then, a message that urges to move the calibrator 850 to the inside of the mark 4302 is displayed as the message display 4002. The user who checked this message can move the calibrator 850 to the inside of the mark 4302 according to the message concerned.

Figure 41B:
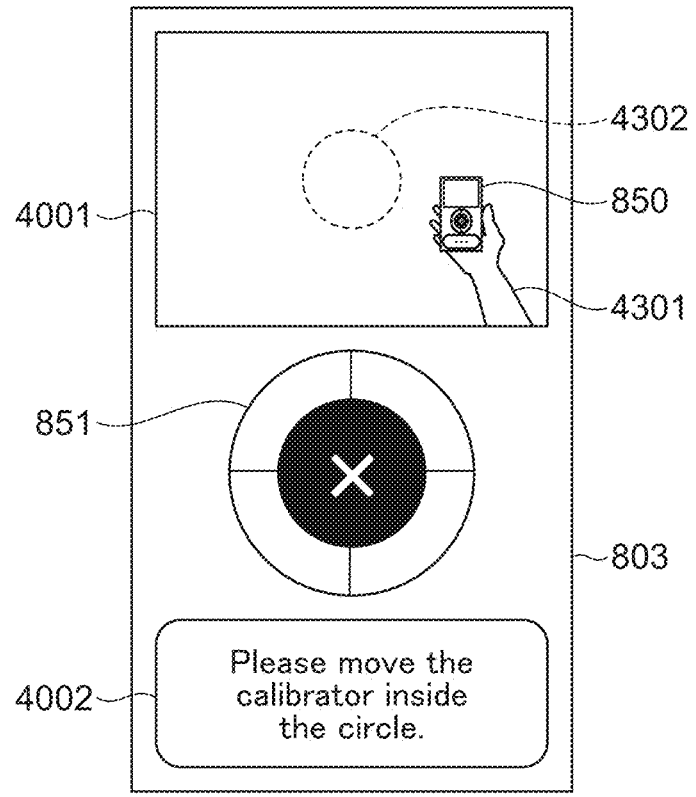

Next, in a step S4206, the display-apparatus controller 801 displays the superwide-angle image drawn in the step S4205 on a predetermined position of the display unit (a received image display unit) 803 as the camera image display 4001. FIG. 41B is a schematic view showing a displaying state of the display unit 803 when completing the step S4206. As shown in FIG. 41B, the image in which the circular mark 4302 is drawn to be superimposed over the superwide-angle image is displayed as the camera image display 4001. In this way, the mark 4302 for moving the calibrator 850 and the own hand 4301 are collectively displayed. Thereby, the user can move the calibrator 850 to the mark 4302 intuitively.

Next, in a step S4207, the display-apparatus controller 801 determines whether a completion notice of the calibration process has been received from the camera body 1. As a result of the determination in the step S4207, when it is determined that the completion notice has been received, the process is finished. In the meantime, as a result of the determination in the step S4207, when it is determined that the completion notice has not been received, the process is returned to the step S4203 and the steps from the step S4203 will be sequentially executed.

The calibration operation mentioned above reduces the troublesomeness of the user for directing the face in directions, such as the front, upper left, lower left, upper right, and lower right, as mentioned above. This facilitates the calibration operation, i.e., the operation of the user in the calibration. Accordingly, convenience when using the camera body 1 and the calibrator 850 improves.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-125341, filed Jul. 30, 2021 and No. 2022-038688, filed Mar. 11, 2022, which are hereby incorporated by reference herein in their entireties.

What is claimed is:

1. An image pickup apparatus comprising:
an observation direction detection unit that is worn on a body part other than a head of a user;
at least one image pickup unit that is worn on a body of the user;
a memory device that stores a set of instructions; and
at least one processor that executes the set of instructions to:
detect an observation direction of the user by the observation direction detection unit;
pick up an image by the at least one image pickup unit;
determine a recording direction using a detection result of the observation direction detection unit;

detect a deviation of the image pickup apparatus with respect to the body of the user; and to record a part of the image picked up by the at least one image pickup unit in a recording area that is determined in accordance with the recording direction determined and the deviation detected.

2. The image pickup apparatus according to claim 1, wherein the at least one processor executes instructions in the memory device to detect the deviation of the image pickup apparatus based on a deviation of a throat position and a chin position of the user from a reference position.

3. The image pickup apparatus according to claim 2, wherein the reference position is determined based on information about calibration.

4. The image pickup apparatus according to claim 3, wherein the at least one processor executes instructions in the memory device to correct an output of the observation direction detection unit in a case where the deviation of the image pickup apparatus is detected.

5. The image pickup apparatus according to claim 3, wherein the at least one processor executes instructions in the memory device to correct an image that will be recorded in a case where the deviation of the image pickup apparatus is detected.

6. The image pickup apparatus according to claim 5, wherein the at least one processor executes instructions in the memory device to perform roll correction to the image to record in a case where a roll deviation of the image pickup apparatus with respect to the body of the user is detected.

7. The image pickup apparatus according to claim 5, wherein the at least one processor executes instructions in the memory device to enlarge the recording area of the image in a case where the deviation of the image pickup apparatus is detected.

8. The image pickup apparatus according to claim 3, wherein the at least one processor executes instructions in the memory device to stop detection of the deviation in a case where an output of a posture detection member, which detects a posture of the user, changes beyond a predetermined threshold.

9. The image pickup apparatus according to claim 8, wherein the at least one processor executes instructions in the memory device to:
detect a roll angle of the head of the user; and
perform roll correction of a recording image that will be recorded in accordance with a detection result of the roll angle.

10. The image pickup apparatus according to claim 9, wherein one of a first mode in which the recording-image roll correction unit performs correction and a second mode in which the recording-image roll correction unit does not perform correction is settable.

11. The image pickup apparatus according to claim 9, wherein the at least one processor executes instructions in the memory device to:
perform the roll correction of the recording image based on a vertical direction detected by the posture detection member in a case where an angular deviation of the detected roll angle of the head of the user from the vertical direction is less than a first threshold; and
performs the roll correction of the recording image based on the roll angle of the head of the user in a case where the angular deviation is not less than the first threshold.

12. The image pickup apparatus according to claim 9, wherein the at least one processor executes instructions in the memory device to:
measure distances to points of the head of the user, and calculates the roll angle of the head of the user based on the distances.

13. The image pickup apparatus according to claim 12, wherein the points of the head used to calculate the roll angle of the head are arranged at both sides of a line connecting a throat position and a chin position of the user.

14. The image pickup apparatus according to claim 9, wherein the at least one processor executes instructions in the memory device to:
measure distances to areas of the head of the user, and calculates the roll angle of the head of the user based on the distances.

15. The image pickup apparatus according to claim 14, wherein the areas of the head used to calculate the roll angle of the head are arranged at both sides of a line connecting a throat position and a chin position of the user.

16. The image pickup apparatus according to claim 3, wherein the at least one processor executes instructions in the memory device to determine the recording direction based on upper peak points of waveform of a detection result in a pitch direction of the observation direction in a case where the detection result in the pitch direction vibrates at a frequency more than a predetermined threshold.

17. The image pickup apparatus according to claim 16, wherein the at least one processor executes instructions in the memory device to:
perform calibration of detection of the observation direction; and
urge the user to perform calibration while closing the mouth.

18. The image pickup apparatus according to claim 16, wherein the predetermined threshold of the frequency is about 1 Hz to 10 Hz.

19. The image pickup apparatus according to claim 16, wherein the at least one processor executes instructions in the memory device to determine the recording direction based on the upper peak points of the waveform of the detection result in the pitch direction in a case where a sound detection member detects sound larger than a predetermined threshold.

20. The image pickup apparatus according to claim 3, wherein the at least one processor executes instructions in the memory device to detect the deviation of the image pickup apparatus using a detection result of the observation direction.

21. The image pickup apparatus according to claim 3, wherein the at least one processor executes instructions in the memory device to warn the user using a warning member in a case where the deviation of the image pickup apparatus is detected.

22. The image pickup apparatus according to claim 21, wherein warning by the warning member is performed in a case where the deviation of the image pickup apparatus is continuously detected beyond a predetermined period.

23. The image pickup apparatus according to claim 21, wherein warning by the warning member is performed in a case where the deviation of the image pickup apparatus is detected beyond a predetermined number of times.

24. A calibration system comprising:
an image pickup apparatus comprising:
an image pickup unit configured to pick up an image;
a first memory device that stores a set of instructions; and
a first processor that executes the set of instructions to:
detect a face direction of a user who uses the image pickup apparatus;

detect an index for positioning a display apparatus based on the image picked up by the image pickup unit; and perform calibration in associating the face direction and the image in a case where the index detected is in a predetermined position; and the display apparatus comprising:

a second memory device that stores a set of instructions; and a second processor that executes the set of instructions to:

receive the image picked up by the image pickup unit;

draw a mark showing a movement destination of the display apparatus to the user so as to superimpose over the image received by the image reception unit; and display the image to which the mark is drawn.

25. The calibration system according to claim 24, wherein the first processor executes instructions in the first memory device to display the index.

26. The calibration system according to claim 25, wherein the first processor executes instructions in the first memory device to change at least one of a shape and a color of the index with lapse of time.

27. The calibration system according to claim 24, wherein the first processor executes instructions in the first memory device to calculate correction information that shows relation between a coordinate of the index detected and the face direction detected.

28. The calibration system according to claim 27, wherein the first processor executes instructions in the first memory device to store the correction information.

29. The calibration system according to claim 27, wherein the first processor executes instructions in the first memory device to transmit the correction information, and wherein the second processor executes instructions in the second memory device to receive the correction information and store the correction information received.

30. The calibration system according to claim 24, wherein the first processor executes instructions in the first memory device to transmit coordinate information about movement destination of the display apparatus, wherein the second processor executes instructions in the second memory device to receive the coordinate information and draw the mark showing the movement destination of the display apparatus based on the coordinate information received.

31. A control method for an image pickup apparatus, the control method comprising:

detecting an observation direction of a user;

picking up an image by an image pickup unit that is worn on a body of the user;

determining a recording direction using a detection result of the observation direction;

detecting a deviation of the image pickup apparatus with respect to the body of the user; and recording a part of the image picked up by the image pickup unit in an area that is determined in accordance with the recording direction determined and the deviation of the image pickup apparatus detected.

32. A non-transitory computer-readable storage medium storing a control program causing a computer to execute a control method for an image pickup apparatus, the control method comprising:

detecting an observation direction of a user;

picking up an image by an image pickup unit that is worn on a body of the user;

determining a recording direction using a detection result of the observation direction;

detecting a deviation of the image pickup apparatus with respect to the body of the user; and recording a part of the image picked up by the image pickup unit in an area that is determined in accordance with the recording direction determined and the deviation of the image pickup apparatus detected.

* * * * *